(12) United States Patent
Ross et al.

(10) Patent No.: US 6,598,033 B2
(45) Date of Patent: *Jul. 22, 2003

(54) PROBLEM MODEL FOR ALARM CORRELATION

(75) Inventors: Niall Ross, Great Dunmow (GB); Anthony Richard Phillip White, Ottawa (CA)

(73) Assignee: Nortel Networks Limited, St. Laurent (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/892,433

(22) Filed: Jul. 14, 1997

(65) Prior Publication Data

US 2001/0051937 A1 Dec. 13, 2001

(30) Foreign Application Priority Data

Oct. 21, 1996 (GB) .............................. 9621904

(51) Int. Cl.⁷ .............................................. G06F 17/00
(52) U.S. Cl. ............................ 706/46; 706/47; 706/45; 707/103
(58) Field of Search ............................. 706/46, 47, 45; 707/103

(56) References Cited

U.S. PATENT DOCUMENTS

| | | | | |
|---|---|---|---|---|
| 4,989,132 A | * | 1/1991 | Mellender et al. | 706/60 |
| 5,159,685 A | | 10/1992 | Kung | 714/26 |
| 5,175,800 A | * | 12/1992 | Galis et al. | 706/45 |
| 5,261,044 A | | 11/1993 | Dev et al. | 345/357 |
| 5,295,244 A | | 3/1994 | Dev et al. | 345/357 |
| 5,309,448 A | | 5/1994 | Bouloutas et al. | 714/25 |
| 5,388,189 A | | 2/1995 | Kung | 706/45 |
| 5,412,756 A | * | 5/1995 | Bauman et al. | 706/45 |
| 5,423,041 A | * | 6/1995 | Burke et al. | 717/5 |
| 5,504,921 A | | 4/1996 | Dev et al. | 709/223 |
| 5,559,955 A | * | 9/1996 | Dev et al. | 714/4 |
| 5,619,621 A | * | 4/1997 | Puckett | 706/47 |
| 5,761,502 A | * | 6/1998 | Jacobs | 707/103 |
| 5,768,353 A | * | 6/1998 | Browne | 379/114 |
| 5,768,501 A | * | 6/1998 | Lewis | 714/48 |
| 5,946,673 A | * | 8/1999 | Francone et al. | 706/13 |
| 5,974,405 A | * | 10/1999 | McGuinness et al. | 706/45 |

FOREIGN PATENT DOCUMENTS

EP 0 503 784 A2 2/1992
EP 0 508 571 A2 2/1992

OTHER PUBLICATIONS

Ebrahimi et al, "CORDS:. A Knowledge–Based Remote Diagnosis Workstation", IEEE Inter. Conf. On Systems, man and cybernetics, Oct. 1992.*

* cited by examiner

Primary Examiner—George B. Davis
(74) Attorney, Agent, or Firm—Barnes & Thornburg

(57) ABSTRACT

A method of processing data such as alarms from a communications network, the network comprising a plurality of network entities, having predetermined states of operation, the method comprising the step of creating an object (88) associated with a given state of one of the entities, such as a fault state. The object comprises knowledge based reasoning capability (89) such as rules for determining whether the entity is in the given state, and the method further comprises the steps of: passing data about the network, such as alarms and events, to the object; and inferring whether the entity is in the given fault state using the rules. This enables faster correlation of alarms and simpler development and maintenance of the rules.

18 Claims, 39 Drawing Sheets

Fig 3  Prior art IBM

Fig 4 prior art (King)

INTERFERENCE ENGINE (King)

Fig 6 prior art (Dev et al)

PROBLEM CLASS INHERITANCE HIERARCHY

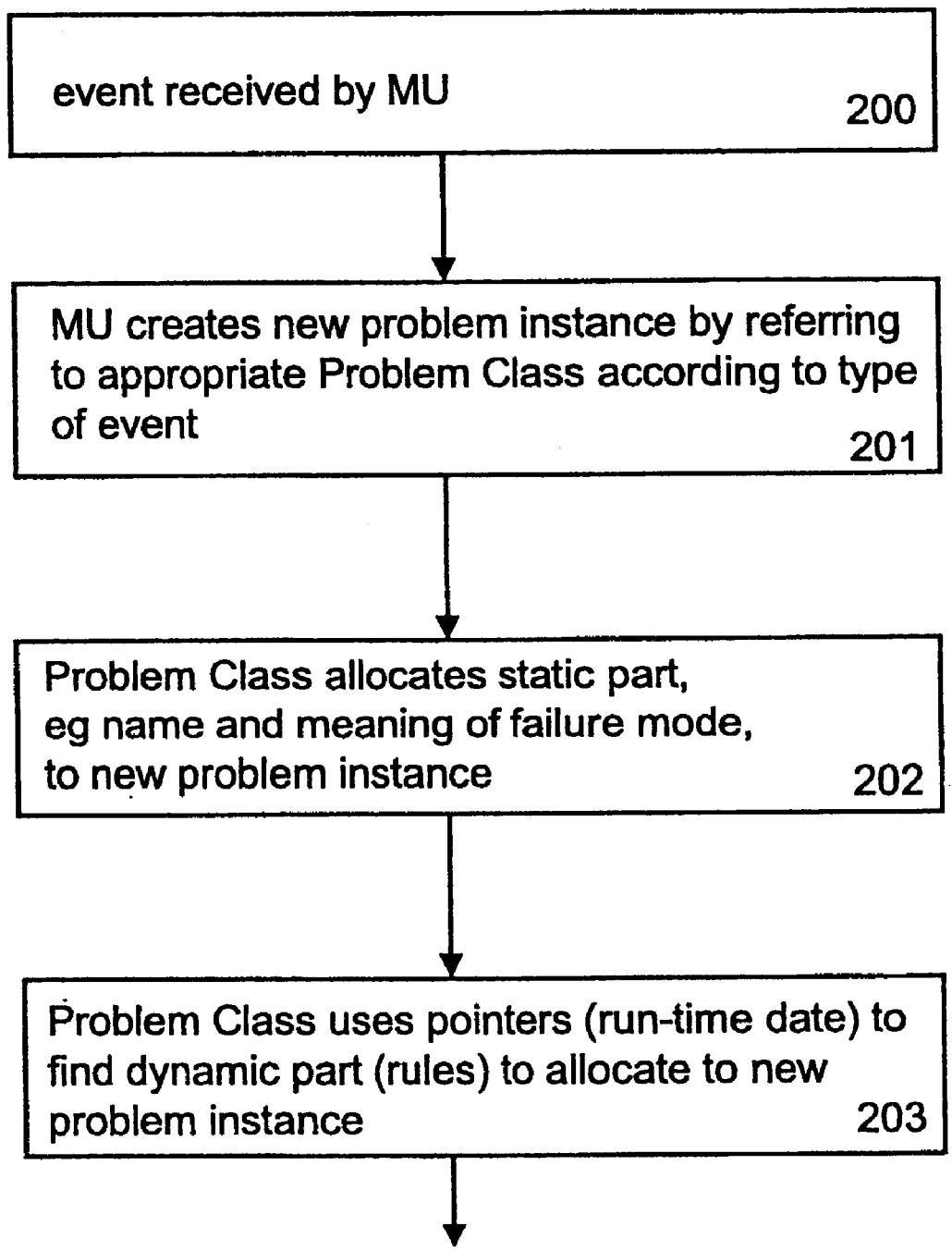

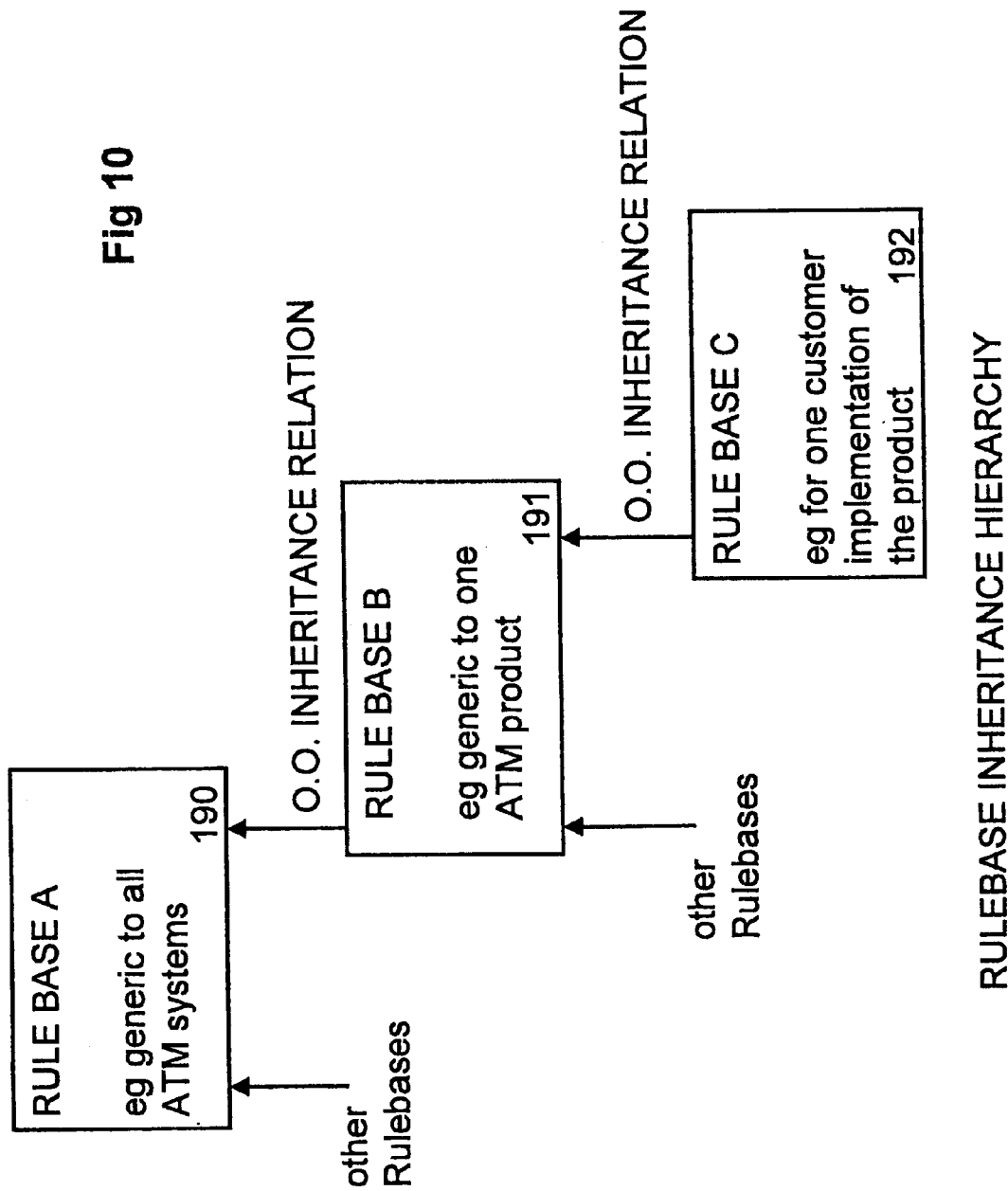

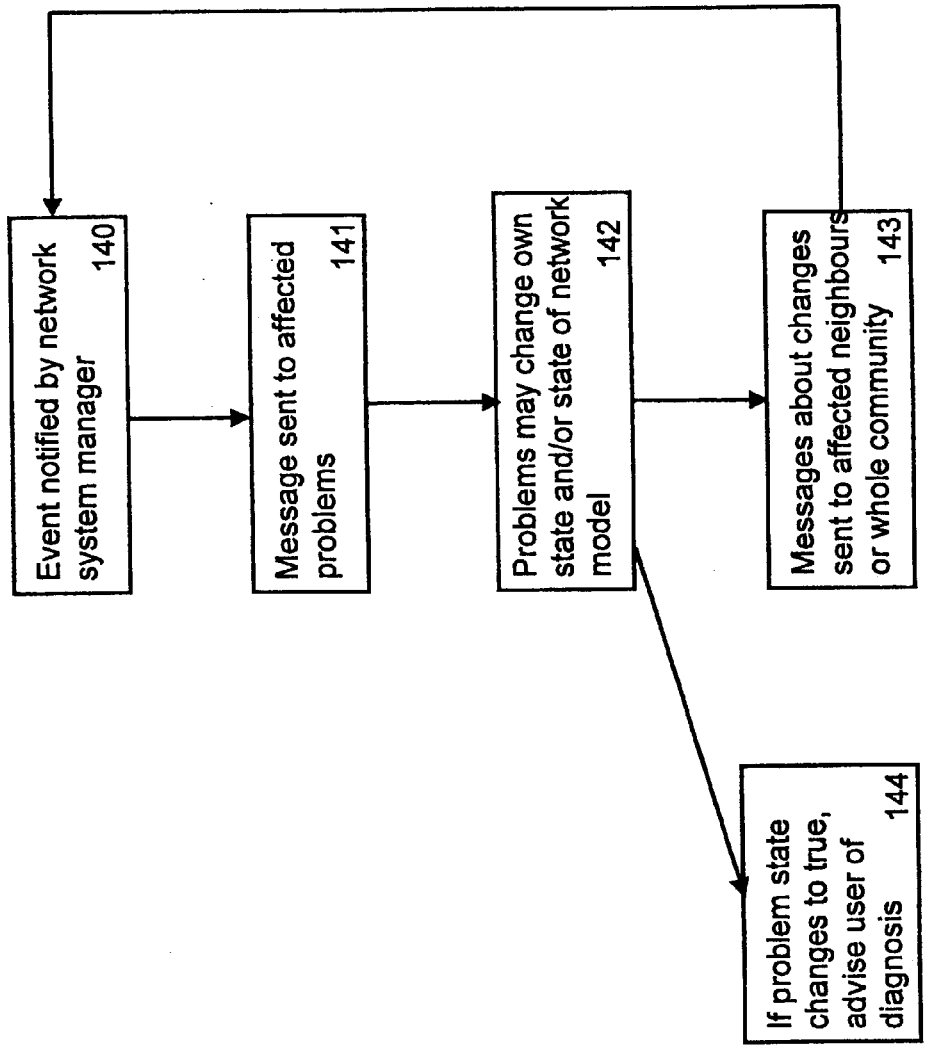
Fig 11 Problem diagnosis for local or semi local reasoning

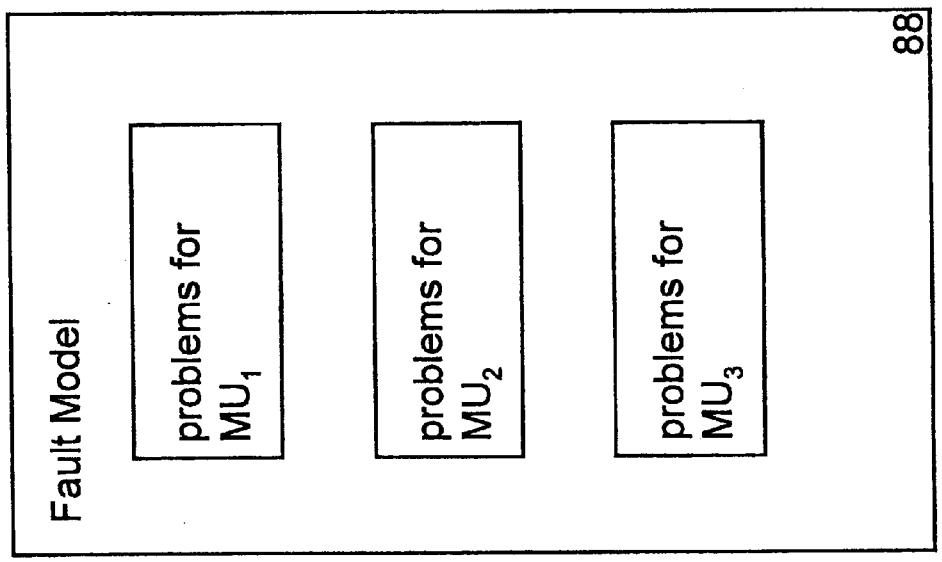
Fig 12b semi local reasoning version
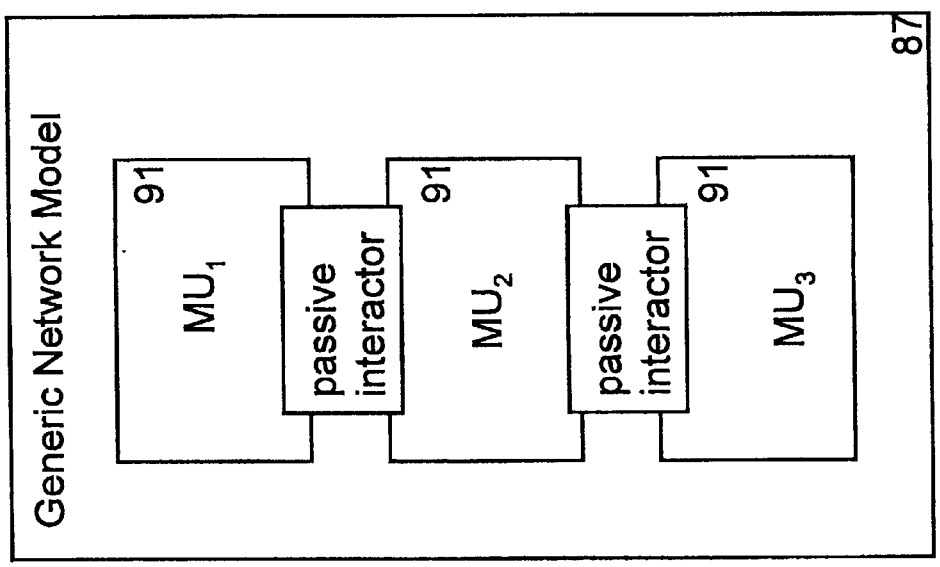
Fig 12a semi local reasoning version

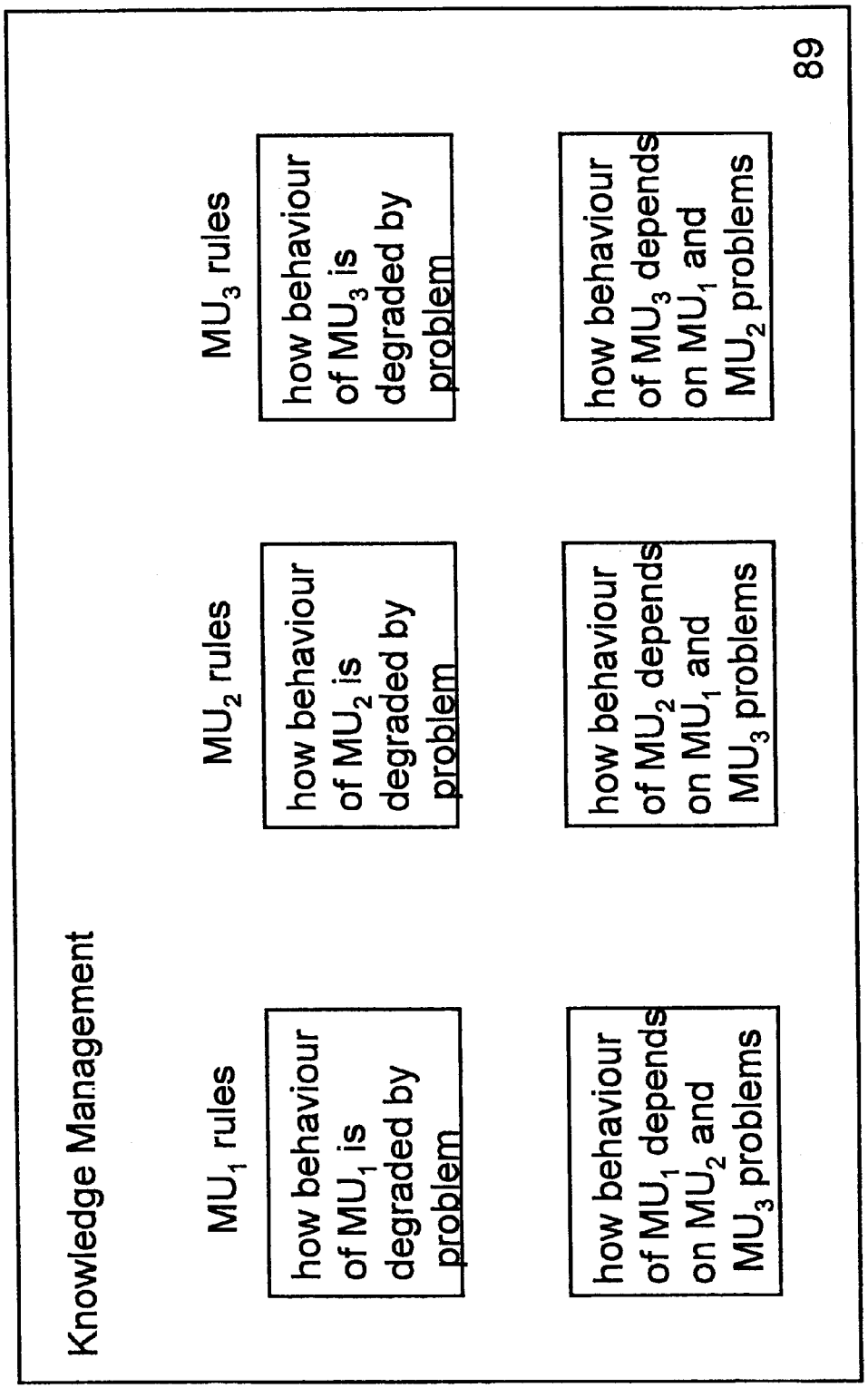
Fig 12c semi local reasoning version

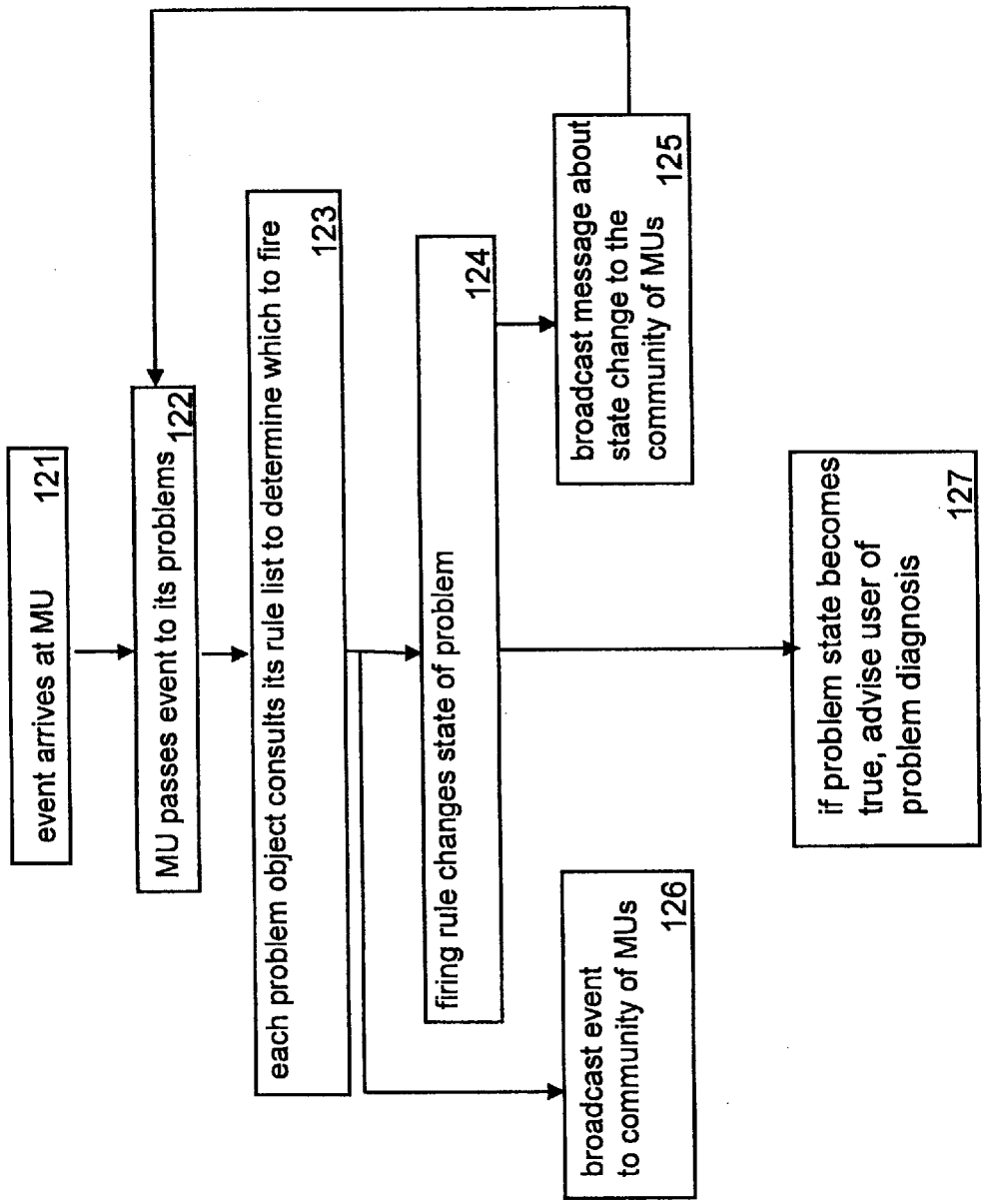

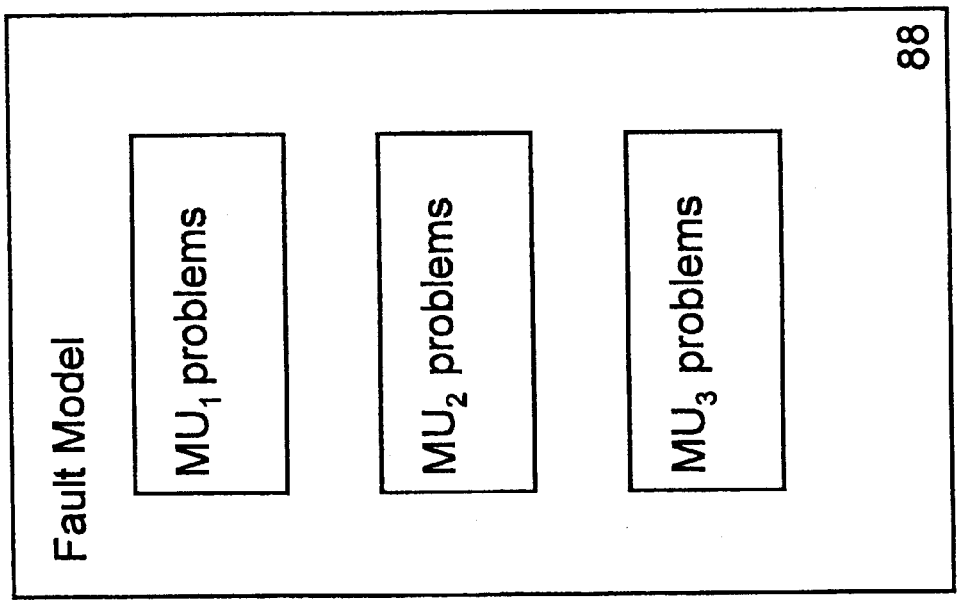
Fig 13b local reasoning version
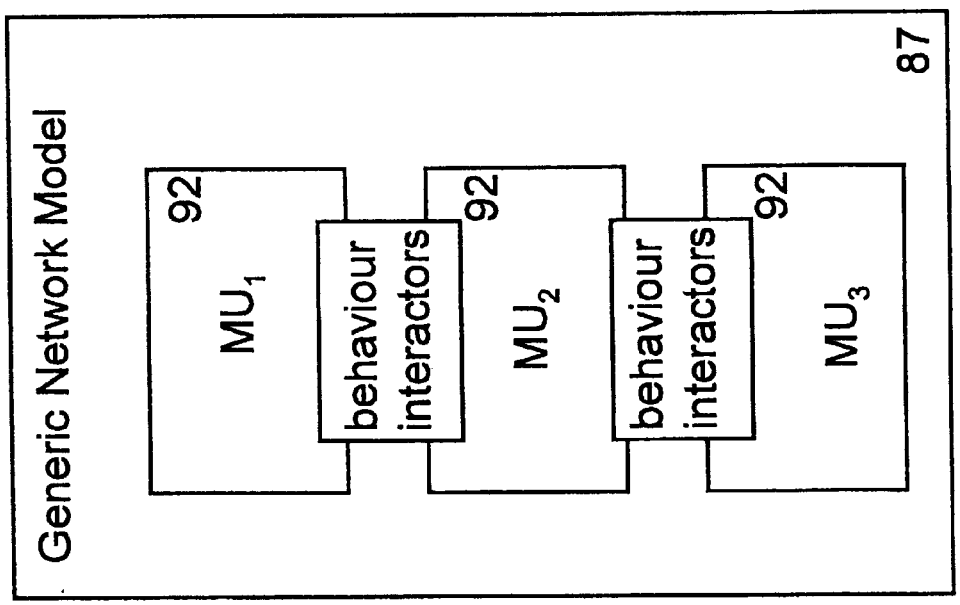
Fig 13a local reasoning version

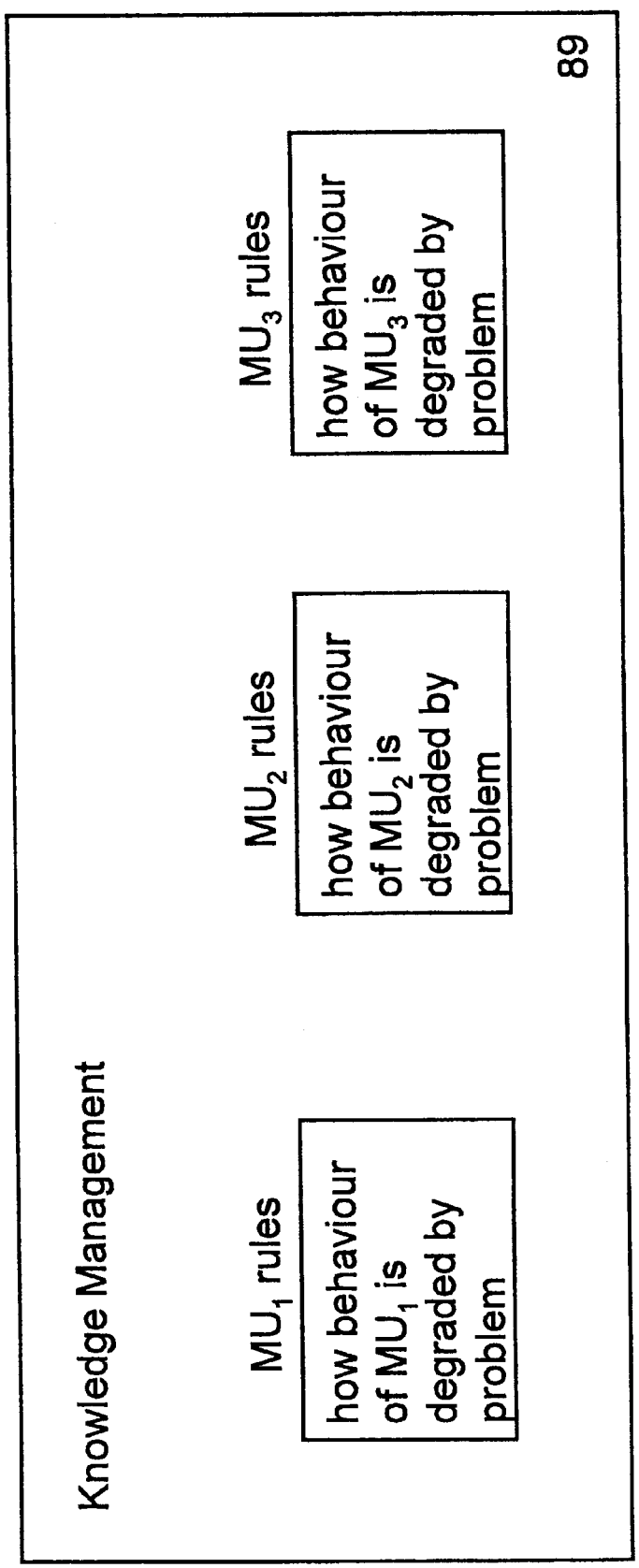
Fig 13c local reasoning version

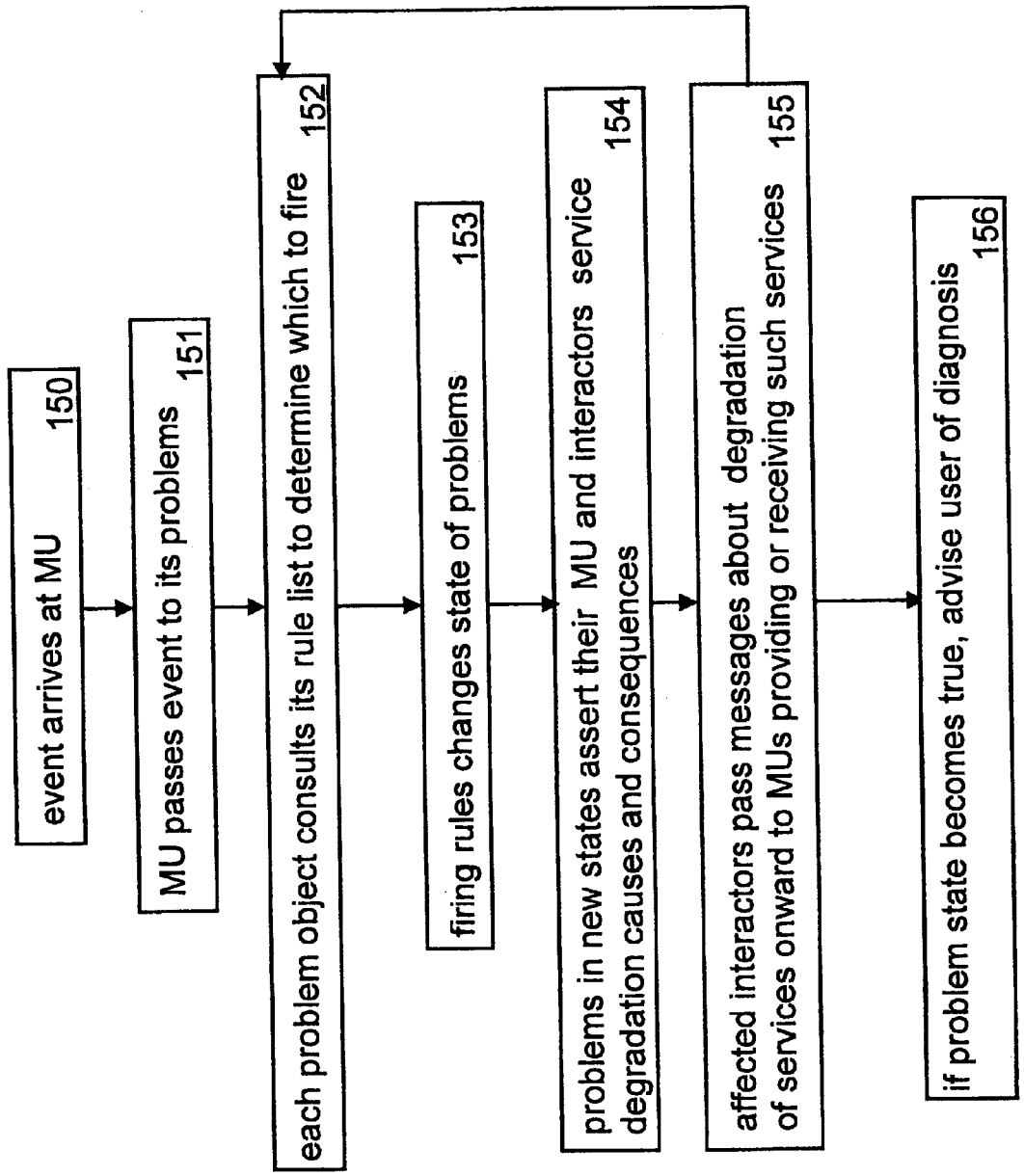
Fig 13d Local reasoning version operation

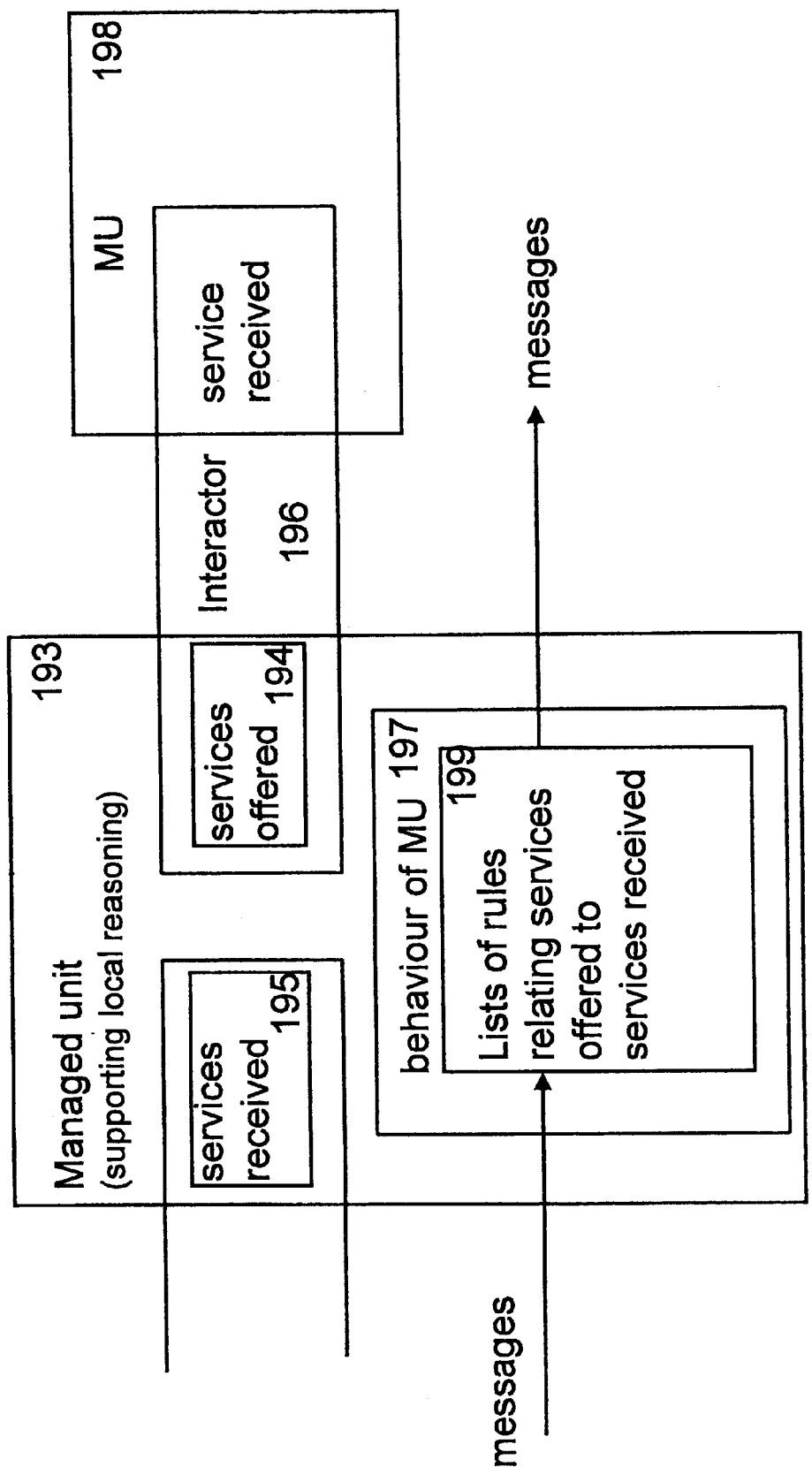

Managed Unit and Interactor operation under local reasoning

COMMUNITIES FOR SEMI LOCAL REASONING

Generic Network Model

Fault Model-Broadcast

Community State Model

MU State Model (broadcast)

Behaviour State Model (broadcast)

Fig. 22. Logical Rule State Model

Fault Model-Impact

Evidence State Model

Event State Model

Hypothesis State Model

Behaviour State Model (impact)

Behaviour Interactor State Model

Binding State Model

Explanation State Model

Fig.31. Implementing default and active states

Intra-correlator distribution

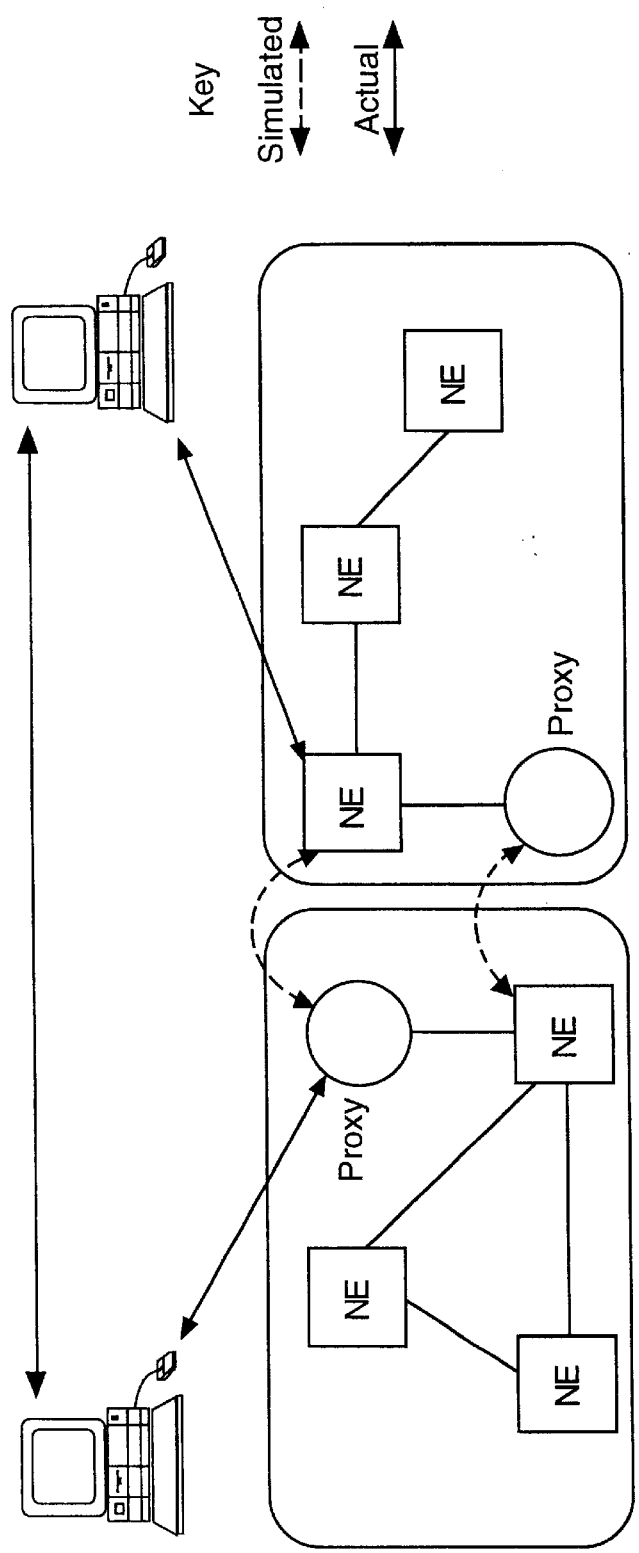

PROBLEM MODEL FOR ALARM CORRELATION

FIELD OF THE INVENTION

The present invention relates to methods of processing data from communications networks, systems for processing data from communications networks, methods of diagnosing causes of events in complex systems, methods of acquiring knowledge for knowledge based reasoning capacity for the above methods, methods of extending compilers for such knowledge based reasoning capacity, and methods and systems for using such extended compilers.

BACKGROUND TO THE INVENTION

In complex systems such as communication networks, events which can affect the performance of the network need to be monitored. Such events may involve faults occurring in the hardware or software of the system, or excessive demand causing the quality of service to drop. For the example of communication networks, management centres are provided to monitor events in the network. As such networks increase in complexity, automated event handling systems have become necessary. Existing communication networks can produce 25,000 alarms a day, and at any time there may be hundreds of thousands of alarms which have not been resolved.

With complex communication systems, there are too many devices for them to be individually monitored by any central monitoring system. Accordingly, the monitoring system, or operator, normally only receives a stream of relatively high level events. Furthermore, it is not possible to provide diagnostic equipment at every level, to enable the cause of each event to be determined locally.

Accordingly, alarm correlator systems are known, as shown in FIG. 1 for receiving a stream of events from a network, and deducing a cause of each event, so that the operator sees a stream of problems in the sense of originating causes of the events output by the network.

The alarm correlator shown in FIG. 1 uses network data in the form of a virtual network model to enable it to deduce the causes of the events output by the network. Before the operation of known alarm correlator systems is discussed, some details of how alarms are handled within the network will be given, with reference to FIG. 2. Several layers of alarm filtering or masking can occur in between a device raising an event, and news of this event reaching a central system manager. At the hardware element (HE) level, the system would be overwhelmed, and performance destroyed if every signal raised by hardware elements were to be forwarded unaltered to higher layers. Masking is used to reduce this flood of data. Some of the signals are always suppressed, others delayed for a time to see if a higher criticality signal arises, and suppressed if such a signal has already been sent.

Some control functions may be too time critical to be handled by standard management processes. Accordingly, either at the hardware element level, or a higher level, some real time control may be provided, to respond to alarms. Such real time control (RTC) has a side effect of performing alarm filtering. For example, a group of alarms indicating card failure, may cause the real time controller to switch from a main card to a spare card, triggering further state change modifications at the hardware element level. All this information may be signalled to higher levels in a single message from the RTC indicating that a failure and a handover has occurred. Such information can reach the operator in a form indicating that the main card needs to be replaced, an operation which normally involves maintenance staff input.

A node system manager may be provided as shown in FIG. 2, to give some alarm filtering and alarm correlation functions. Advanced correlation and restoration functions may be located here, or at the network system management level.

In one known alarm correlation system, shown in U.S. Pat. No. 5,309,448 (Bouloutas et al), the problem of many alarms being generated from the same basic problem is described. This is because many devices rely on other devices for their operation, and because alarm messages will usually describe the symptom of the fault rather than whether it exists within a device or as a result of an interface with another device.

FIG. 3 shows how this known system addresses this problem. A fault location is assigned relative to a device, for each alarm. A set of possible fault locations for each alarm is identified, with reference to a stored network topology.

Then the different sets of possible fault locations are correlated with each other to create a minimum number of possible incidents consistent with the alarms. Each incident is individually managed, to keep it updated, and the results are presented to an operator.

Each of the relative fault locations are internal, upstream, downstream, or external. The method does not go beyond illustrating the minimum number of faults which relate to the alarms, and therefore its effectiveness falls away if multiple faults arise in the selected set, which is more likely to happen in more complex systems.

Another expert system is shown in U.S. Pat. No. 5,159,685 (Kung). This will be described with reference to FIG. 4. Alarms from a network manager 41 are received and queued by an event manager 42. After filtering by an alarm filter 43, alarms which are ready for processing are posted to a queue referred to as a bulletin board 44, and the alarms are referred to as goals. A controller 45 determines which of the goals has the highest priority. An inference engine 46 uses information from an expert knowledge base 47 to solve the goal and find the cause of the alarm by a process of instantiation. This involves instantiating a goal tree for each goal by following rules in the form of hypothesis trees stored in the expert knowledge base. Reference may also be made to network structure knowledge in a network structure knowledge base 48. This contains information about the interconnection of a network components.

The inference process will be described with reference to FIG. 5. First a knowledge source is selected according to alarm type. The knowledge source is the particular hypothesis tree. Hypothesis trees, otherwise known as goal trees are stored for each type of alarm.

At step 51 the goal tree for the alarm is instantiated, by replacing variables with facts, and by executing procedures/rules in the goal tree as shown in step 52. If the problem diagnosis is confirmed, the operator is informed. Otherwise other branches of the goal tree may be tried, further events awaited, and the operator kept informed as shown in steps 53 to 56.

This inference process relies on specific knowledge having been accumulated in the expert knowledge base. The document describes a knowledge acquisition mode of operation. This can of course be an extremely labour intensive operation and there may be great difficulties in keeping a large expert knowledge base up to date.

A further known system will be described with reference to FIG. 6. U.S. Pat. No. 5,261,044 (Dev et al) and two related patents by the same inventor, U.S. Pat. No. 5,295,244, and U.S. Pat. No. 5,504,921, show a network management system which contains a model of the real network. This model, or virtual network includes models of devices, higher level entities such as rooms, and relationships between such entities.

As shown in FIG. 6, a room model 61 may include attribute objects 62, and inference handler objects 63. Device models 64, 65, may also include attribute objects 66, 67 and inference handler objects 68, 69. Objects representing, relationships between entities are also illustrated. The device models are linked by a "is connected to" relationship object 70, and the device models are linked to the room model by "contains" relationship objects 71, 72.

The network management system regularly polls all its devices to obtain their device-determined state. The resulting data arrives at the device object in the virtual model, which passes the event to an inference handler attached to it. An inference handler may change an attribute of the device object, which can raise an event which fires another inference handler in the same or an adjacent model.

The use of object orientated techniques enables new device models to be added, and new relationships to be incorporated, and therefore eases the burden of developing and maintaining the system.

However, to develop alarm correlation rules for each device, it is necessary to know both what other devices are linked to the first device, and also how the other devices work. Accordingly, developing and maintaining the virtual network model can become a complex task, as further new devices, new connections, or new alarm correlation rules are added.

SUMMARY OF INVENTION

The invention addresses the above problems.

According to a first aspect of the invention there is provided a method of operating a communications network comprising a plurality of network entities, having predetermined states of operation the method comprising the step of creating an object associated with a given state of one of the entities, the object comprising knowledge based reasoning capability for determining whether the entity is in the given state, and the method further comprising the steps of:
passing data about the network to the object; and
inferring whether the entity is in the given state using the reasoning capability.

By creating an object associated with a given state of one of the entities, a number of advantages arise. Firstly, the object oriented feature of encapsulation limits the amount of communication to that which is relevant, which can increase the speed of correlation. Furthermore, separation of problem modelling allows for improved reuse of code across different devices. A problem object can undertake relatively complex tasks such as launching tests, verifying complex conditions, and controlling recovery behaviour which would be difficult to do by combining rules without the problem oriented structure.

Advantageously the given state is a fault state. The data about the network may comprise alarms or other events relating to abnormal or undesired operation of the network. The example of alarm correlation is particularly valuable in communication networks where alarms are unlikely to be sufficiently detailed to isolate the problem which originally caused the alarm.

Advantageously a plurality of objects are created associated with different states, and messages are passed between the objects as part of the inference process. Message based reasoning makes distribution of processing easier, which facilitates scaling to handle a wide range of network sizes, topologies, and real time requirements.

Advantageously the object creation step is triggered by an event notified by the network, and the given state is a possible cause of the event, or a possible consequence of the event.

Advantageously the reasoning capability comprises rules grouped according to the class of messages they can process. This structuring of knowledge ensures fast alarm correlation. Groups of rules may be defined for both problem classes and problem instances.

Advantageously the reasoning capability comprises rules for translating events notified by the network into a degradation of a service received or offered by the associated entity from or to other entities. This enables particular efficient reasoning, since service information expresses precisely how the operations of the entity are inter dependent, which enables causes and consequences to be determined and propagated quickly.

Advantageously such service degradation information is passed to other objects associated with the same or the other entities.

Advantageously two or more of said objects are created and the inference steps for each are carried out in parallel in threads sharing a common knowledge base. This may be done using separate processors, and enables the processing to be distributed to suit performance requirements.

Advantageously knowledge bases are built up for separate parts of a network, and the method of claim 1 is carried out in parallel on the separate parts. The inference step may be carried out using respective ones of the knowledge bases and messages are passed from one object in one knowledge base to a connected object in an other, transparently. This is another way of distributing the processing, to scale the solution as required.

Advantageously, a plurality of objects are created in one of the knowledge bases and the inference steps for each of the objects are carried out in parallel, in threads, wherein messages passed from these objects contain a reference to the thread in which they were processed. This enables the messages to be returned to the correct thread.

According to another aspect of the invention, there is provided a system arranged to operate a communications network as set out above.

According to another aspect of the invention, there is provided a method of acquiring knowledge for the knowledge based reasoning capacity for the method of claim 1, comprising the step of creating rules for translating events notified by the network relating to the associated entity, into a degradation of a service offered by the associated entity to other entities.

According to another aspect of the invention, there is provided a method of processing data from a communications network, comprising the steps of:
implementing classes corresponding to given states of network entities wherein each class comprises a static and dynamic part, the dynamic part connecting instances of each class to rules which provide their reasoning capacity, whereby the dynamic part held by the static part can be changed while a system using these classes for its operation is running thus changing the behaviour of future instances.

This facilitates updating and maintaining the rules.

Advantageously the rule implementation referenced by the dynamic part can be changed. This enables the behaviour of existing instances to be changed. Advantageously the rules reference by the dynamic part are compiled rules with their source code, rather than rule source which requires interpreting. This speeds up the operation considerably.

Advantageously the method further comprises the step of compiling the rules using an extended compiler for an object oriented language, extended to compile rule constructs, wherein all the standard constructs of the language can be embedded in the rule constructs, and wherein the rule constructs comprise sets of arrangements of conditions and sets of sequences of actions that have an arbitrarily complex logical dependency on the sets of conditions. The encoding of rules directly in the OO language of implementation avoids the "impedance mismatch" problem. (Impedance mismatch is a classical problem arising from the clash between the data modelling styles of two paradigms, in this case OO and KBS. This clash imposes a high cost of translation, both in performance when running the system, and in code maintenance when coding the translation between modelling styles.)

Advantageously the data comprises notification of an event in the network and the rules are for determining the cause of the event.

According to another aspect of the invention there is provided a method of processing data from a communications network, comprising the step of:
applying a knowledge based reasoning capability to interpret the data, wherein the reasoning capability comprises a hierarchy of rulebases, the hierarchy being arranged to have inheritance properties, such that the method further comprises the steps of;
determining whether a named rule is in one of the rulebases, and, where it is not present, making available the same named rule from a rule base higher in the hierarchy; and applying the named rule to the data.

An inheritance hierarchy means that technology specific rule bases and product specific rule bases can be provided. This means supplier provided rule bases can be updated without overwriting customer specific rules at a lower level of the hierarchy.

According to another aspect of the invention there is provided a method of processing data from a communications network comprising the step of:
applying a knowledge based reasoning capability to interpret the data wherein the reasoning capability comprises one or more rulebases, comprising rules encoded directly in an object orientated language, by specialising selected classes of an object oriented compiler so extending its functionality that it compiles rules and standard code.

This enables a class library and other object oriented applications to be available not merely within the rules, but also when writing, compiling and testing them. Specialising a limited number or a minimum number of selected classes means that large parts of the compiler remain identical in their implementation. Thus many ancilliary tools will continue to interwork with the new compiler.

Advantageously the compiler is a Smalltalk compiler. Advantageously the method comprises the step of applying the reasoning to determine the cause of events notified by the network.

According to another aspect of the invention there is provided a method of extending a compiler for an object oriented language, to compile rule constructs, wherein all the standard constructs of the language can be embedded in the rule constructs, and wherein the rule constructs comprise sets of arrangements of conditions and sets of sequences of actions that have an arbitrarily complex logical dependency on the sets of conditions.

Advantageously, the rule constructs may have any other data and behaviour defined in the language. This enables names and references to the context of the rule, or variables, to be included in the rules. This can further simplify the rules, and ease maintenance.

According to another aspect of the invention there is provided a system comprising a processor arranged to use a compiler extended according to the above method of extending a compiler.

Preferred features may be combined and may be combined with any of the aspects of the invention, as appropriate, as would be apparent to a skilled person.

BRIEF DESCRIPTION OF THE DRAWINGS

For a better understanding of the invention, and to show how the same may be carried into effect, it will now be described by way of example with reference to the drawings, in which:

FIG. 9b shows a method using a dynamically represented problem class;

FIG. 10 shows a rulebase inheritance hierarchy for use with the application of FIG. 7;

FIG. 11 shows a method of problem diagnosis used by the application of FIG. 7;

FIGS. 12a, 12b, 12c and 12d show the structure and function of elements of the application of FIG. 7 for semi local reasoning;

FIGS. 13a, 13b, 13c and 13d show the structure and function of elements of the application of FIG. 7 for local reasoning;

FIG. 14 shows the structure of a managed unit arranged for local reasoning;

FIGS. 32 and 33 show features of the architecture concerning distribution.

DETAILED DESCRIPTION

Environment

Figure 1:
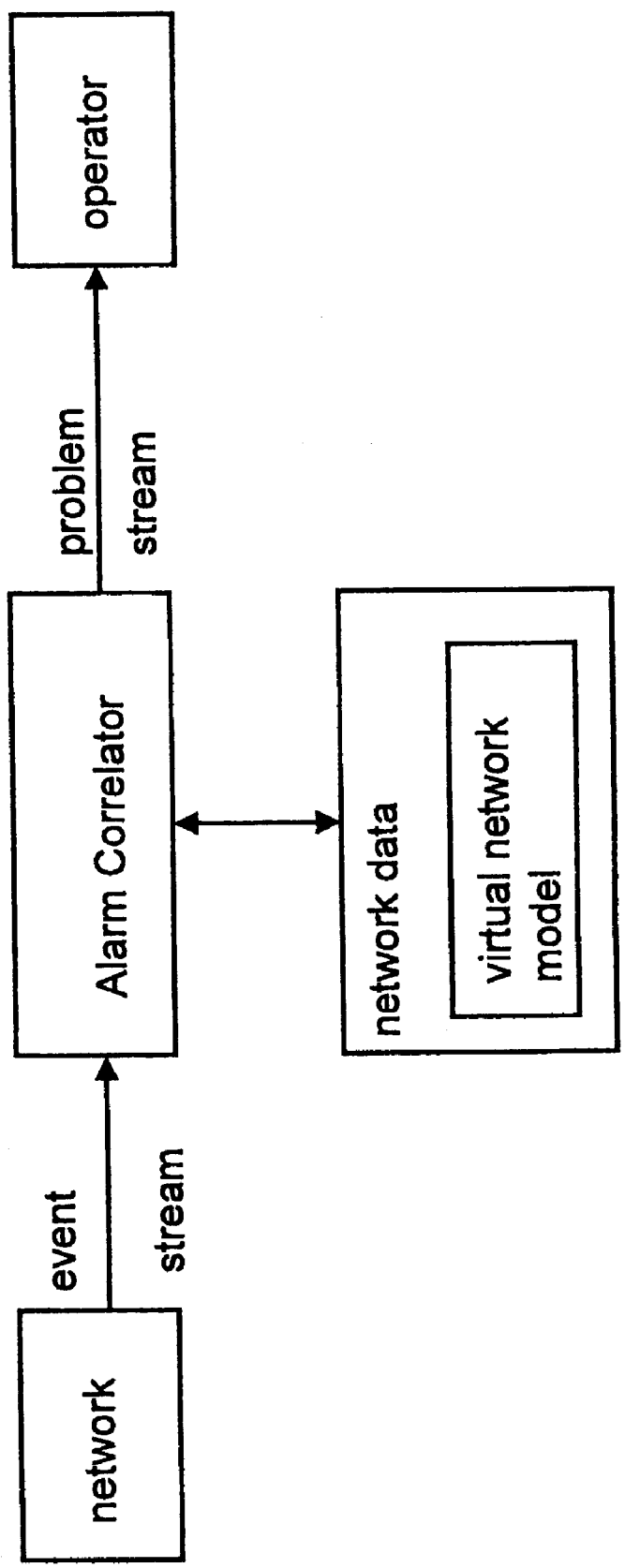
FIGS. 1, 2, 3, 4, 5 and 6 show prior art systems and methods for alarm correlation.
Figure 2:
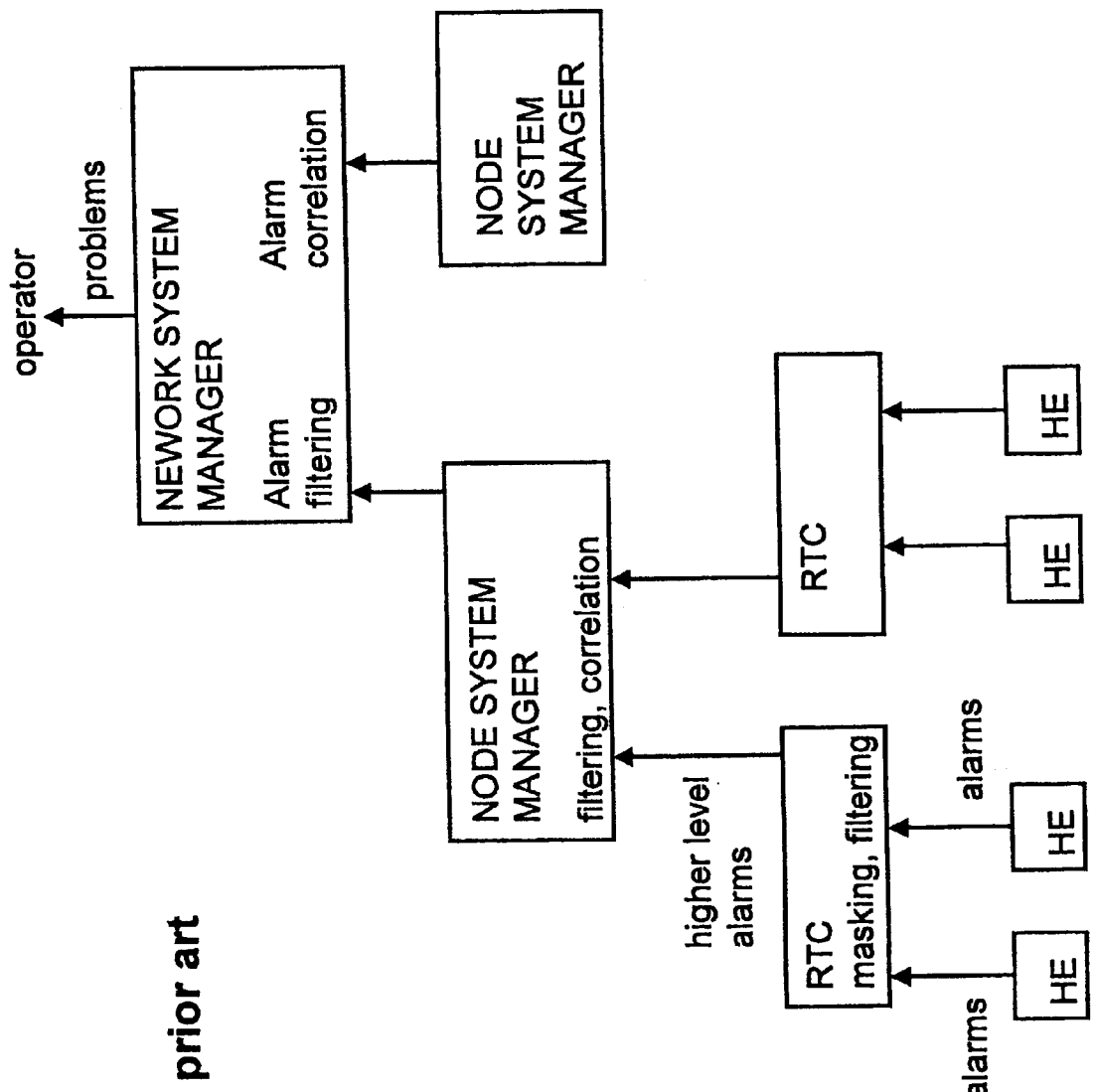
Figure 3:
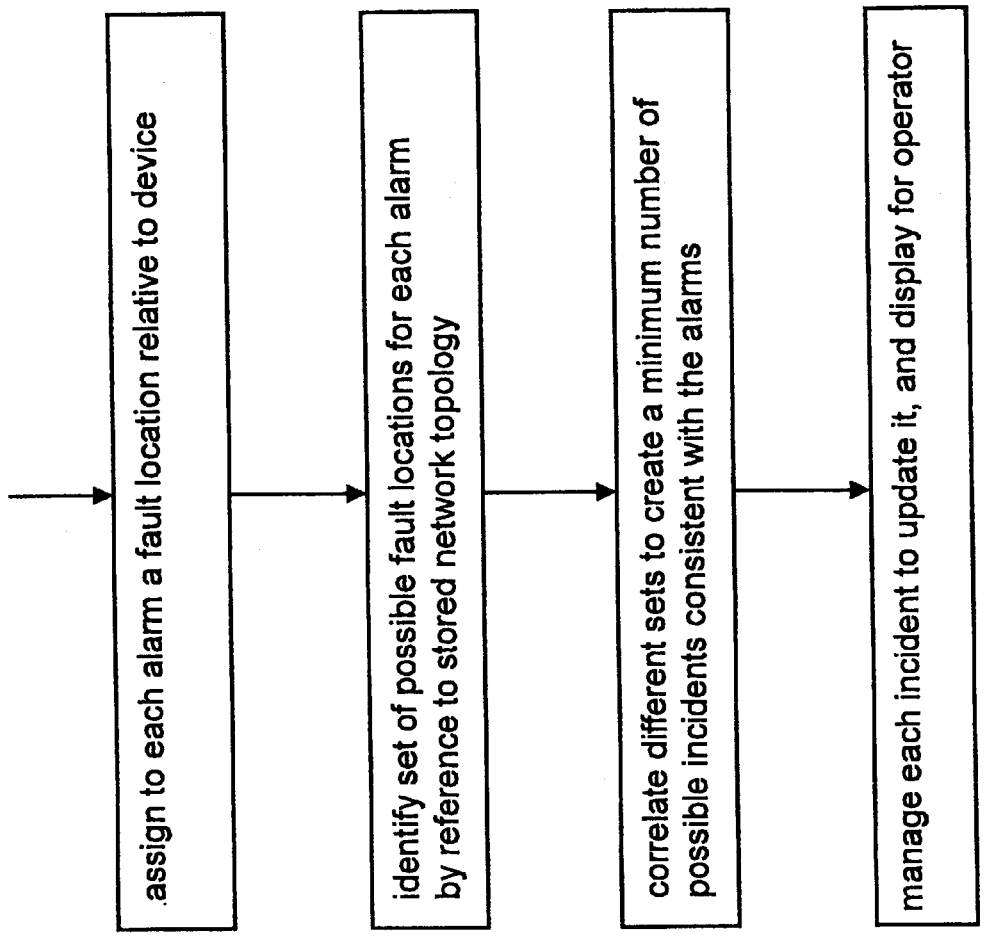
Figure 4:
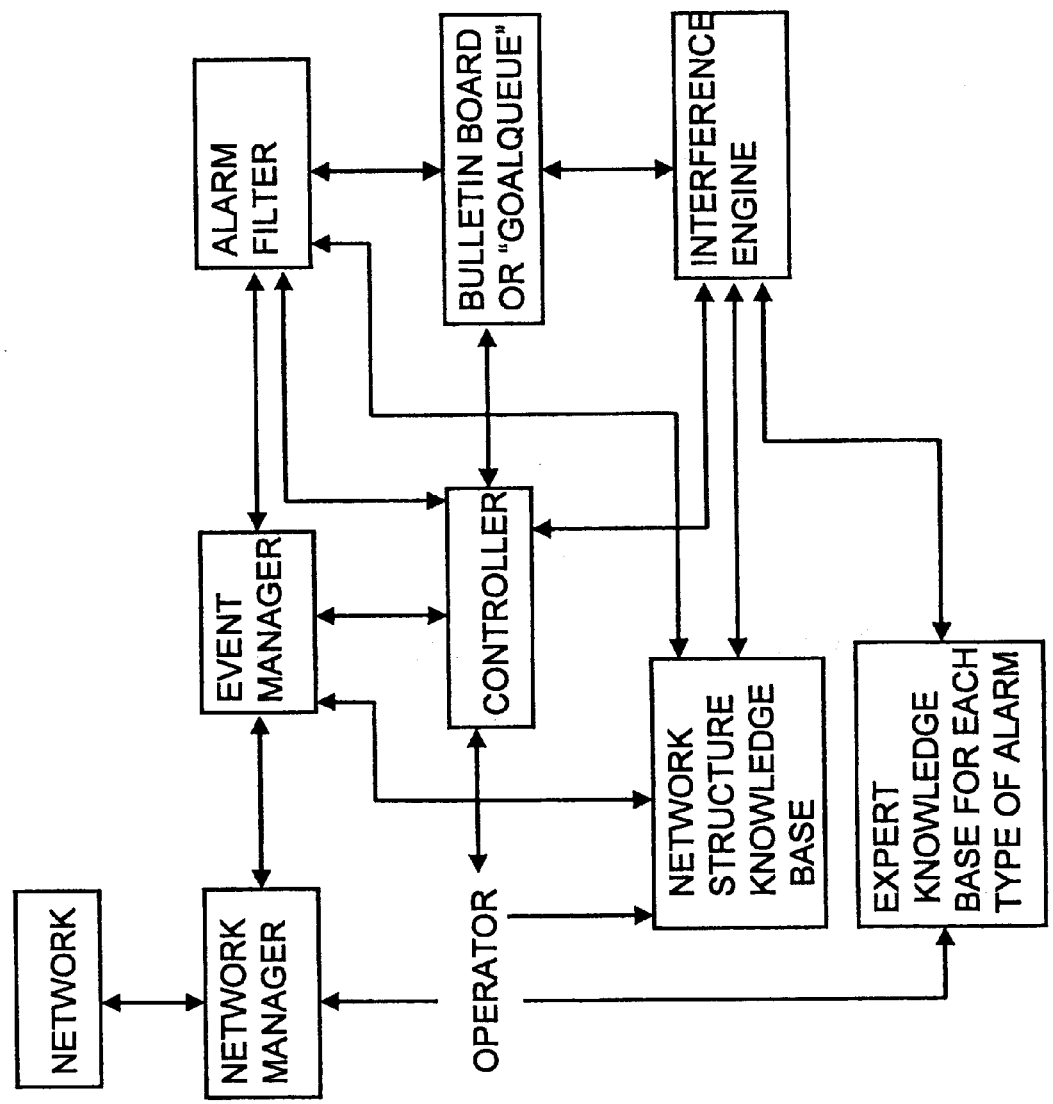
Figure 5:
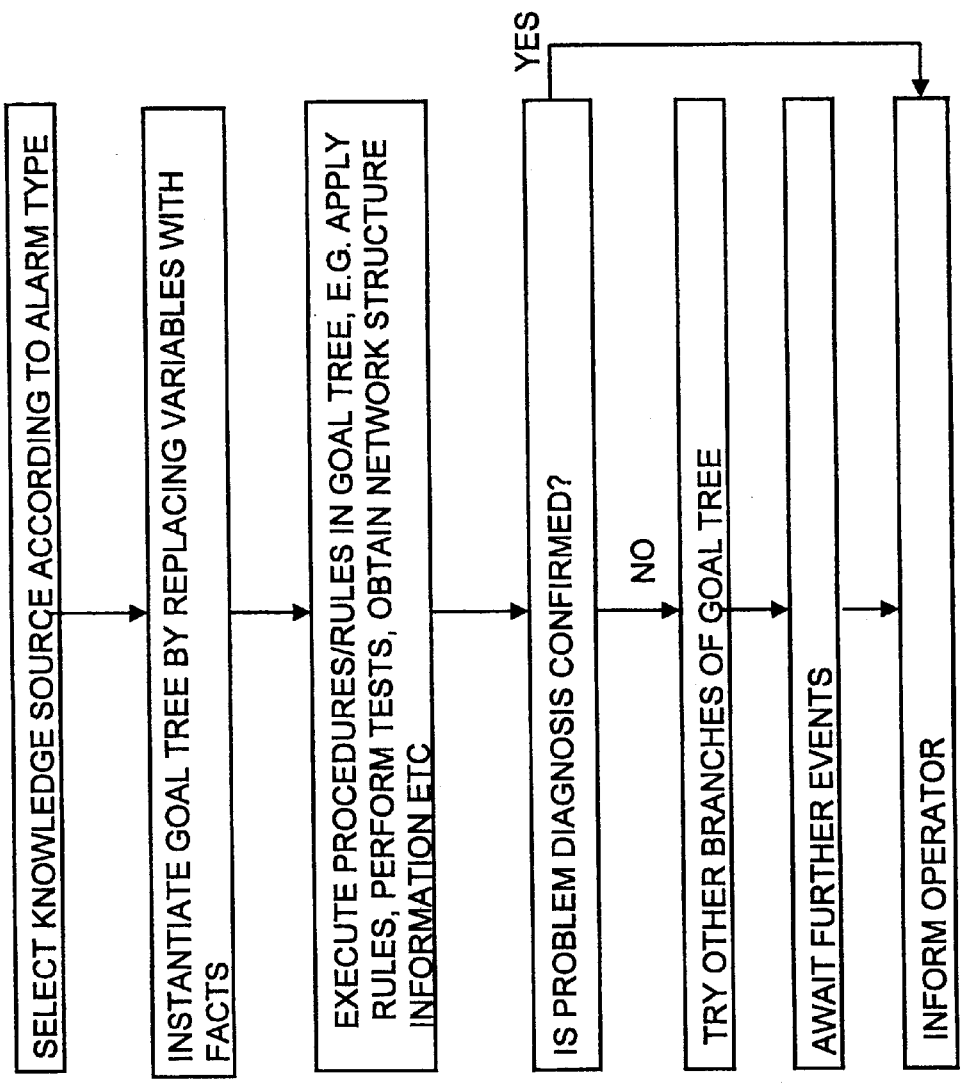
Figure 6:
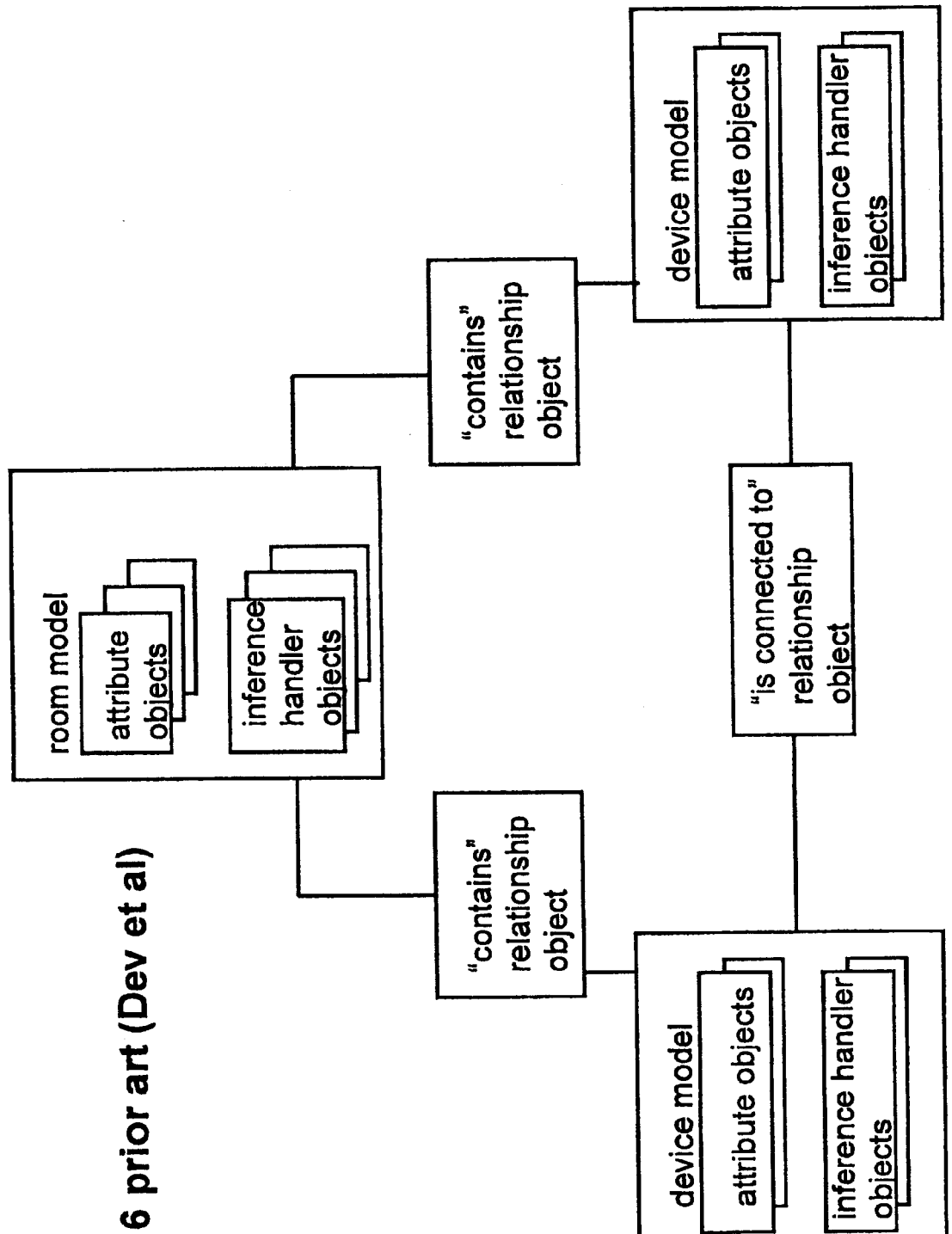
Figure 7:
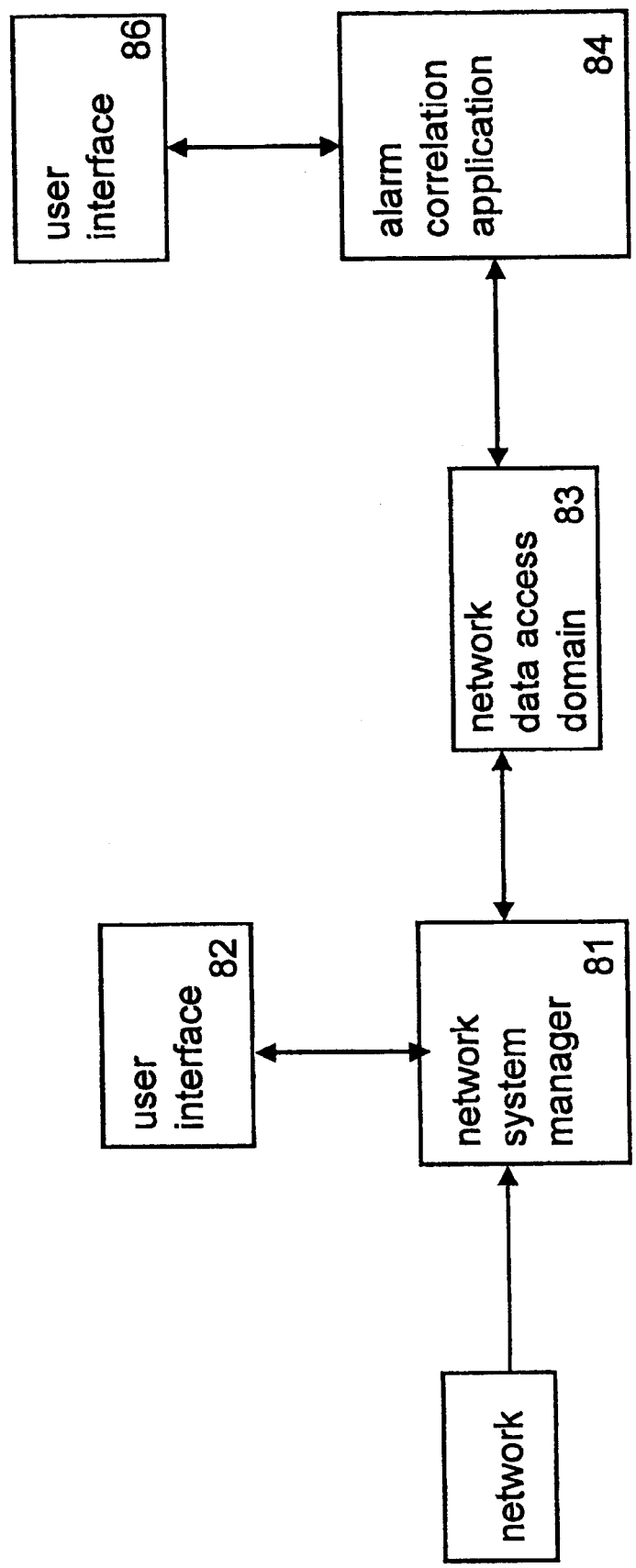
FIG. 7 shows the structure of the environment of an alarm correlation application of an embodiment of the present invention.

FIG. 7 shows a network system manager 81 linked to the network it manages. The manager has a user interface 82, and feeds other applications through a network data access function 83. The alarm correlation application 84 is illustrated with its own user interface function 86. The alarm correlation application is an example of an application which can infer whether an entity in the network is in a given state of operation. It is also an example of an application which can determine the cause of an event, or consequences of an event in the network, using a virtual model of the network.

Alarms and notifications of other events, such as network traffic changes, and cell loss rates are passed to the alarm correlation application from the manager. The correlation application converts the stream of events into a stream of causes of the events, also termed problems. These problems are made available to a user via the user interface. This enables a user to take prompt remedial action based on causes rather than symptoms.

Figure 8:
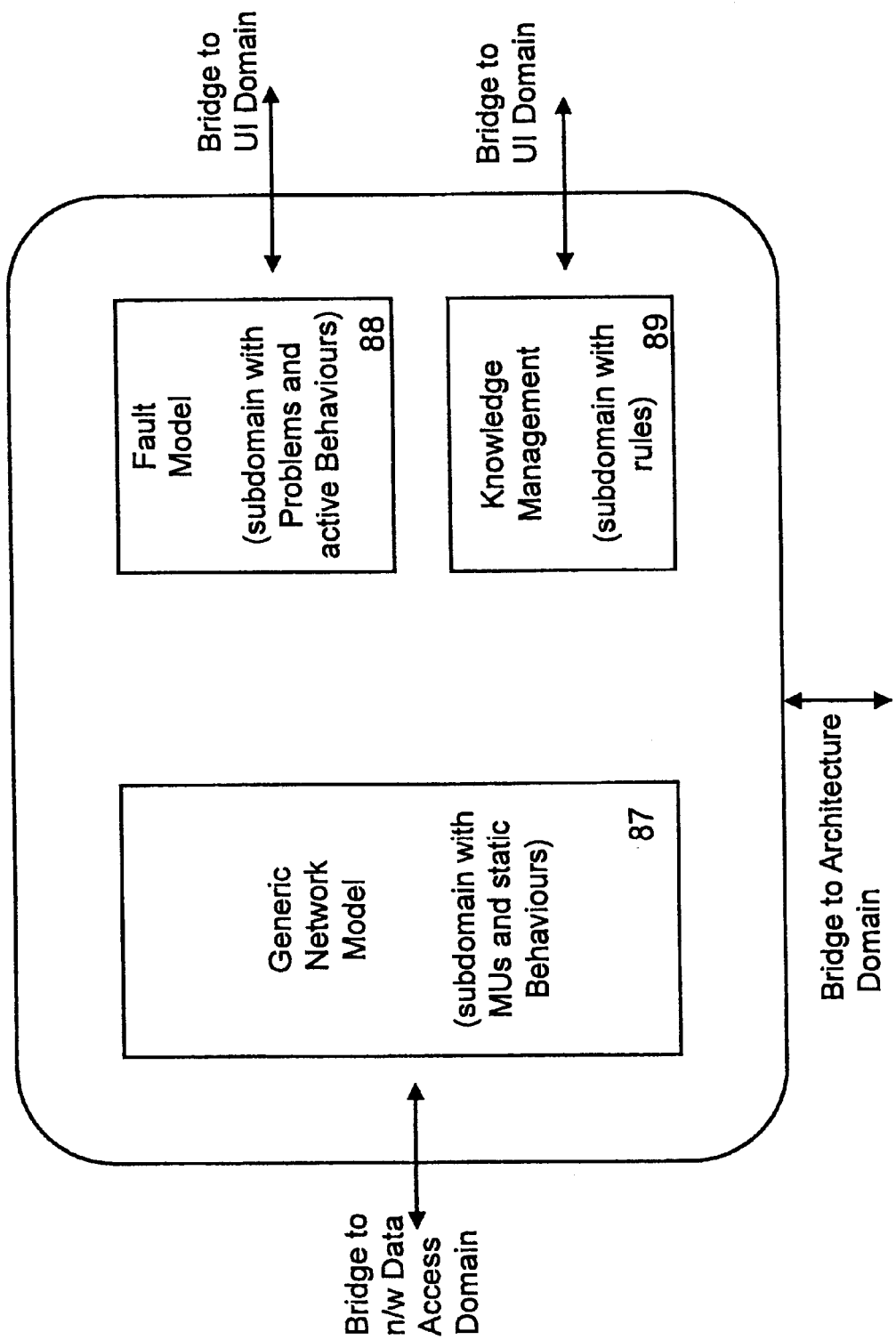
FIG. 8 shows the structure of the alarm correlation application of FIG. 7.

Introduction to Correlation Application Structure, FIG. 8

The general structure of the correlation application is shown in FIG. 8, and its function will be described in general terms before each of the elements are described in more detail.

The application can be divided into three sub domains, a generic network model 87, a fault model 88, and knowledge management 89. Broadly speaking, events are notified to parts of the model corresponding to the location of the event. The network model passes them to the fault model to update the model of possible causes of the fault. This is done by reference to rules in the knowledge management part. In turn, these rules may refer to the network model, and may cause it to be updated. Thus causes and consequences of the events propagate through the models. If the fault model determines from subsequent events and knowledge of network behaviour that a possible cause must be the true cause, the user is alerted.

Introduction to the Generic Network Model 87

The level of knowledge of network behaviour represented in this model of the network depends on how much is contained in other sub domains. Two examples of different levels will be discussed. In one of these examples, the model contains information about services received or offered between network entities. This is described in UK patent application 941227.1 in the context of capability management.

Introduction to Fault Model Subdomain 88

The fault model 88 contains knowledge on abnormal or unwanted network behaviour. As will be discussed below, such knowledge is organised in structures of problem classes, representing failure modes which cause alarms or other events. Instances of problem classes are created for possible causes of events as they are notified. The problem instances are allocated rules according to their problem class, to enable them to resolve for themselves whether the cause they represent is the true cause.

Introduction to Knowledge Management Subdomain

These rules are held in a structured way in the third sub domain, called knowledge management 89.

The level of complexity of the rules depends on the level of knowledge of network behaviour stored in the model 87.

The structure described combines elements of object oriented methods and knowledge based methods to achieve particular advantages. The separation of problem and rule base knowledge facilities rule reuse and access to rules.

Introduction to Inheritance Hierarchy within Sub Domains

Figure 9A:
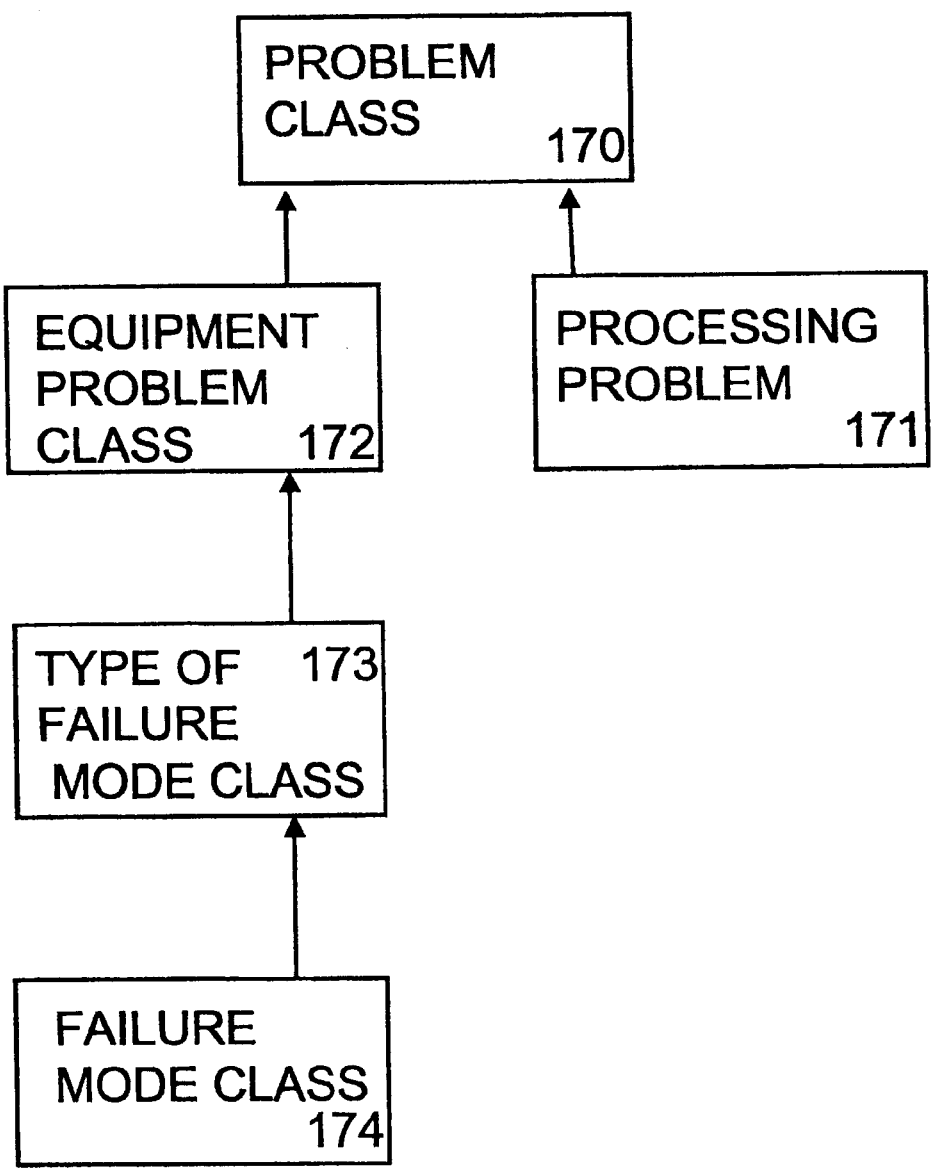
FIG. 9a shows a problem class inheritance hierarchy for use in the application of FIG. 7.

Within the fault model, problem classes can be arranged in an inheritance hierarchy, as shown in FIG. 9A. In practice there will be more classes than those illustrated. This means when a problem object instance is created, it can inherit generic characteristics such as references to rules, from higher levels of the hierarchy, as well as more specific characteristics. This facilitates development and maintenance of the fault model, since new failure mode problem classes can adopt generic characteristics, and such generic characteristics can be altered.

Within the knowledge management, a similar hierarchy structure can exist as shown in FIG. 10, with similar advantages. Rulebases 190, 191, and 192 are linked such that when a named rule is not present in one of the rulebases, it is made available from a rule base higher in the hierarchy.

Introduction to Dynamic representation of Problem Classes

When creating problem objects, there are advantages in representing problem classes in a dynamic form. As shown in FIG. 9*b*, if the problem classes are implemented in classes which have a static and dynamic part, the dynamic part connecting instances of the class to rules, the dynamic part held by the static part can be changed while a system using these classes for its operation is running. Thus existing problem objects will behave according to their old rules, while new problem objects can have new behaviour, and there is no need to stop the system when changing a rulebase.

Step 200 in FIG. 9*b* shows an event being received by a corresponding MU. Next, at step 201, if appropriate, a new problem object is created using one of the problem classes, according to the type of event. The problem instance has access to its class' static part, eg name and meaning of failure mode, and dynamic part, as shown in steps 202 and 203. Pointers can be used as run time data to connect to rules.

Overview of Problem Diagnosis Function

FIG. 11 shows a method of problem diagnosis used by the application of FIG. 7, expressed in general terms applicable to both the local reasoning and semi local reasoning examples which will be described below. An event is notified by the network system manager at step 140, and sent to affected problems at step 141. At step 142, the problems may change their own state and/or the state of the network model. Then at step 143 messages about changes are sent to affected neighbours or to a community of connected devices in the model. Again, these affected neighbours will send messages to their associated problems at step 141, the cycle is continued, until the effects of the event have propagated as far as possible. If any particular problem's state changes to true, from possible, then a diagnosis for that event is completed and the user is advised, at step 144. Rival possible problems are quiesced by the same message passing cycle above described.

Introduction to Local and Semi Local Reasoning

To limit the number of different types of messages each object would need to be able to handle, for a practical system, the messaging can be designed to be limited to messages between problems related to the same entity or between problems and their behaviour interactors. This is called local reasoning. If extended to cover entities in a limited community, this will be referred to as semi local reasoning. For the local reasoning case, this has the consequence that the rules can be simplified, though the network model needs to have a deeper level of knowledge of network behaviour. For the semi local reasoning case, the rules need to cover a wider range of possibilities, but the network model can be simpler. Broadly speaking semi local reasoning is easier to implement but slower to operate.

The structures and functions of the two strategies will now be explained in general terms with reference to FIGS. 12a–d and 13a–d.

Introduction to Semi Local Reasoning

FIG. 12a shows the structure of a small part of the generic network model 87. Managed units 91 corresponding to entities in the network, either physical entities such as line cards, or virtual entities such as virtual channels, are connected by passive interactors. These are objects which are shared by a pair of connected managed units. The passive interactor objects limit the communication between managed units, and may pass only messages relating to the state of services between managed units. Only three such managed units 91 are shown, for the sake of clarity.

For semi local reasoning, these interactors may be passive, whereas for local reasoning, they incorporate some of the knowledge of network behaviour, and are called behaviour interactors.

FIG. 12b shows a part of the fault model for the semi local reasoning version. The fault model contains problem classes for failure modes of each of the managed units shown in FIG. 12a. Instances of possible problems which could be the cause of notified events will be created in the fault model 88.

FIG. 12c shows the knowledge management for the semi local reasoning version. Rules for each of the managed units are shown. The problem classes shown in FIG. 12b will have references to these rules. For each managed unit, there must be rules representing how the behaviour of each managed unit is degraded by an internal problem with that managed unit. Furthermore, for the semi local reasoning version only, it is necessary to have rules representing how the behaviour of each managed unit depends on problems with other managed units in the community.

FIG. 12d shows the operation of the semi local reasoning version. An event arrives at its corresponding managed unit at step 121. It is passed to associated problems at step 122. Each problem object consults its rules to determine which to fire at step 123. Firing rules may change the state of the problem as shown as step 124. Alternatively, or as well, the event may be broadcast to a community of service linked managed units at step 126. At step 125 any change of state of the problem is also broadcast to the community of managed units. In turn, these managed units receiving the broadcast messages will pass events to their associated problems at step 122 and the cycle continues. In this way, causes and consequences of events are propagated through the network model. If at any time a problem state has enough information to become true, rather than merely being a possible cause of the event, the user is advised at step 127.

Introduction to the Local Reasoning Version

For the local reasoning version, the managed units 92 share behaviour interactors which control interactions between managed units 92. According to the local reasoning strategy, problems do not broadcast messages, or receive messages concerning any units other than neighbouring units connected via the behaviour interactors. Accordingly, the rules for each problem can be simpler, but the behaviour of the interactors need to have some knowledge of the impact of neighbouring managed units on each other in terms of services offered and received.

FIG. 13b shows the fault model 88 with problems for each of the managed units of the network model 87. FIG. 13c shows the knowledge management 89 for the local reasoning version. In relation to each managed unit, the rules need to represent how the managed unit is degraded by an internal problem or degraded interactor states. There is no need for the rules to represent directly how the behaviour is degraded by problems with other managed units.

FIG. 13d shows the operation of the local reasoning version. An event arrives at a corresponding managed unit at step 150. It is passed to its problems at step 151. Each problem consults its rule list to determine which rules to fire. Firing rules changes the state of problems at step 153. The problem in its new state asserts its MU and interactors service degradation causes and consequences at step 154. At step 155 affected interactors pass messages about degradation of services onward to MUs providing or receiving such services. Problems associated with such other MUs then consult their rule lists to determine which to fire, at step 152, and the cycle continues. Problems are continually trying to ascertain if they are the true cause of a particular event. If a problem state becomes true as a result of the propagation of causes and consequences, the user is advised of the diagnosis at step 156.

FIG. 14 shows the structure of a managed unit 193 supporting local reasoning. Services offered 194 to another managed unit 198 are represented in the form of an interactor object 196 shared between the two managed units. Likewise for services received 195. The behaviour 197 of the managed unit has lists of rules 199 which react to messages received and relate services offered to services received. Messages may also be output according to the rules.

Figure 15:
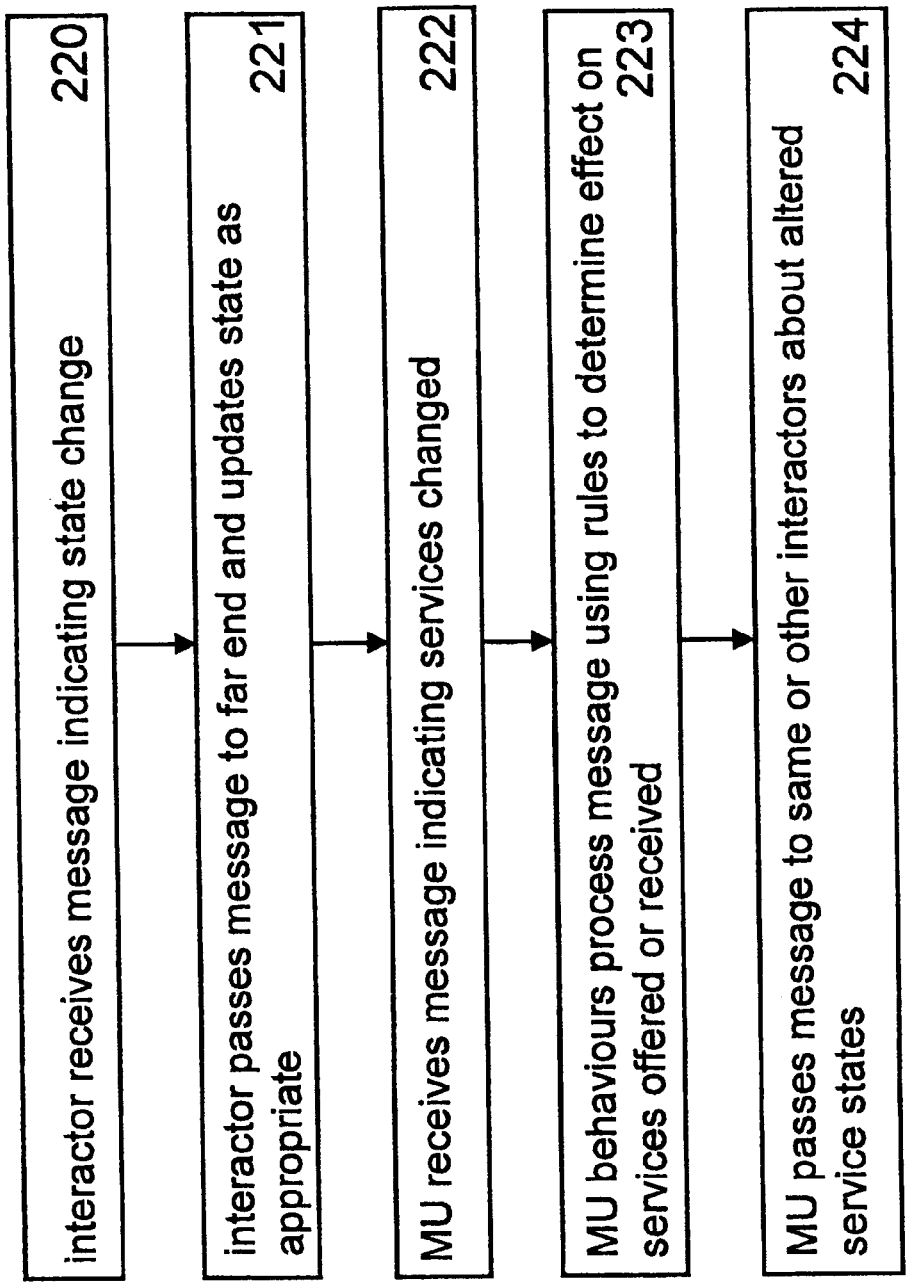
FIG. 15 shows managed unit and interactor object operation under local reasoning.

FIG. 15 illustrates the operation of the managed unit and interactor under local reasoning. At step 220 the interactor receives messages indicating state changes. The interactor passes the message to the far end and updates its state as appropriate at step 221. The managed unit receives a message indicating its services have changed at step 222, from the interactor. The behaviours of the managed unit process the message using rules to determine the the effect on other services offered or received at step 223. The managed unit passes the message to the same or other interactors about altered service states at step 224. At step 225, interactors send messages to their far ends, indicating services are changed at step 225, to propagate the causes and consequences to neighbouring managed units.

Figure 16:
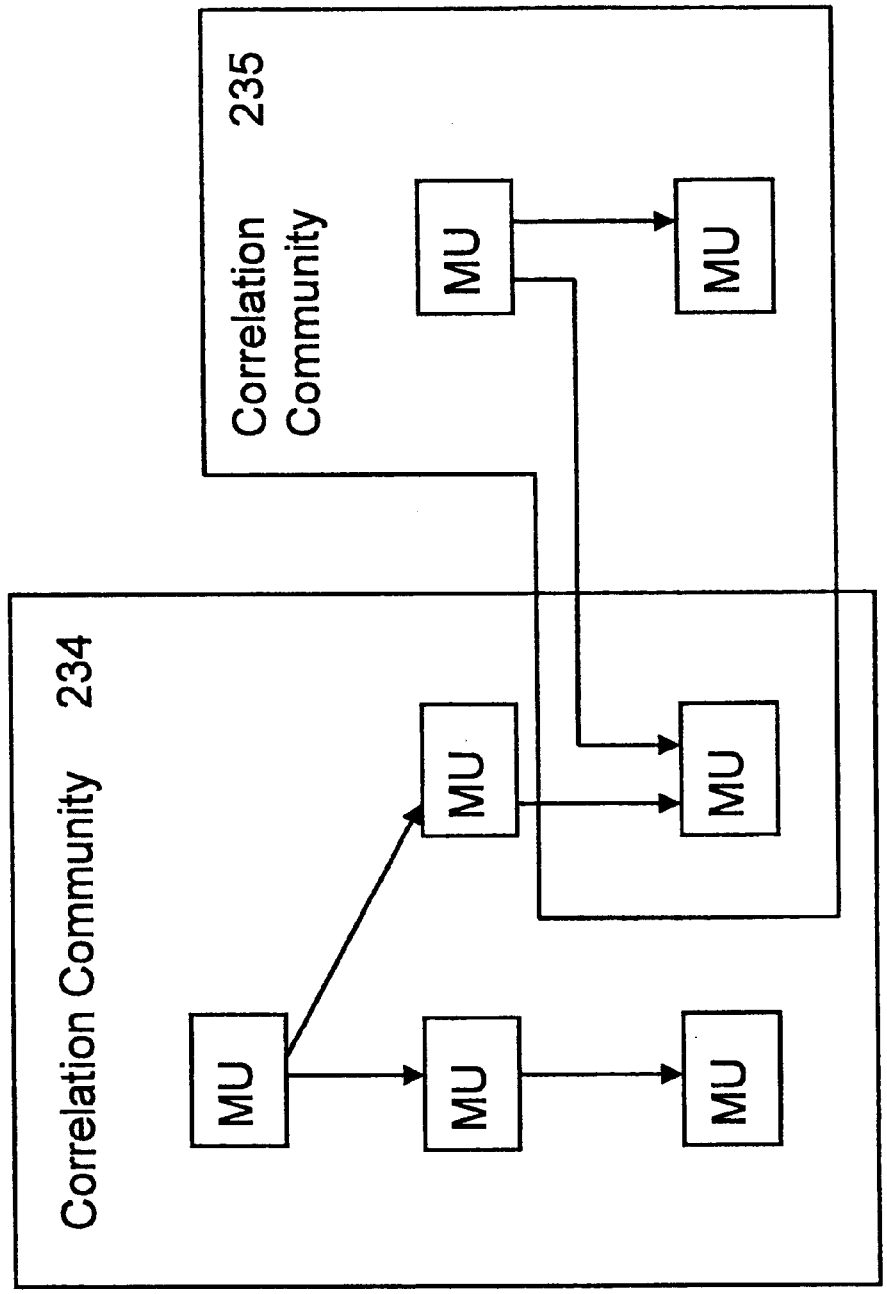
FIG. 16 shows communities of managed units suitable for semi local reasoning.

FIG. 16 shows how the managed units may be members of correlation communities 234, 235. These communities are made up of service linked managed units whose corresponding entities are functionally interdependent, such that bursts of alarms may relate to a single cause within the community. A single managed unit may be a member of more than one community. The communities serve to limit the reasoning to semi local reasoning.

The application domain will now be described in more detail, as the reasoning framework is located there.

1.1 Aims

The two principal aims of the alarm correlator are to provide:

a) a set of algorithms (using this word in a broad sense) to map disorderly partial sequences of events into fault diagnoses;

b) these algorithms requiring knowledge that is easy to gather and maintain.

Both the algorithms and the activity of knowledge acquisition must function within their (very different) performance constraints; real-time correlation in the first case, finite cost reverse engineering or minimal cost capture during development of the telecomms devices, in the second.

1.1.1 The Application Mission

A correlator inferences over a model of the objects in the network and their interconnections. The semantic richness of this model is part of the application and may exceed that of the network model held in the Manangement Information Base of the manager of the network whose alarms are being correlated. However, the data for this model comes exclusively from the network manager. How this is done is would be apparent to a skilled person and will not be discussed in detail.

A correlator also inferences over a model of (hypotheses about) the faults in the network and their interrelationships; this model the reasoning framework area constructs. Correlation is precisely the activity of producing from the available data the most accurate possible model of the faults in the network.

Faults are modelled as problems. Each problem is an offer to explain certain observed events. Hence, a problem may be a rival to, a consequence of or independent of another that offers to explain some of the same events. Problems communicate with each other via messages. Problems process the messages they receive using rules.

Two main strategies are envisioned for inter-problem communication.

1) Semi Local Reasoning

A broadcast strategy: problems broadcast messages that they cannot deal with alone to the correlation community (ies) to which their Managed Unit (MU) belongs. All problems of all MUs in the community receive the message.

2) Local Reasoning

An impact strategy: each problem computes the meaning of each message it receives in terms of impacts on the states of services of its MU. As these services connect the MU to its neighbours, impacts on them translate directly into messages to those neighbours' problems.

(In either case, a problem that acquires a given relation, e.g. consequence or rival, to another problem via a message may thereafter communicate with it directly when appropriate.)

The application domain models the functional design for achieving these strategies, independent of all performance considerations. As shown in FIG. 8, the application can conveniently be divided into three subdomains. The three subdomains, the Generic Network 87, the Fault Model 88, and Knowledge Management 89, have many and complex interrelationships. Each will now be described.

1.1.1.1 Generic Internal Model Subdomain

Network correlation requires a model of the network over which to inference. The Generic Internal Model is defined as a high level framework of classes and relations that are used to represent network data. The two strategies for interproblem communication require different levels of structure in the model.

The broadcast strategy requires a fairly basic model of which MUs are connected to others; the detail of what the connections signify is encoded in the broadcast rules which may traverse many connections while evaluating their conditions.

The impact strategy requires more substructure and better-defined interfaces between MUs as it only envisages rules whose conditions traverse a single link.

In the broadcast strategy, units of management (MUs) are connected by passive relationship objects called interactors. MUs are collected into communities which represent a group of connected MUs performing a common function. One MU may belong to several communities.

In the impact strategy, MUs are internally structured as sets of behaviours, some of which they can export as capabilities while others enhance capabilities they have imported from other MUs. Behaviours are connected by behaviour interactors (peer-peer by bindings and subordinate-superior by provisions). These induce the MU interactor connections of the broadcast model. The communities of that model are the roots of capability chains in this (N.B. a typical broadcast model would not implement all roots as communities but only such as seemed useful).

A general model, allowing for making and breaking of provisions and bindings, would enable the model to be updated automatically using a link to Configuration Management functions (CM). The interface between CM and Fault Management (FM) is a specialisation of this model that describe only a correctly connected network of functioning behaviours. This specialised model contains precisely those elements common to CM and FM. It has no CM-specific behaviour (it assumes a correctly-provisioned network) and no FM-specific behaviour (it assumes the absence of faults).

1.1.1.2 Fault Model Subdomain

Both approaches model faults as problems, representing aberrant behaviour of an MU (as noted, the impact strategy also models the normal behaviour—hereafter, just behaviour—of the MU). On a given MU, all such problems have the default (quiescent) state of 'not present' and a variety of active states. (Similarly, the MU's behaviours have default state of 'normal operation' and a variety of 'behaviour degraded' states, as far as FM is concerned.)

The basic hypothesis of a problem object is that the MU has that problem. In the impact strategy, the basic hypothesis of a behaviour is, on the contrary, that any malfunction in it is due to malfunction in other behaviours supplied to it by other MUs. The problems capture the FM information of how a fault on an MU can degrade that MU's behaviours. The behaviours capture the CM information of how one MU depends on others to perform its function. In the broadcast strategy, by contrast, this information is also held by the problems which must understand their remote as well as local consequences.

MUs receive alarms and other events from the devices they manage (over the bridge from the SM-application domain). They send these to their hypotheses which may react by changing state and/or emitting further messages. The behaviour of hypotheses when receiving messages is governed by rules.

1.1.2 Knowledge Acquisition

The rules that govern hypothesis behaviour must be designed and written for each network following a knowledge acquisition process, and maintained and configured to suit the needs of customers. The method by which this is done would be apparent to a skilled person and is not described in detail. However, the advantages claimed by this invention include making knowledge acquisition and maintenance easier and how it does so will be described below.

1.2 Relationships betwen the Invention's Functions and External Functions

The application places the following requirements on other domains.

1.2.1 System Manager

This must provide the data required by correlation algorithms from its MIB. This data must be provided to the required performance.

The application can accept network data (configuration and state) synchronously or asynchronously, the latter being handled by the mechanism of expectation events or by splitting a rule into two halves, one raising the request the other firing on the returning event.

The quality of correlation is a function of the quality of information available from the system manager.

1.2.2 User Interface (UI) Domain

The user of the application has a number of tasks to perform at the class level that require UI support.

Impact strategy alarm correlation class relations: the user will wish to assign Problems to MUs, assign Messages to Problems via Rule Name(s) and to write rule implementation for Rule Names for a chosen RuleBase. Whenever performing one of these tasks, the user will wish to know the current context of the other two. They may move rapidly between them.

Broadcast strategy alarm correlation class relations: as above plus the user will wish to define which messages get broadcast to which communities by which MUs.

Broadcast strategy internal model class relations: the user will wish to assign MUs to communities. (It is assumed that each community corresponds to an MU that is a higher or lower root of a capability chain for compatibility with the impact strategy. In a model supporting the broadcast strategy, the chain may not be defined but the existence of the root MU may be assumed.)

Impact strategy internal model class relations: as for problem, the user will wish to assign behaviours to MUs (s), assign Messages to Behaviours via Rule Name(s) and write rule implementations for Rule Names for a chosen RuleBase. Hence, the same UI is implied.

The user will also wish to assign MU interactors to MUs and assign behaviour interactors to behaviours The impact strategy's ability to put event-problem relationships into data allows a UI in which the knowledge engineer would program such data structures directly rather than coding them in rules.

The user of the application framework also has tasks to perform at the instance level that require UI support, namely control and configuration of the run-time alarm correlator, display of problem and alarm data, display of rule debugging data The injection of real or simulated events into the SM to test the AC will require a suitable interface to the SM.

1.2.3 Infrastructure

A change control mechanism will be needed, including mechanisms for checking the compatibility of given versions of MUs, Problems and RuleBases with each other when constructing an image.

1.3 Implementation Aspects

Hypotheses' rules are stored in RuleBases and supplied to them via a performance-efficient indirection mechanism which will handle the case where default and active states of a hypothesis have the same relationship to a given message class.

A hypothesis in its default state on an MU in the application domain corresponds to that MU having no hypothesis instantiated in the architecture domain. Instead, the MU (class) has a link to the hypothesis class.

Related to the above, behaviour interactors reference their induced MU interactor and the connected behaviours' classes whenever said behaviours are in their default states.

In using distribution to implement the correlation algorithms to the required performance, appropriate granularity of reasoning processing per unit of event receipt processing must be provided. This means:

order-independent processing of SM events: the engine is not required to process events from the system management platform in the order in which they arrive or in any order as the rules must function on events arriving in any order.

(Note: this does not prohibit, indeed it allows, ordering the processing of incoming events according to some policy to maximise performance. It is an anti-requirement, a permission.)

state-consistent processing of rules: while a rule is causing a state transition of an MU, Interactor, Problem or Message, the object involved must not be read or written to by another rule: equivalently, rules should only fire on objects in states, not on objects transiting between states. If two rules may want to perform operations on overlapping sets of objects, the protocol must include a mechanism to avoid deadlock.

Order-dependent processing within message trees: let a partial order on messages be defined by each network event arriving from the SM being a distinct root and a message being lower than the message that fired the rule that created it. Then the requirement is that the order in which a given problem processes rules fired by two messages must not violate this partial order.

Less mathematically, if a problem receives two messages, and if one of these messages was created by a rule fired by the other, then that problem must fire all rules that will be fired by the creating message before it fires any that will be fired by the created message.

(Note that breadth first processing (one of the ways of meeting this requirement) is much stronger than this minimally requires but ensures no deadlocks. Arranging that no ruleset of the created message will be fired before all rulesets of the creating message is slightly stronger than this minimally requires. The requirement relates only to the order in which rules are fired on a given problem; there is no requirement for the firing of rules on two different problems to respect the partial ordering of the two messages that fired them.)

The advantage of this requirement is that if the customer writes rules, it can be assumed they understand the disordered input of external events. They cannot reasonably be expected to understand any disordering (e.g. caused by distribution) of the internal AC events that resolve these external events. An AC developer is not so absolutely unable to handle disordered internal events but as the rule base grows, they would find the burden of allowing for them onerous.

2. The Generic Network Data Model

The correlator's task is to build a model of the faults in the network. It builds this on a model of the network. When the fault model asserts the degradation of the service state of an object in the n/w data model, the latter provides the information for how this degradation impacts the states of other related objects.

2.1 Introduction

This section discusses what is modelled and how it is modelled.

2.1.1 Design Aims and Constraints

Constraints on, and trade-offs for the design of the internal model are:

the information necessary in order to perform correlation:
  need the concept of a correlation community for the broadcast strategy
  need the concept of a service for the impact reasoning strategy
the desire to build a system suitable for service impact analysis (SIA) too: need the concept of a service to be included partly to support this
the difficulty of writing the rules (related to previous point)
the need to maintain correspondence with a range of external models A restriction on encoding information in the model is that it must be available from the SM's MIB (or equivalent), at least as regards instance level information. Each network is different and it must be possible to derive class level information needed by the internal model from the network information automatically in some cases. Usually, class level information will have to be added during the creation of a particular AC application.

2.1.2 Data and Knowledge to be Modelled

The generic network model data over which the fault model reasons is a chosen set of real or virtual network objects state data about the internals of these objects configuration data about how these network objects are related to each other Changes to the latter two types of data may be advised by the same event mechanism as supplies the first—discovery events, etc.—or by some other means. This data may influence the fault model which may also predict its values or occurrence.

In addition to the above instance data (data), there is class data (knowledge). This includes configuration knowledge about (extra-object) service provision: what services network object classes can produce and consume, hence how these classes can be connected (intra-object) service production: the relations between services consumed by a network object and those it supplies to others; also the relations between these and the object's internal behaviour There would also be configuration/FM knowledge about what events (in particular, what alarms) an object can raise and in what states. (This relates to AC knowledge about what problems a network object can have and how these impact its states and the events it raises, which lies outside the internal model).

2.1.3 Data Acquisition for the Internal Model

State and configuration data to populate the internal model is obtained from the SM MIB. Should the application seek further data from the network, it expects it to be returned synchronously, or in an event which it can use to fire a rule on the requesting problem.

2.1.4 Knowledge Acquisition for the Internal Model

Ideally, configuration knowledge will be gathered and made available in a machine readable form, preferably as part of the SM functionality. It should be encoded in the correlation community classes the MU and Capability classes the internal behaviour of MUs (services consumed=>services produced; capability rules)

There are two places that the knowledge needed to correlate alarms can be stored: in the rules and in the model. The more that can be encoded in the model, the less needs to be put in the rules (and the more generic and less numerous they can be). Hence, we expect some AC knowledge to be gathered as detailed configuration knowledge, specifically as intra-object service production rules (services consumed unavailable to degree Y=>services produced unavailable to degree X; extended capability rules).

2.1.5 Order of Model Development

The various dimensions of the class side of a specific internal model for a given application area may be developed as follows:

a) The pure configuration model (also known as the stateless CM model): this model has MU classes with named (typed) capabilities that they export and import. It also has named (typed) peer-peer bindings and (exporter-importer) provisions. It has no capacity to show any object functioning abnormally.

This model may be the output of a CM process or the necessary first stage of developing the full model. It is adequate to support the broadcast strategy since roots of capability chains can be used to identify correlation communities and the binding and provision links support tracing of MU relationships within communities.

Note that for CM purposes, the above model would allow disconnection and reconnection of MUs. For FM, the subset that deals with correctly provisioned networks will be used (no free-floating MUs).

b) The CM model with interactor state (as regards FM, that is): the stateless CM model assumed that everything always worked; that is, it had no means of indicating that anything was not in an ideal state. Interactor (FM) state can be added to it by assigning failure states to each type of binding and provision.

This model simplifies rule writing by providing a set of failure states that MUs can use to signal impacts to each other. Thus it can support the impact strategy.

c) The interactor-state CM model with behaviour state and capability rules: to the above model, we add behaviour (FM) state to it by assigning failure states to each type of behaviour. We then add capability rules mapping failure states on an MU's inputs to failure states of its behaviours, and failure states of its behaviours to failure states on its outputs.

This model is now fully developed as regards configuration. (The capability rules may be rules in the implementation sense, or a table of state relations held by the MU and driven by generic implementation rules, or a mixture of the two with generic data driven behaviour being overridden in some specific cases.)

2.2 Notes on Term Definitions

This section provides additional detail on the definition of some terms used above, to assist understanding.

2.2.1 Management Units

There are various definitions of what constitutes a valid MU class. One is that an MU is a replaceable unit (so that, for example, one would allocate termination point MOs to the MUs of selected adjoining MOs on the grounds that one cannot tell the user to go and replace a termination point). This is our policy for physical objects.

At the logical level, there are no RUs and so we model alarm-raising Mos as MUs. However, MOs that are true components of others may be grouped at the logical level too. Another form of grouping likely at the logical level is collection MUs (also known as extents): single MUs that, to save object overhead, represent not one but a collection of MOs.

2.2.2 Communities

A community is defined as a group of MUs, so connected that, for a reasonable proportion of problems on community members, a burst of alarms caused by a problem on one member of a community is wholly received by MUs within the community. We must provide communities to support broadcast reasoning.

Communities are identified with capability chain roots so that they are integrated with the capability hierarchy aspect of the model. This is logical since for a group of MUs to be affected by a problem, they must be concerned in the function affected by the problem. Nevertheless, it should be noted that communities do not need capabilities to be modelled. (Indeed, their modelling can help later capability modelling.) The broadcast reasoning strategy uses communities based on upper and lower roots of capability chains.

2.2.3 Integrating Peer-Peer and Hierarchic Capability Connections

Regarding links between MUs, the model supports:

peer-peer links between MUs and hierarchic links to collect together MUs to form higher level MUs It integrates these two forms of relationship by a constraint as described in the next section.

2.3 Capability Modelling Revisited

To explain how to implement integrated peer-peer and hierarchic capability modelling, it will be described as a simplification of a richer modelling technique.

2.3.1 Rich Abstract Capability Modelling

Network models are constructed from MUs. Each MU has
a) behaviour: an extended finite state machine (EFSM) with transition guards models the MU's behaviour
b) ports: a port has an alphabet of messages and message sequences that it can input and output. Ports may be bound to each other, thus establishing connections between MUs.
   behaviour ports: these are ports that interact with the MU's behaviour; messages arriving at them may trigger transitions in the EFSM. They are classified as
   external ports: these may be bound to the external ports of peer MUs or to the internal ports of containing MUs
   internal ports: these may be bound to the external ports of contained MUs
   relay ports: these make external ports of contained MUs available as external ports of the containing MU directly, i.e. without interacting with the containing MU's behaviour Bindings between ports are relay bindings, connecting two ports of the same type (one of which will be a relay port), and transport bindings, connecting two ports of conjugate types.
c) containment relationships: an MU may be contained within another MU. Each of its external ports may be bound
   to one of the container's internal ports via a transport binding
   to an external port of another MU contained in the same containing MU via a transport binding
   to an external port of the containing MU via a relay binding
   Each unit of port functionality can be bound within only one other MU although the MU as a whole may be contained within many.

In this approach, an MU exports capability by providing one or more ports (usually two) to its containing MU plus the behaviour (its own or encapsulated from MUs within it) associated with those ports. An MU imports capability by binding the ports of the imported capability to its own external relay ports, to its own internal behaviour ports or to other imported ports (internal to it, external to the other MU whose capability it also imported).

2.3.2 Simplified Capability Modelling

The above can describe any telecomms system we might want to model but is too rich for the requirements of this invention. Algorithmically matching behaviours and ports, as defined above, to establish valid capability provisions would be a hard problem and there is no need to define MU classes in such detail. Hence the model will be simplified as follows.

In place of ports with valid input messages and sentences, ports with one of a few named types are used.

In place of the EFSMs, or composite machines built from imported ones and enhancements, that were connected to these ports, named capabilities are used.

In this approach, a capability offer is a collection of external ports of specified type, all belonging to the same MU, plus a named capability, also with type information attached, spanning these ports. The capability name summarises the behaviour attached to the ports that transforms their inputs into their outputs; i.e. it describes the type of behaviour offered. The capability type identifies the granularity with which that behaviour can be offered.

A capability requirement is likewise a set of ports (of conjugate types to those of the offer ports) and a capability name describing the behaviour required between these ports.

2.3.3 Simplifications for the Alarm Correlator

Figure 17:
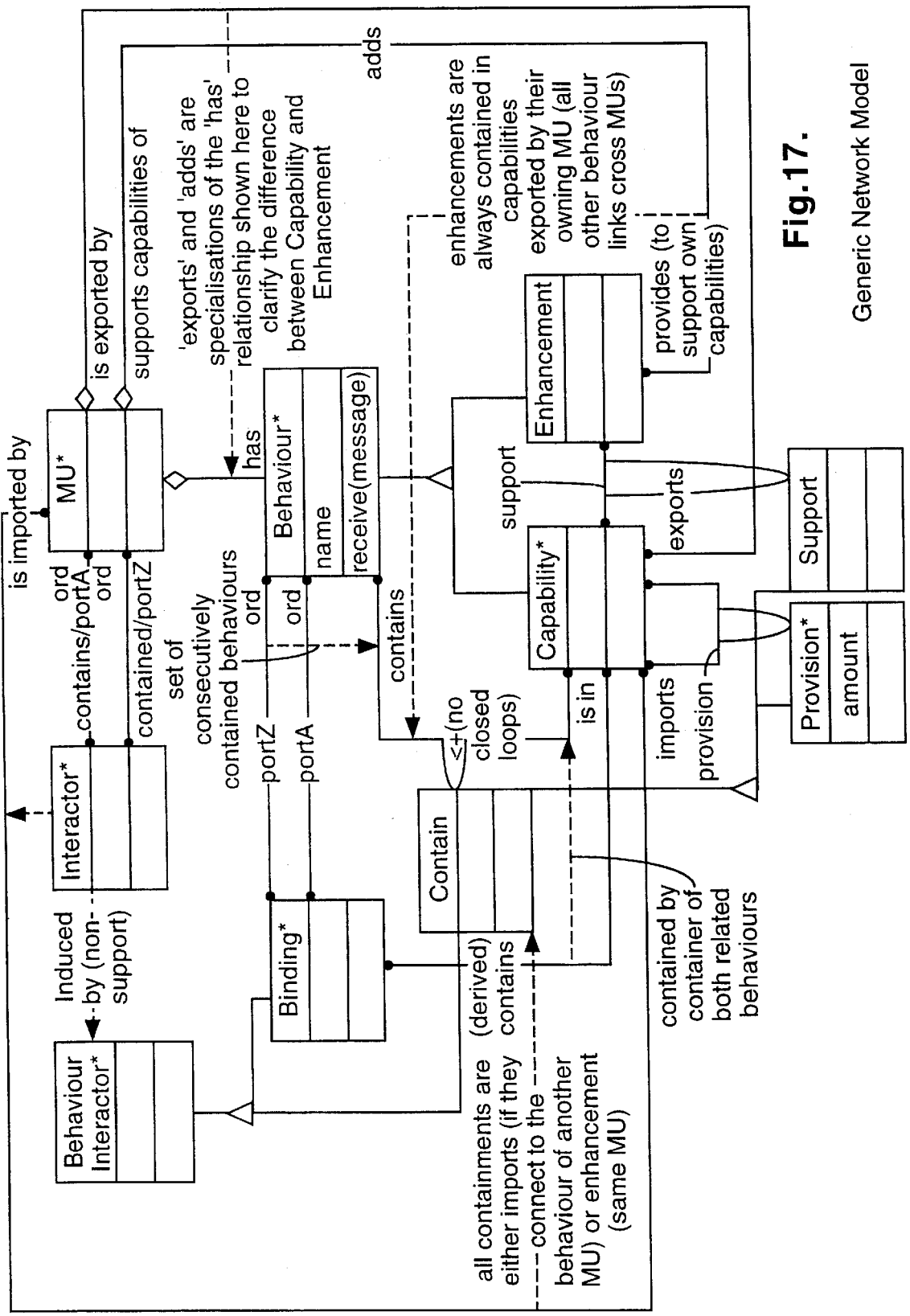
FIG. 17 shows the generic network model used to model a network in terms of managed units and their interactions-.
Figure 18:
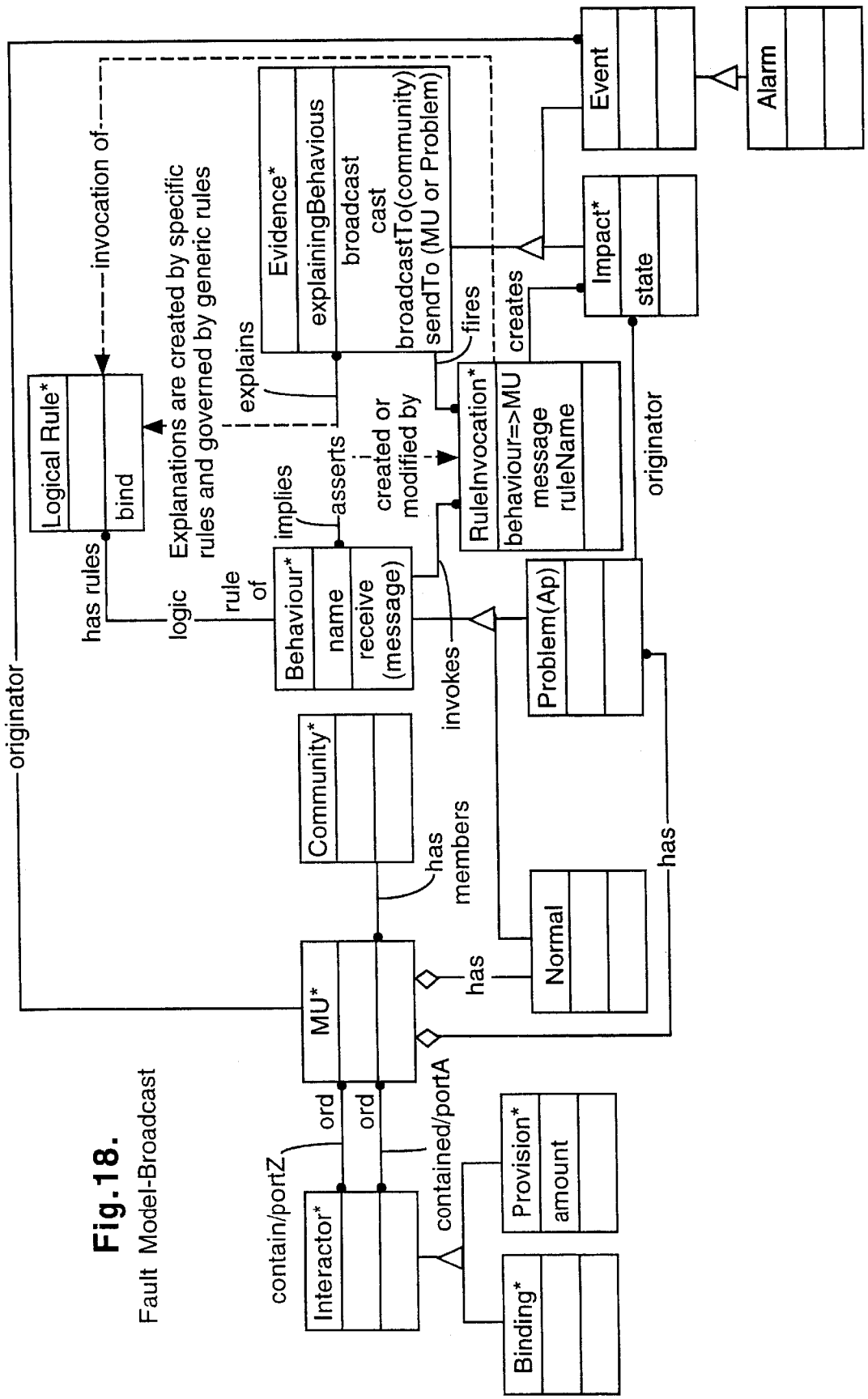
FIG. 18 shows this model extended by the fault behaviour of the managed units to support semi-local reasoning about the location of faults.
Figure 19:
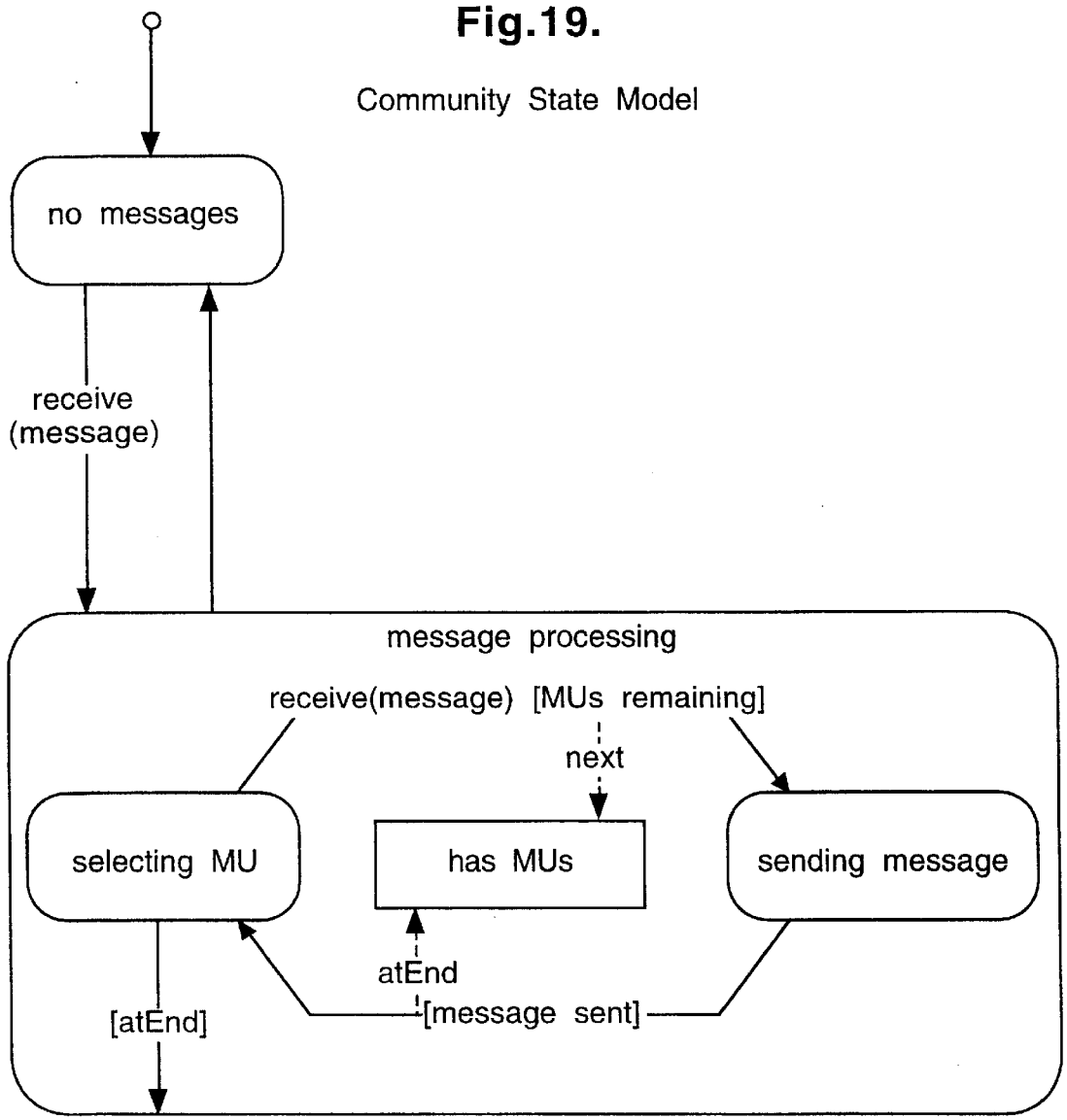
FIGS. 19, 20, 21 and 22 show state models of objects with non-trivial behaviour in this model.
Figure 20:
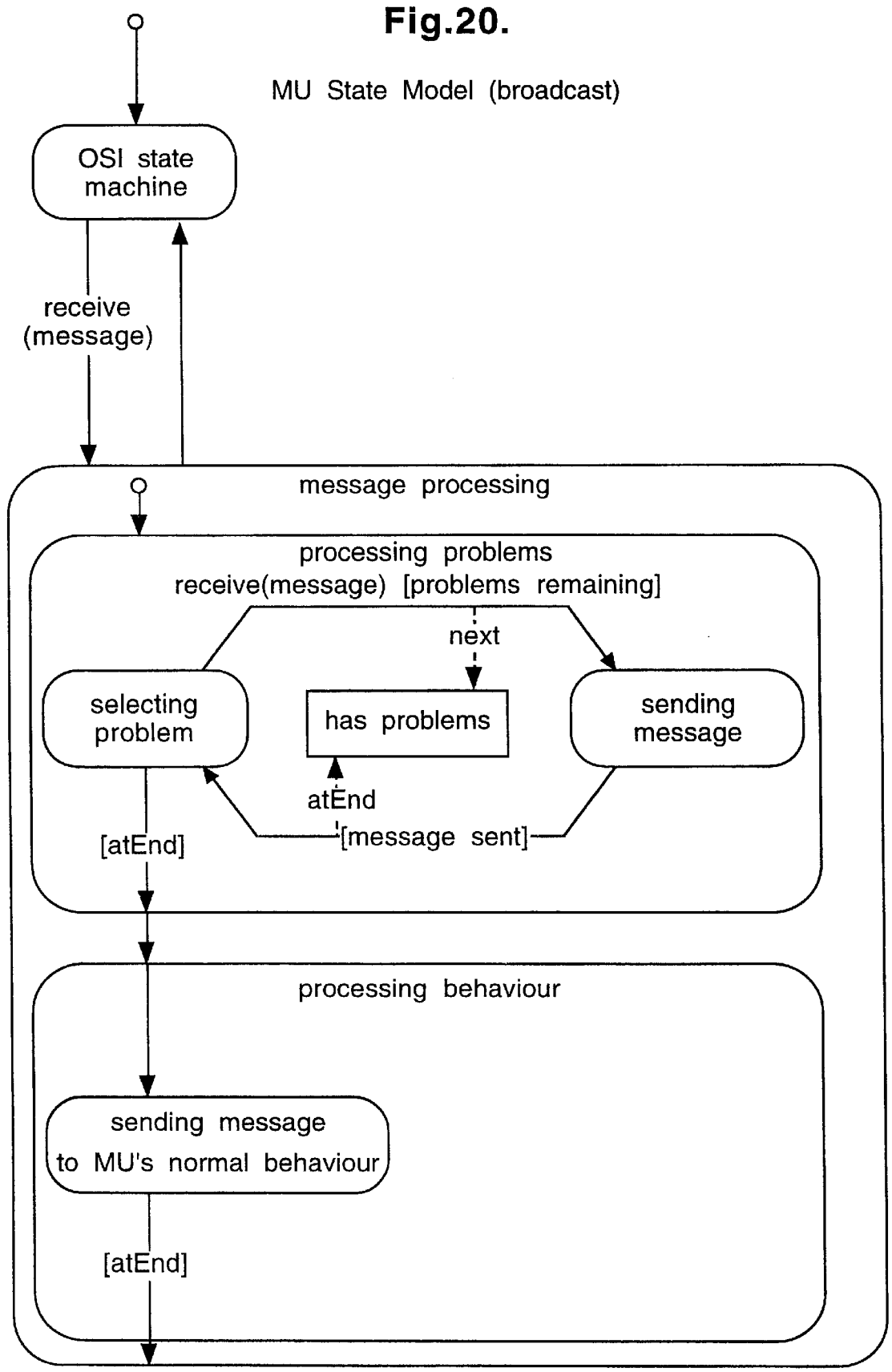
Figure 21:
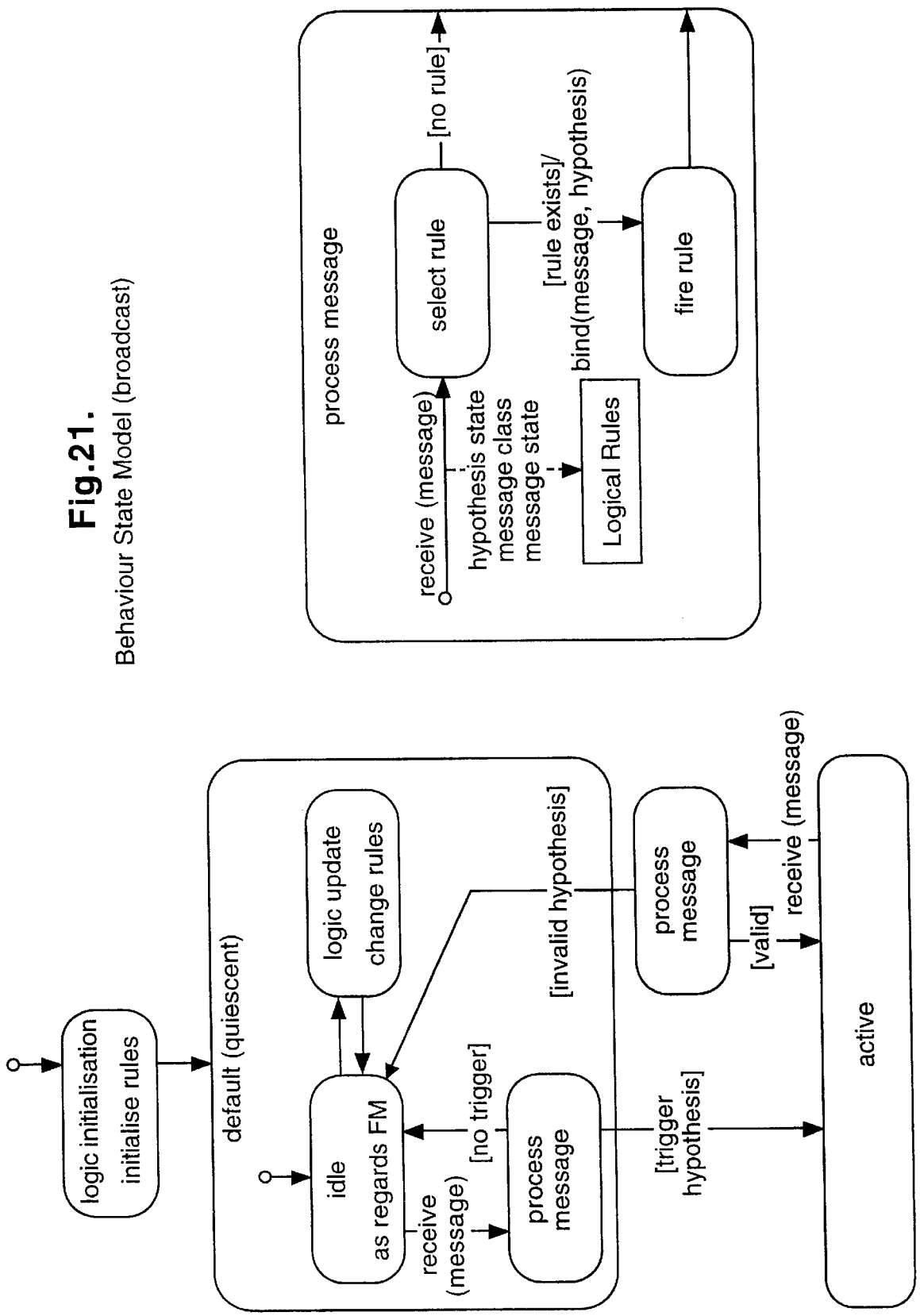
Figure 22:
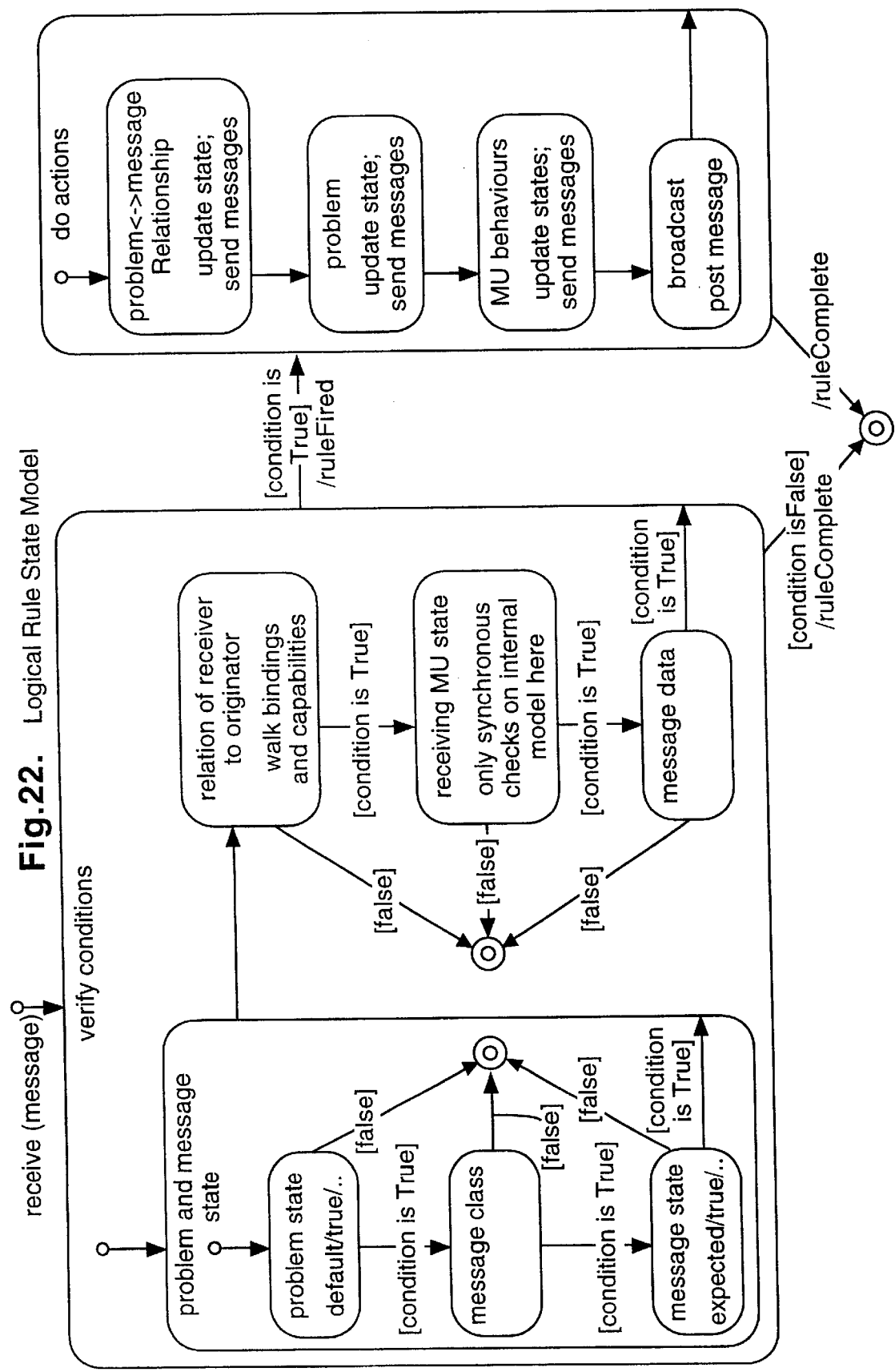
Figure 23:
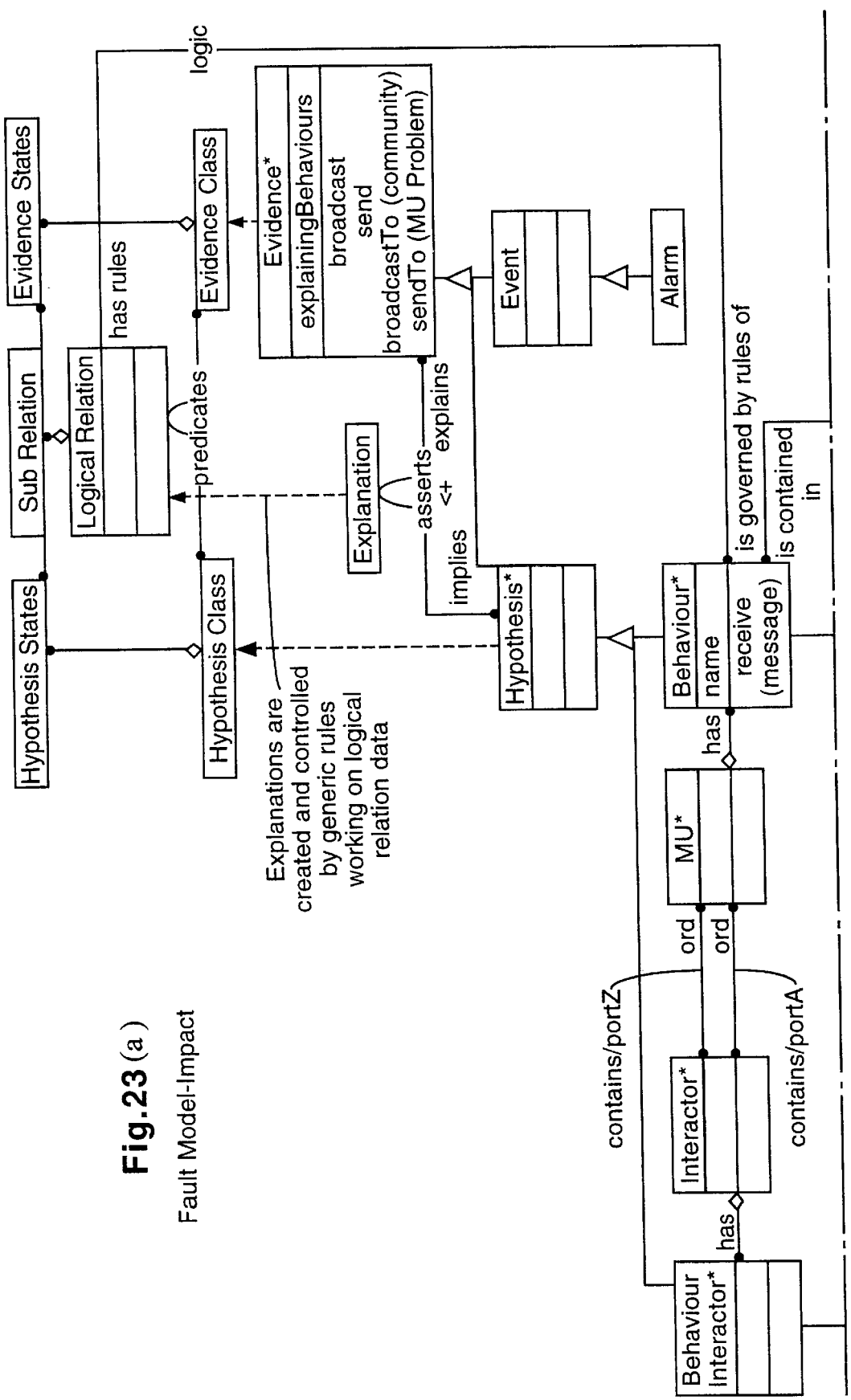
FIG. 23 shows this model further extended to support purely local reasoning about the location of faults.
Figure 23:
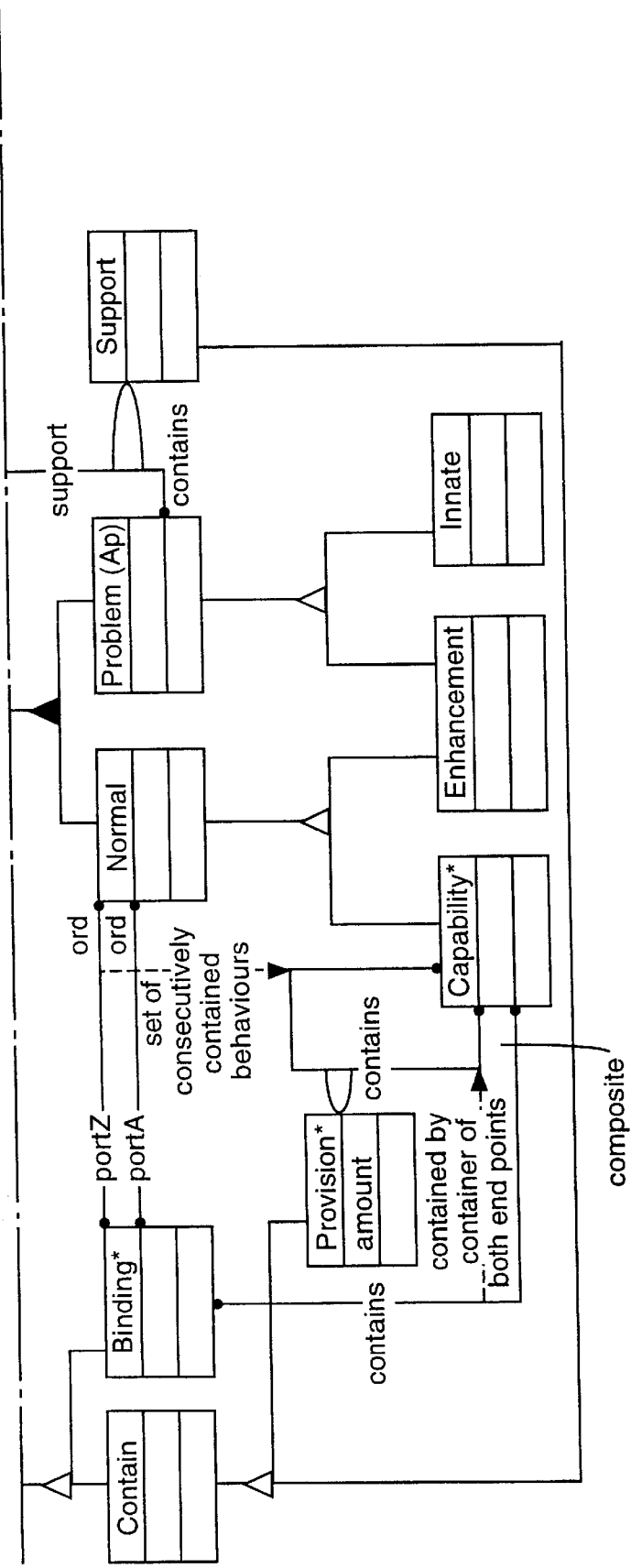
Figure 24:
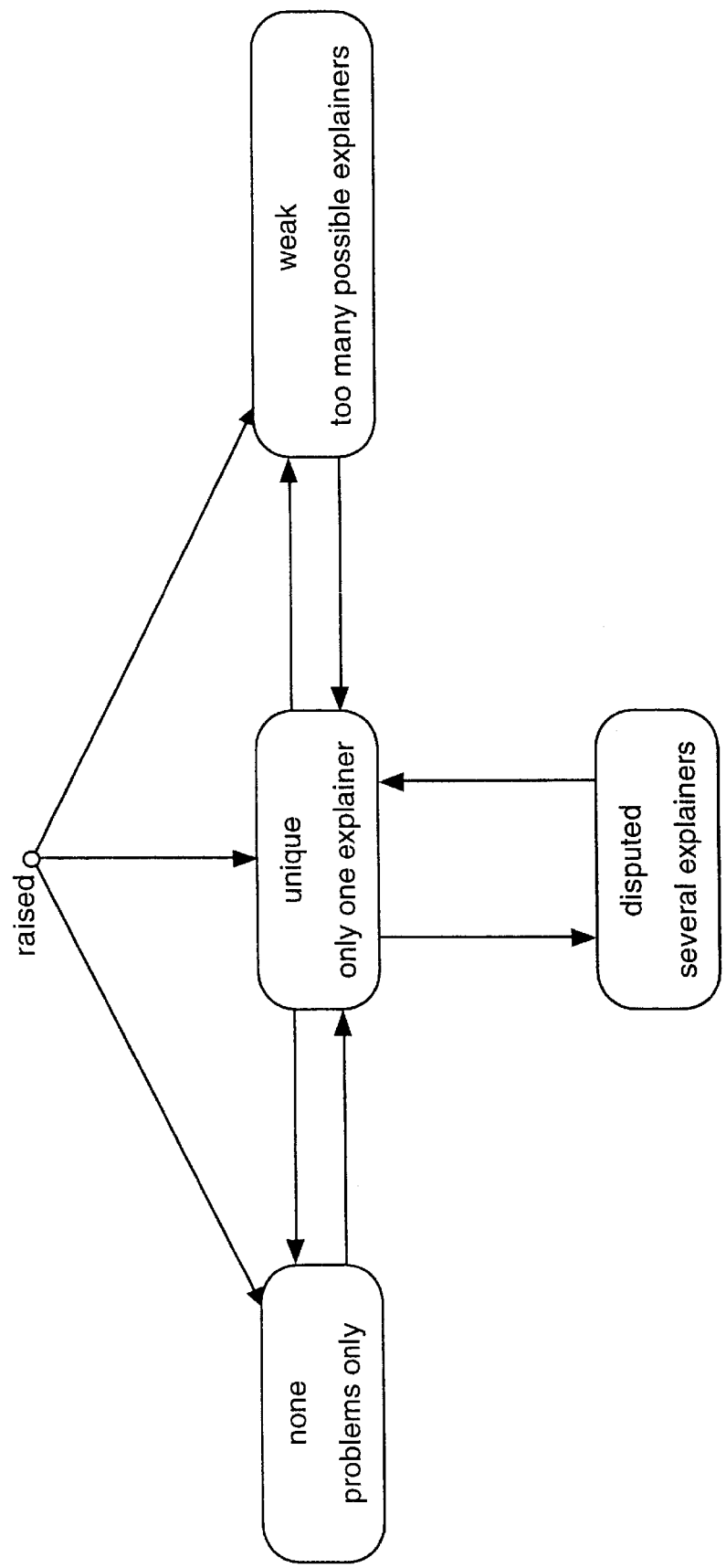
FIGS. 24, 25, 26, 27, 28, 29 and 30 show state models of objects with non-trivial behaviour in this model.
Figure 25:
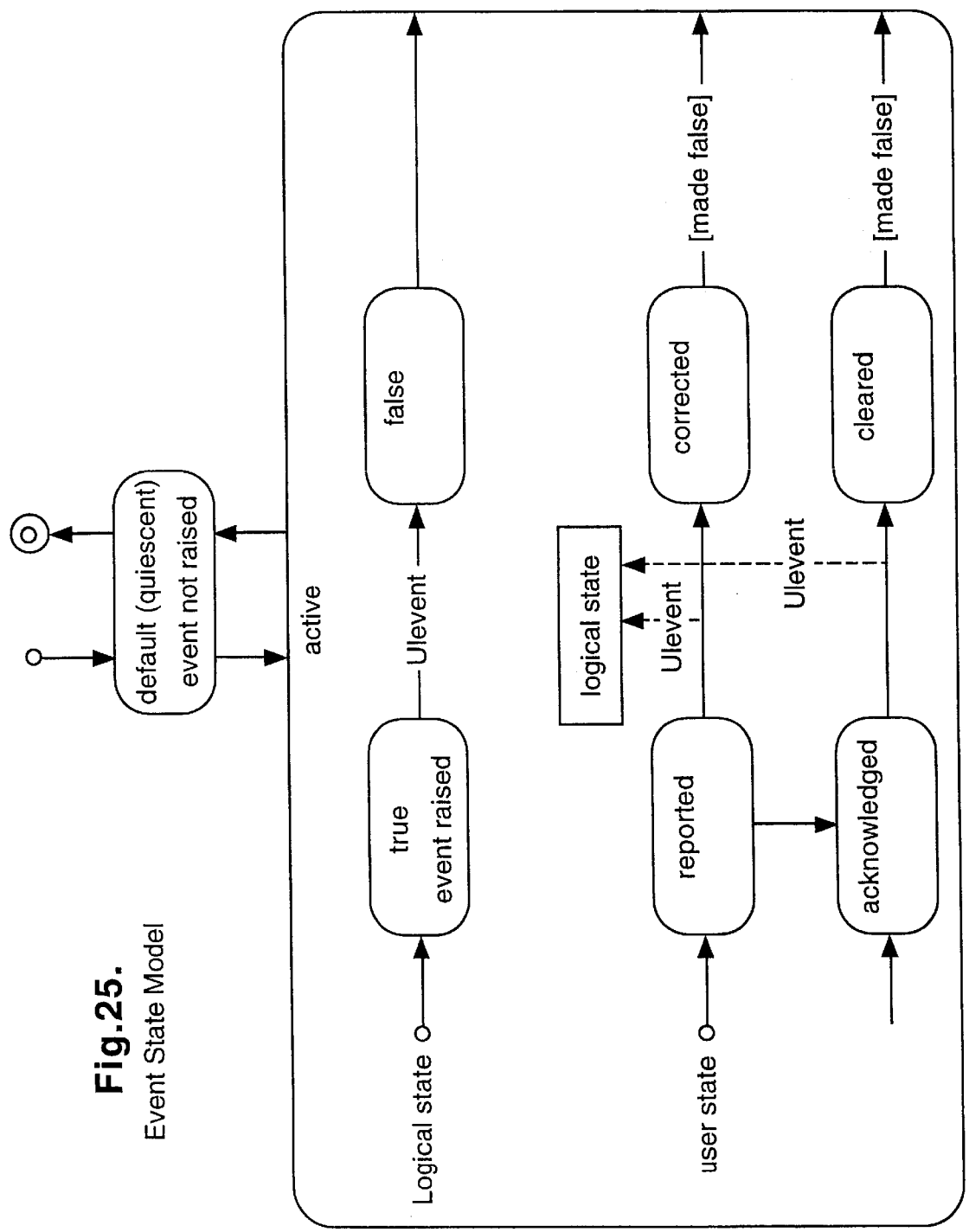
Figure 26:
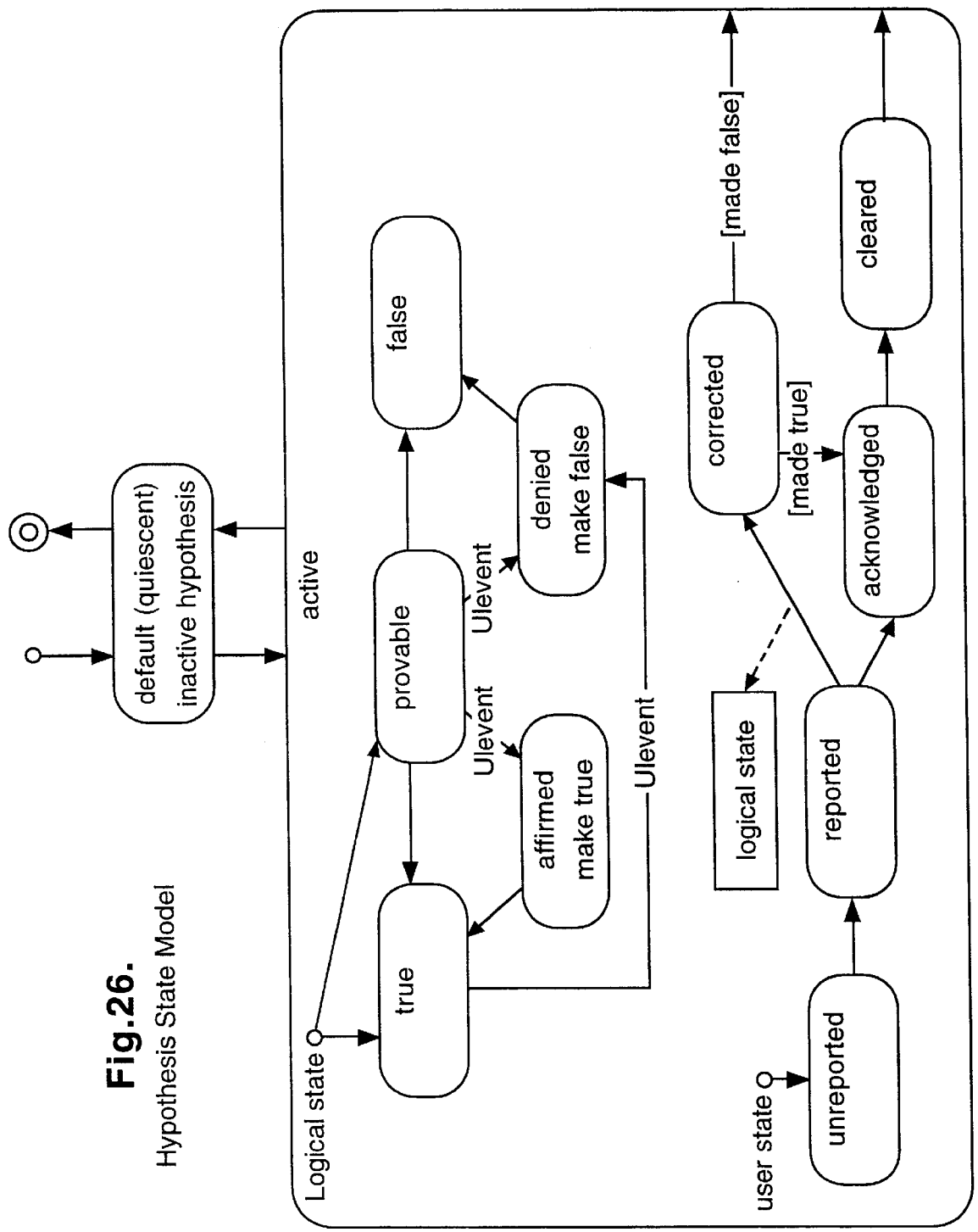
Figure 27:
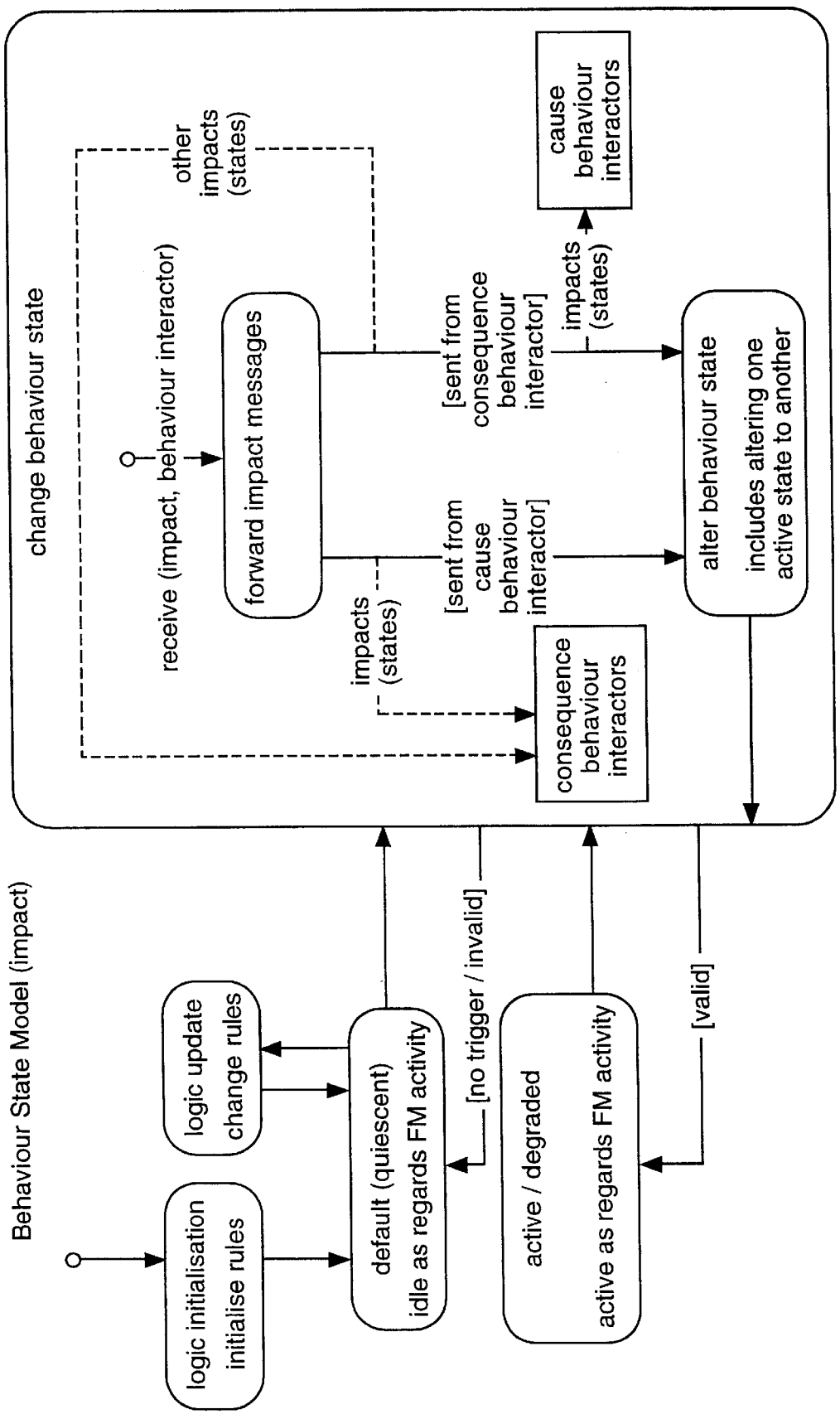
Figure 28:
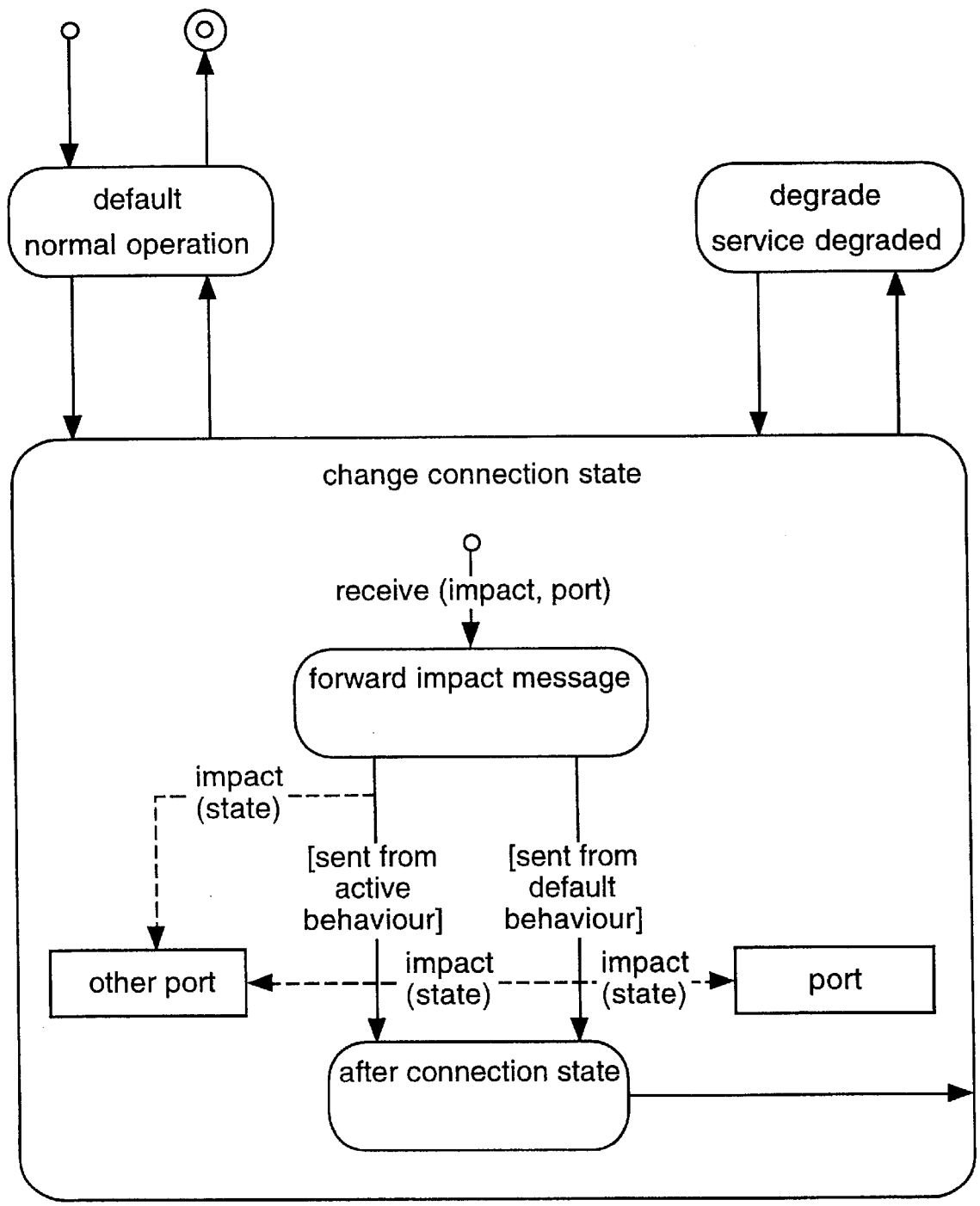
Figure 29:
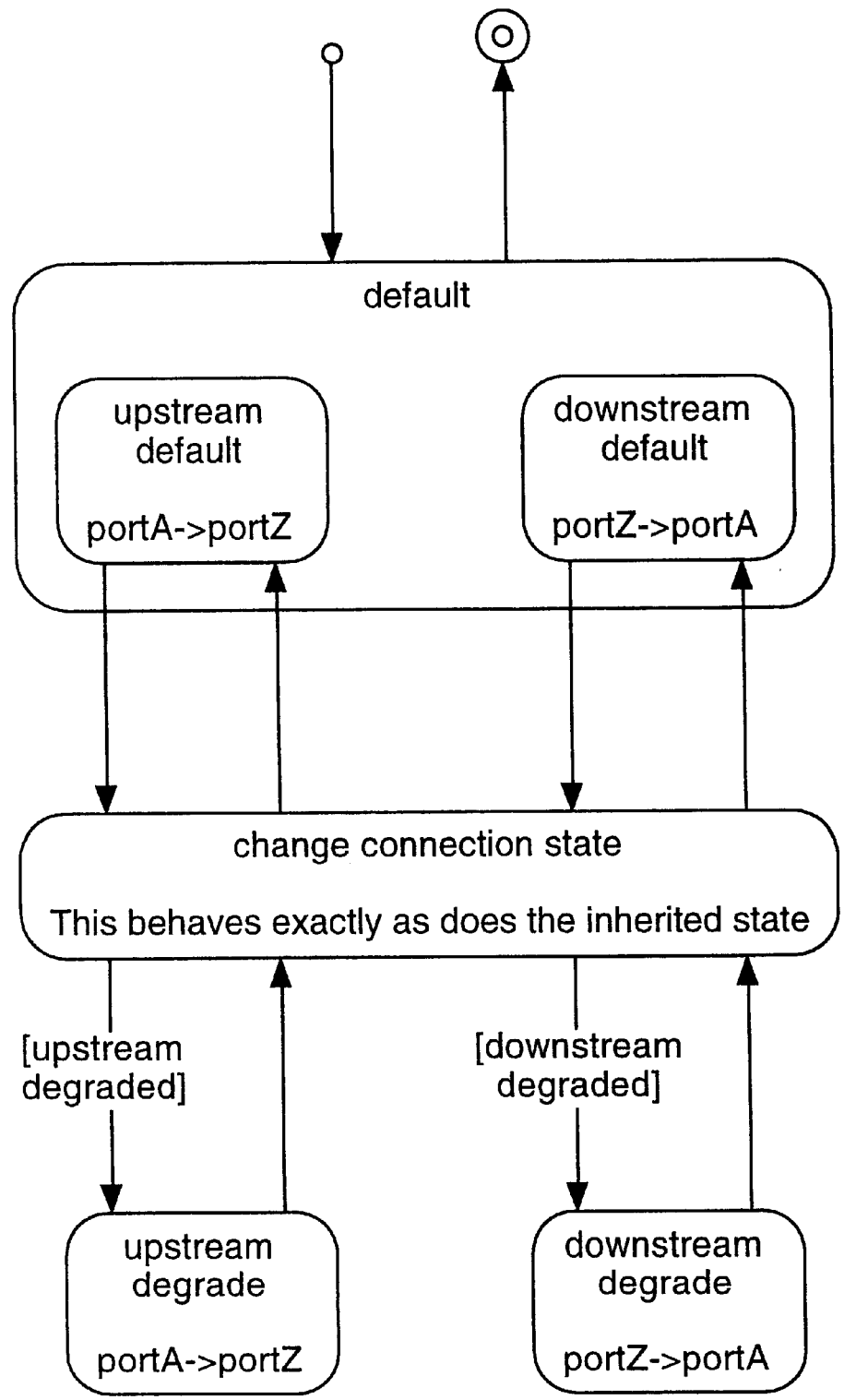
Figure 30:
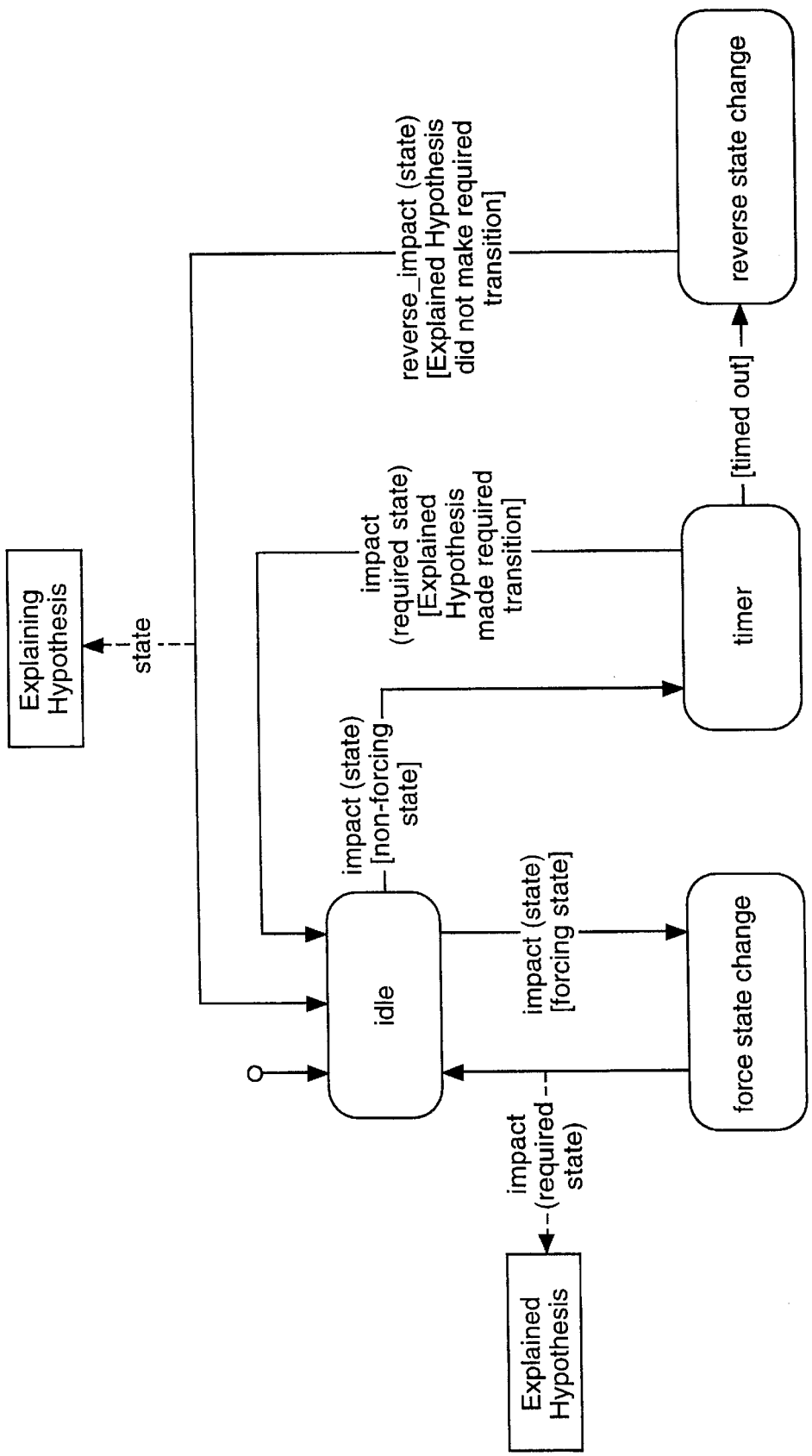

The AC can assume that it is dealing with correctly provisioned chains: no 'free-floating' MUs are possible. Hence certain simplifications are possible (c.f. FIG. 17).

A binding of two conjugate ports can be modelled by a single object relating two behaviours (and thence between two MUs): hence the port object becomes the port relationships between the binding and behaviour objects. (Note: at the detailed implementation level it may nevertheless be implemented as a collection of three closely related objects for efficiency reasons.)

A relay binding can become a relation between a port and the containing MU. Hence the relay port object becomes the manyness of the external port's relationships.

2.4 The Generic Internal Network Model

At this stage in the modelling, there is a static (as it is correctly provisioned and nothing ever goes wrong) model of MUs containing behaviours connected by bindings and capability provisions. This is illustrated with a hierarchy in FIG. 11.

As noted, port objects do not appear in this model; what were ports as described above are now the relations between bindings and their bound behaviours in the definitions below. However, for ease of description, reference will be made to a behaviour's ports, meaning its possible relations to bindings, below.

(Where objects in the internal model are specialised in the fault model, their more specialised name is given in brackets.)

2.4.1 Class Definitions

MU

MUs are units of granularity of management. In the CM world, they are wholly defined (at the application level) by their behaviours and ports.

MU Interactor

The various cross-MU (i.e. non-support) connections between behaviours induce connections between the MUs owning those behaviours. In the implementation, the MU Interactor is an important class containing references to the connections between behaviours, needed for efficiency reasons. At the application level, it knows nothing its contents do not know and has no interesting behaviour.

(Normal) Behaviour

A behaviour is an abstraction of a particular Extended Finite State machine. It is a name given to that machine. Every behaviour is owned by a particular MU, the one whose overall EFSM is composed of that behaviour's, possibly with others.

Capability

A capability is an exportable behaviour. Its exportability comes from the nature of its bindings which allow the behaviour to be put in communication with the behaviour of the MU to which it is exported and/or to other MUs bound to that MU.

Enhancement

An enhancement is a non-exportable behaviour internal to an MU which it connects to one or more imported behaviours so as to enhance them into a composite behaviour which it can export. Enhancements are always bound to imported behaviours on at least one of their ports, though they may be externally bound on others.

Behaviour Interactor

This is a straightforward generalisation of Binding and Contain.

Binding

A binding is a peer-to-peer connection between two behaviours. When the behaviours are considered as EFSMs, the binding allows them to exchange messages. When they are regarded more abstractly, the binding just records that they are in communication and its name abstracts the type of messages and message sequences they could exchange, just as the behaviour's names abstract their EFSMs. Bindings are usually bidirectional objects as they are passing information in two equal directions (designated portA and portZ in the figure), although unidirectional bindings, or ones with a preferred direction to which information in the reverse direction is subordinate, are possible.

In principle, binding is a standard many-many binary relationship, each binding connecting precisely one behaviour to precisely one other. However, when a behaviour has been imported into another in such a way that the second incorporates part of the external interface of the first in its own external interface, then, and only then, a binding may have multiple behaviours at either or both of its ends. Any such set of multiple behaviours is necessarily an ordered sequence of capability imports.

Contain

This shows dependency of one behaviour on another. The containing behaviour incorporates the contained into itself either by offering the contained's external ports as its own, or by binding them to its enhancement behaviours via its internal ports or by a combination of both.

Generic containment is a standard many-many binary relationship. One behaviour may support many others and be supported by many others. Specialisations may limit the degree of support a behaviour may offer to a single containment, to a finite number, etc.

Support

A specialisation of the contain relationship to cases where enhancement behaviours of an MU are contained in exported behaviours of that same MU, i.e. to cases where the containment relationship is between two behaviours of the same MU. Supports, being intra-MU objects, are not related to MU interactors.

Provision

The alternative specialisation of the contains relationship to cases where the containment relationship is between two behaviours of different MUs.

2.5 Implementation Details

The implementation of the internal model takes into account
  specificity and efficiency
  distribution 2.5.1 Specificity and Efficiency From the FM viewpoint, behaviours have default state (normal operation) and a variety of (more interesting) degraded states. Hence normal behaviours can be implemented as objects which are uninstantiated for a given MU when they are functioning normally on that MU. At such times, interactors hold the inter-MU bindings and provisions between behaviours (in the model, Interactor has Binding and Provision just as MU has Behaviour). Intra-MU support information is assumed to be class-based and therefore has no such requirement.

The advantage of this approach is that it much reduces the number of objects the correlator must create as only behaviours in abnormal state need be instantiated.

2.5.2 Distribution

A single AC has one point of call for network information. Multiple Acs may manage networks split geographically or organisationally. When a problem occurs whose symptoms cross the boundary between two network models, the edge MUs in each model must be able to exchange messages transparently. This is done by splitting the interactor that relates them.

Hence, architecture domain bindings between MUs in the internal models of distinct ACs may be realised as 'proxy' bindings. These have the same methods as ordinary bindings but different implementations. On receipt of a message, instead of passing it to the connected MU (not present by hypothesis), the proxy binding puts it on the output queue for that AC. It is thus sent to the input queue of the appropriate other AC which then sends it to the corresponding proxy binding in its internal model. FIG. 12 illustrates such distribution possibilities.

3. Correlation Strategies

The next section dicusses the reasoning 'algorithms' used to correlate alarms.

3.1 Generic Reasoning Aspects

The correlator's task is to build a model of the faults in the network. While doing this, it should express all and only the data needed in a way that is resilient to questions of when and in what order it was acquired.

3.1.1 Data and Knowledge

The data used in reasoning is that of the internal model, plus
  a set of alarms and other events, raisable to MUs: these events may trigger and be predicted by problems In addition to the above instance data (data), there is class data (knowledge), and fault knowledge about
  those problems (representing faults) that can occur on these MUs
  support relationships between these problems and other behaviours; also the relations between problem and the supported behaviour states
  (extra-object) service provision: what services network object classes can produce and consume, hence how these classes can be connected
  the relations between problem state and event state (on the same MU for the impact strategy, on connected MUs for the broadcast strategy)
  the relations between binding state and event state 3.1.2 Data and Knowledge Acquisition Events are sent to the correlator by the System Manager. The correlator expects events to arrive in a random sequence.

Ideally, the fault knowledge needed by the impact strategy will be gathered by others during design and made available in a machine readable form. Often, it will have to be gathered as part of the installation of a correlator on an existing type of System Manager.

Fault knowledge can be gathered
from network object class to problem class to event classes: this object could have this fault which would cause these events at network objects related in these ways
as declarative statements:
  problem=>alarms and loss of support relationships on same MU
    (broadcast) problem=>alarm on connected MU
    (impact) interactor degraded=>behaviour degraded and alarm on same MU
  loss of support or binding relationships=>behaviour degradation behaviour degraded=>interactor degraded and network object states for both the impact and broadcast strategies.

3.1.3 Problem Data and Knowledge Relationships

In principle, at a given moment in its resolution, a problem could know (from its class) the set of events, service impacts and states it predicts will occur (in the given configuration for the broadcast strategy; a problem class' predictions will be configuration dependent, e.g. this fault in a Sonet will cause this alarm in a connected Line Card)

(from itself) the subset of these facts that
  have occurred
  have timed-out or otherwise been negated
  are still awaited Hence the various set relations of non-intersection, partial intersection, equality and containment can occur between the sets of classes of fact that two problem classes predict and between the sets of facts that two instances of these problem classes, at a given moment, are offering to explain (the possible set relations in the latter case are of course constrained by those in the former).

non-intersecting: the problems are resolved independently.

mutually intersecting (neither wholly contains other): neither problem can wholly explain the observed facts so the resolution of one does not guarantee the resolution of the other.

equal: two problems are rivals to explain the same set of facts.

subset: one problem offers to explain all the facts explained by another, plus some additional ones When correlating using the broadcast strategy, it is simply not possible to determine these relationships at the class level independent of the configuration. Because the broadcast strategy relies on problems recognising the relevance to them of events occurring at remote locations connected via multiple intervening links, the number of combinations is just too large to enumerate. Hence, both the generic logical behaviour required by the above intersection relations and the interest of specific problems in specific events under specific conditions are encoded in the problem rules (the wise knowledge engineer will separate these two types of rule when coding, noting that specific rules may occasionally wish to override the default generic behaviour, a fact which should be documented when it occurs)

if the semantics of the situation tell the knowledge engineer that one problem necessarily implies the other (e.g. a catastrophic card failure necessarily implies software error on that card), that may be captured by a relationship between the two problem classes, governed by a generic rule.

When correlating using the impact strategy, by contrast, the fact that all hypotheses deal solely in messages sent by neighbours over strongly-typed MU Interactors means that one can enumerate all the possible messages for a given hypothesis on a given MU, independent of the external configuration of the network. Hence, a much higher proportion of the correlation behaviour can be encoded as data on the hypothesis classes related to this, there is a more constrained relationship between the logical significance of the rule that fires when a hypothesis of a given class and state receives a message of a given class and state, and the logical significance of the relationship its firing creates between the said hypothesis and message.

The following sections discuss the extreme cases of each strategy; in practice, a mixture may be appropriate.

3.2 Broadcast Strategy for Alarm Correlation

The impact strategy's richer modelling of behaviours and interactors is ignored below but could be used to simplify rule writing.

3.2.1 Internal Model

MUs and MU Interactors alone are used to model the network. MU Interactors are mostly bindings with but few levels of capability. In the application domain, a community is just a root of a capability chain and broadcasts are usually (but not necessarily) to the community defined by the immediately superior root.

3.2.2 Fault Model

Each MU has a single behaviour object and several problem objects. These latter can move from their default (absent) state to various active states on the receipt of messages from the SM or broadcast to them from other MUs in their community. When active, they compete for the right to explain the alarms they have taken.

3.2.3 Event Processing

With reference to FIG. 13, an event is received by the MU managing the device that raised it. The MU passes it to all its problems which in turn pass it to their rules. Some rules may fire, changing the state of local objects, and broadcasting impact messages (usually problem state change impacts) or the original message to other MUs.

These in turn send it to their problems and thence to other rules. Any rule whose condition accepts the problem's state, message class and message state proceeds to check the relationship between the originating and receiving MUs and the states of each, plus any relevant message data. If the condition is met, it fires. The firing of a rule may change the state of that rule's arguments (MU, problem, message), create new messages, and set up relationships between the arguments or from the arguments to other objects.

3.2.4 Rule Writing Strategy

This section briefy describes the kind of rules required by the broadcast strategy.

3.2.4.1 Generic Rules

Class-based explanation relationship deduction is impossible. Problem impacts are raised when problems change state. Received by other Problems, they fire rules that check the their explanation-of-messages relationships and change the state of receiving and sending problem appropriately. Other generic rules handle messages sent to problems that have been subsumed by others.

3.2.4.2 Specific Rules

Every MU has a single never-instantiating behaviour class that handles broadcast of events. Every problem has specific rules to decide whether to offer to explain an event and whether to change state.

3.2.5 Class Descriptions (Only given where they differ significantly from the impact strategy below. See FIGS. 18–22.)

MU Interactor (Just Interactor in figures) As we have no (behaviour) interactors, this class connects MUs in its own right, and not as a surrogate. By analogy with behaviour interactors, we specialise it into MU Binding and MU Containment subclasses.

Behaviour

Changes to a behaviour's logic (i.e. the rules that govern its reaction to state changes in connected objects) can only be made in when it is inactive. When it receives a message, a behaviour selects its appropriate Logical Rule and passes the message to it.

Normal

Never leaves quiescent state.

Logical Rule

A logical rule applies to a single behaviour class-message class relation. (It translates to a ruleset in the architecture domain.)

Rule Invocation

This class represents the occurrence of a successful rule invocation. It stores the parameters that fired the rule and may be referenced by the messages that the rule created. This object was required by the symbolic debugging environment for the alarm correlation engine.

Message

Messages are either events or problem state impacts.

3.3 Impact Strategy for Alarm Correlation

The impact strategy limits the messages that can be exchanged between MUs to ones that comment on the state of the bindings between them. It allows the rule-writer to put more of the knowledge into data structures, driven by generic rules. Note, however, that this is not a compulsory feature of the strategy; it could be implemented entirely as a particular style of rule-writing within an engine built to support the broadcast strategy.

3.3.1 Internal Model

MUs have behaviours connected by behaviour interactors, as described earlier in section 2.4.1. All have degraded states and relations between these states.

3.3.2 Fault Model

Behaviour is expanded to include the concept of problem behaviours as well as normal behaviours. Both behaviours and behaviour interactors are hypotheses; either quiescent or active (degraded). A hypothesis in a given state may explain a message in a given state. Messages are either events or impacts and in the latter case it is the object impacted that is in fact explained, i.e. hypotheses explain events or other hypothesis. Impact here means an information impact (eg "I have changed state"), not a command impact (eg "change your state"). The highest end of any such explanation tree must be composed of problems (note that problems may be explained by other problems; they just do not require explanation). The lowest end must be composed of events. (Impact messages relating to) behaviours and behaviour interactors in degraded state make up the intervening levels.

3.3.3 Event Processing

An event change of state (i.e. from absent to present) signals those behaviours of its MU to which it has explain relations. These either degrade and take (explain) the event or oblige an attached behaviour interactor to degrade and explain it. Whatever hypothesis(es) offer to explain the event, signal their state change in turn to any other hypotheses with which they have an explain relationship, thus provoking further state changes.

3.3.4 Rule Writing Strategy

This section briefy describes the kind of rules required by the impact strategy.

3.3.4.1 Generic

For given MU class, its hypothesis classes and states know what logical relations connect them to which message classes and states. The generic rules are those that are driven by this data to instantiate these logical relations between actual hypotheses and actual messages when the former receive the latter.

3.3.4.2 Specific

In an ideal world, all processing in the impact strategy would be data driven and generic. In the real world, there will doubtless be overrides to these generic rules.

3.3.5 Class Descriptions

From the FM point of view, behaviours are only interesting when they are operating abnormally. A behaviour is in its default (normal) state or in a degraded state. A problem is in its default (quiescent) state or in an active state. Since the behaviour and the problem may be the same object considered from different viewpoints (it's a behaviour when it's working and a problem when it's not), the terms are used interchangeably according to context. (See FIGS. 23–30.)

MU

MUs are units of granularity of management. In the FM world, they are objects which can raise alarms and, at the physical level, can be identified and separately replaced. An MU's state is wholly defined by the state of the behaviours and problems of which it is composed and the MU Interactors that connect to it. It is simply a unit of granularity of processing, serving to group and forward messages.

Event

Events have two basic states: default (absent) and active (raised on this MU), just like hypotheses. However the logical state of being an expected but not yet arrived event (analogous to state of being a provable hypothesis) is not needed since an event is expected by a particular problem and hence its expectation resides in the relation between a hypothesis state, a default event state, and a timer state of the explain relationship between them which was waiting for the event to become active. Hence events do not have the same active state substructure as hypotheses.

Events are not hypotheses also because they cannot explain things, being themselves by definition what must be explained.

MU Interactor (Just Interactor in figures) An MU Interactor has (behaviour) interactors as an MU has behaviours. In the implementation, this class is needed to hold information about interactors in default state.

Hypothesis

A hypothesis has a default state (inactive from the point of view of FM) and various active/degraded states. A hypothesis in a given state may explain events or other hypotheses in given states and may be explained. The lowest level of a tree of explanations must be composed of events. The highest level must be composed of problems.

Hypotheses' active states have logical substate (true, provable, false) and user substate (unreported, reported, acknowledged, cleared). Note that the false (and cleared) states are temporary clean-up states; a false (or cleared) hypothesis will remove references to itself from other hypotheses and immediately return to its default state; logically speaking, default is the actual, persistent false state.

Behaviour

Every behaviour is owned by a particular MU. Behaviours know about the internals of their MU and can map alarms to impacts.

Changes to a behaviour's logic (i.e. the rules that govern its reaction to state changes in connected objects) can only be made in when it is inactive.

When a event related to a default behaviour by an explain relation changes from default state, (i.e. is raised), the behaviour may change state and explain the event or it may cause one of its behaviour interactors to change state and explain the alarm, itself remaining in default state (for the moment; one effect of the behaviour interactor's state change will be a state change of the behaviour). In this latter case, the event 'really' meant simply that the interactor was in a degraded state. However the interactor's attached behaviour handled it since, by the philosophy of the impact strategy, the interactor, as a generic extra-MU object, can only know the degradation states of its type. It can know nothing of what an alarm on one of the many classes of MU's to which it could be attached might mean; only the MU's behaviour(s) can know that.

Normal (Alternative Names: Intended, Default)

A normal behaviour in default state is operating normally. An 'active' normal behaviour's operation is degraded in some way. In the simplest case, the behaviour is wholly denied. A specialisation tree of behaviour (not shown on figure) contains subclasses with more elaborate state models catering for degrees of unavailability.

Problem

Problems explain event states and other behaviour degradation states and do not themselves need explanation (though they may be explained by other problems). A problem in default state is not present on that MU. An active problem generates effects on those behaviours of its MU to which it has a support (subclass of explain) relation.

Innate

Innate behaviours support others directly and internally to an MU. They are thus of no interest to configurers and only appear when the internal model is broadened to the fault model. They, and their support relationships, represent a kind of capability chain modelling within the MU; the breaking down of the MUs own EFSM into more fundamental components that support its externally visible behaviours when they work and degrade them when they fail.

All innate behaviours are problems (i.e. when active). An innate behaviour's state could be explained by another's but usually there will not be much detailed intra-MU behaviour modelling Enhancement Because it is an internal, non-exportable behaviour, an enhancement behaviour is a subclass of problem as well as of normal behaviour (it's an enhancement when its working and a problem when it's not).

Capability

A capability cannot be a problem (i.e. a root of explanation) since by definition its states are dependent on the states of its extra-MU bindings as well as its own behaviour. Hence, even in the simplest cases, it will always be necessary to model faults as innate or enhancement behaviours supporting capabilities.

Behaviour Interactor

Behaviour Interactor degradation state changes may be the consequence of one attached behaviour's change of state and the cause of another's. Alternatively, they may be caused by an attached behaviour's non-state-changing reaction to an event state change.

In the context of a given MU, MU Interactor states and problem states are rivals to explain changes to the MU's behaviours' states. That is, the interactors are the MU's interface to other MU's whose problems may be rivals with its problems to explain its behaviours' states. In the impact strategy, the degraded states of interactor attached to its behaviours are the MU's only knowledge of these other problems.

Contain

This is in principle unidirectional; the contained behaviour's degraded state causes degradation of the containing behaviour's state. Degradation of the containing behaviour's state may be caused by degraded state of the contained behaviour. Hence its state machine is the same as that for interactor.

The contain relationship has no closed loops (i.e. is irreflexively transitively closed).

Support

A specialisation of the contains relationship to cases where problem behaviours of an MU support other behaviours of that same MU, i.e. to cases where the containment relationship is between two behaviours of the same MU.

Provision

A specialisation of the contains relationship to cases where the containment relationship is between two behaviours (necessarily capabilities) of different MUs.

Binding

Bindings are usually bidirectional objects as they are passing information in two equal directions (designated portA and portZ in the figure), although unidirectional bindings, or ones with a preferred direction to which information in the reverse direction is subordinate, are possible. Hence, the most general binding's state is in theory the cross-product of the state of each direction's information flow. Specific binding classes will involve a greater degree of coupling.

In relation to the behaviour at a given end, one direction of flow is outward, and thus its state will be a consequence of the behaviour's state, while the other is inward, and thus its state will be a cause of the behaviour's state.

Explain

Just as, in the application domain, the problems and alarms of which an MU is capable are regarded as always present whether in default or active form, so the logical relationships between these, and all other hypotheses and events, is always present. It is a relationship between states of hypotheses and events. Each logical relationship knows which states of its explaining class are compatible with which states of its explained class and vice versa.

The explain relationship is idle when these states are compatible. When they are not, causes will force state changes of the same logical state value on consequences, where these are hypotheses, and will posit a non-forcing state change (with timers whose duration is held in the logical state) where these are events. Consequences will have a similar effect on causes, save that multiple possible causes will degrade the logical state value of the forced change.

Evidence

This class' principal ability is to be at the explained end of an explain relationship. Its subclasses can be represented by or impacted by messages in the architecture (and in the broadcast strategy, thought of as a realisation layer for the impact strategy). It knows whether it is being explained by none, one, many or too many hypotheses. Only problems may end in the first state. Evidences explained by too many hypotheses will not drive any to new states unless one hypothesis is already in logical state true.

3.4 Implementation Details

Figure 31:
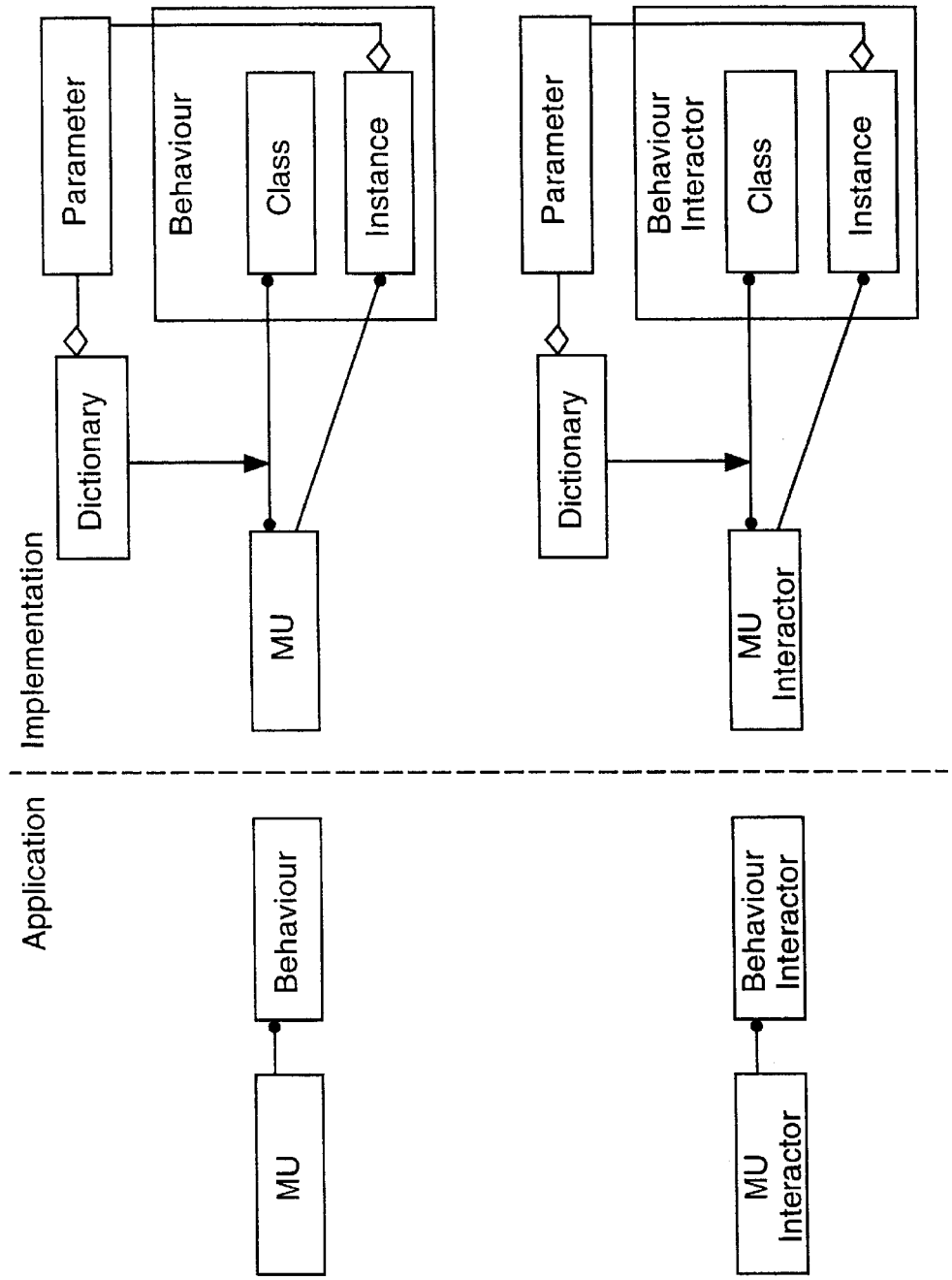
FIG. 31 shows how default and active (problem) behaviour states may be implemented.

The implementation of the internal model takes into account specificity and efficiency multi-AC distribution 3.4.1 Specificity and Efficiency Every class with default and active states is implemented as an object which is not instantiated on its MU when in default state (see FIG. 31).

Impact messages are simply means of sending notice of the object impacted to others. To save duplicating an inheritance hierarchy for all impacts, ruleset lookup is implemented so that impacts provide their impacted object class to the rule dictionary, i.e. rules fired by impacts are selected on the type of object impacted.

3.4.2 Distribution

Figure 32:
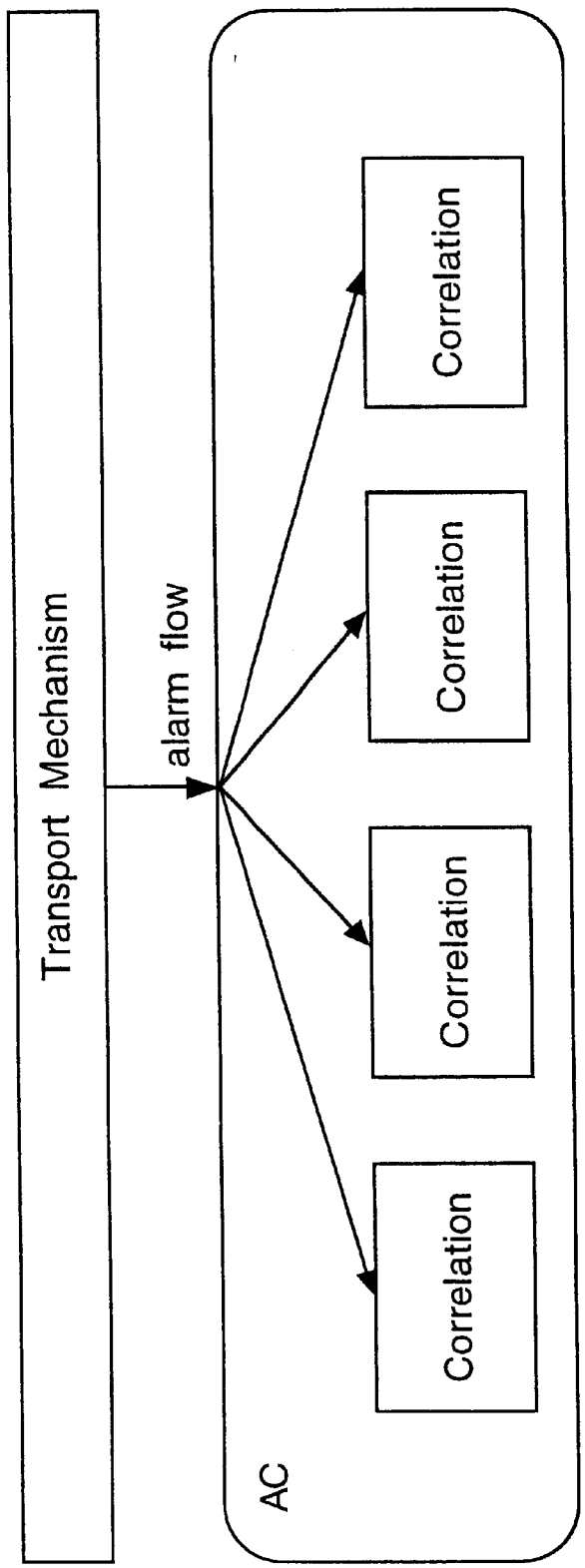

Intra-correlator distribution is motivated by the need to handle a high volume of incoming alarms. The correlator's manner of of processing is that a single event sent to it by the system manager causes the firing of one or more rules, each of which may create one or more messages, which may in turn cause the firing of other rules and thus the creation of other messages. Hence, each incoming event is the route of a creation tree of messages. Thus the preferred form of internal distribution is to allocate the processing of distinct incoming events to distinct processors (see FIG. 32). Each event is queued and, when a processor becomes free, it, and all messages created by it, are handled by that processor. This form of distribution allows process ordering constraints (see section 1.3) to be preserved transparently to the rule writer.

Inter-correlator distribution is motivated by an organisational or geographic need to have interconnected parts of the network managed at distinct locations, requiring distinct, communicating correlators. As there is a natural quarrel between the object-oriented principle of encapsulation and the needs of debugging, these correlators must be in a peer relationship, not a hierarchic one. Where an MU in the knowledge base of one correlator interacts with an MU in another, the conceptual interactor between them is impemented as two proxy interactors, one in each knowledge base, with the same interface as a standard interactor but different implementation (see FIG. 33). When a proxy interactor is instructed to pass a message to its far end, it instead provides the message to its correlators output queue, whence it is passed to the input queue of the correlator of the other knowledge base. The other correlator passes the message to the far-end MU in the same manner as it would an event sent to that MU by the system manager.

Since the transport medium between the two correlators may lose or reorder messages sent between them, the ordering constraints of section 1.3 are enforced by the output queue's attaching to the exported message a list of references to any of its antecedent creating messages that have already been exported. The other correlator's input queue reorders these messages, waiting for delayed earlier ones as necessary, to present them in the order required by the constraint. The need to do this is a performance cost but a beneficial side effect is that the same machinery supports the detection of lost messages and the raising of requests for retransmission or errors. As for intra-correlator distribution, this is transparent to the rule writer.

When both these forms of distribution are used, the demands of section 1.3 mean that the proxy interactor must tag the message it exports with a reference to the intra-correlator thread of processing in which it was created. This thread reference must be copied to all messages created by the exported message so that if any of them are exported back to the original correlator over another (or the same) proxy interactor, they will be processed in the same thread (if it is still running).

Lastly, when using correlation to support multiple levels of service impact analysis, a hierarchically arranged system of communicating correlators can be set up (in contrast to the case above). Subordinate correlators map alarms to problems on physical devices and send messages about these problems to superior correlators. These process the problem messages as though they were alarms and, using the same methods, map them to higher level (network) problems. A similar process may connect network to service problems and the distribution may be further refined to cope with sublevels within these three.

By using the above approach, the correlator can secure the performance benefits of distribution without imposing on the rule writer the maintenance burden of either adapting rules to particular distribution environments or abandoning natural simplifying assumptions about the order of rule processing.

3.4.3 Logic Separation and On-line Update

The behaviour class is implemented as a static and dynamic part. The dynamic part of a behaviour class provides a mapping between that behaviour class and a rule base class. This mapper object also holds dictionaries that, both for instances of the behaviour class and for the behaviour class itself, map between classes of message that they receive and sets of rules that they then evaluate. The rules are implemented in rule base classes and the association between behaviour class and rule base is achieved through the dynamic mapper object. This association decouples rule and behaviour knowledge completely, allowing them to have separate inheritance hierarchies and configuration groupings.

The mapper object's references to rule names and rule implementations also allows on-line updating of problem logic. By altering a static behaviour class' reference to point to a new dynamic mapper, which may have a new rulebase reference and/or new rule names in its dictionaries, the reasoning capacity of all future instances of that class can be changed while existing instances will behave as before; this is how on-line upgrade to new rule configurations will normally be done. A less usual procedure but one that will sometimes be advantageous when patching particular errors disovered in released rulebases, is to alter an existing mapper's ruleBase reference, thus changing the reasoning capacity of existing as well as new instances.

Hence, by providing the separation of behaviour knowledge i.e. what messages cause what rules to be evaluated and the rules that are actually evaluated, the following is achieved:

(1) Multiple rule bases can be used within one knowledge base with each behaviour being assigned a single rule base.
(2) Rule bases can be exchanged at run time on a behaviour class by behaviour class basis. In this way, the fault behaviour of existing and future behaviour instances can be modified.
(3) The same behaviour knowledge can be reused in the context of several different rule bases thereby reducing the duplication of rule knowledge within the problem. This significantly reduces the maintenance problem usually associated with a system of this type.

4. Compilation of Rules

The system extends the Smalltalk Compiler in such a way that the existing development environment can be used unchanged for the creation of either Smalltalk methods or correlation rules. Facilities have been created in order to allow break and watch points to be included in the compiled rules in order that the operational system can be debugged. This is done in a non-intrusive way; the user not having to add code manually to the rule in order to achieve the debugging functionality. This is contrast to Smalltalk where breakpoints are inserted by adding code statements into the code written by the user.

Rules are compiled to native Smalltalk byte codes and run at the same speed as any other Smalltalk method. When debugging is required, special code statements are automatically inserted into the compiled rule that can be intercepted by the system debugger. Support for online rule recompilation is provided in order to:

(1) Modify rule behaviour
(2) Switch off rule debugging.
(3) Modify the level of debugging.

4.1 What are Rules

The compiler must be extended to support rules to avoid the impedance problem where the user programs in one language for OO and another for rules. The extended compiler makes the embedding seamless with the user working (apparently) unchanged in the original OO environment. Rules consist of three elements:
    name,
    conditions
    actions They compile to an AnnotatedMethod with three arguments. Optional debugging is supported for condition and action components. Rules can contain ANY valid piece of Smalltalk code.

4.2 Integration with the Smalltalk System

Telling Smalltalk what compiler to use:
(class)
compilerClass
    ^Loaded ifTrue: [ACRuleCompiler] ifFalse: [super compilerClass]
(meta)
classCompilerClass
    ^Loaded ifTrue: [ACRuleCompiler] ifFalse: [super compilerclass]

This information is used when the user does an 'accept' within a method browser pane. The compiler defined for all 'normal' method classes is Compiler and is defined in the class Object.

Class ACRuleCompiler inherits from Compiler. Very few methods need to be rewritten:
    preferredParserClass on class side to define the parser used;
    translate:noPattern:ifFail:needSourceMap:handler: on instance side, to tell it what to do during compilation.

Parser is implemented in ACParser, a subclass of Parser.

4.2 Standard Smalltalk Compilation Classes

The following classes make up the rest of the Smalltalk Compilation System. (These compiler classes are not particularly well implemented in Smalltalk, having long methods, use of instvars instead of accessors and other signs of hacking.)

ProgramNode (and subclasses represents parse nodes in the parse tree generated for the method. The emitXXX: aCodeStream messages actually generate the compiled code (e.g. VariableNode represents an argument, temporary, instance etc. variable.)

CodeStream accumulates code for the compiler (analogous to a character stream but composed of program nodes).

Scanner tokenizes the method source.

MethodNodeHolder encapsulates MethodNode instances (present for backward compatibility).

CompilerErrorHandler (subclasses deals gracefully with compilation errors.

ProgramNodeBuilder is a class that knows how to create ProgramNode objects. This had to be subclassed just because of a hardcoded class in one method, a (minor) deficiency in the bject-orientedness of the original Smalltalk compiler implementation.

NameScope (subclasses) represents a scope i.e. local, global, argument.

VariableDefinition (subclasses) represents the definition of a variable. There are five kinds of variable: argument, temporary, instance, static (class/pool/global), receiver (self), and pseudo (thisContext). Named constants (nil/true/false) are not variables. 'super' is not a variable, but it behaves like one in some respects.
ReadBeforeWrittenTester 4.3 Extended Rule Compilation Framework Classes
ACProgramNodeBuilder, a subclass of ProgramNodeBuilder, overrides the method newMethodSelector: primitive:errorCode:block:attributes: in order that an ACRuleNode is generated by the compilation process instead of a method node. (If the code in these methods were better written, it would be possible to avoid overwriting these methods.)

ACRuleMethod, a subclass of AnnotatedMethod (which is normally used for primitives such as Canvas), is the output of the compilation process. It avoids the need to maintain separate source and compiled rulebases. It defines printOn: method only.

ACRuleNode, a subclass of MethodNode, is the root node in the parse tree generated during the compilation of a rule. It stores the name of the rule (formerly used to reference the source but now unnecessary due to the use of annotated methods).

The ACParser Class generates the parse tree for the rule. It is created by the actions of the ACRuleCompiler. Conditionally, it can:
    insert debugging code to catch condition evaluation;
    insert debugging code to catch each action evaluation.
It overrides the methods:
    method:context: (illustrated in appendix)
    readStandardPragmas:temps: (illustrated in appendix)
    statementsArgs:temps: (illustrated in appendix) (this is only overridden to manage highlighting of nodes in the rulebase debugger)
These in turn call other methods that require alteration:
    readConditions:temp:: (illustrated in appendix)
    condition:temps (illustrated in appendix)
    readActions (illustrated in appendix)
    statementsArgs:temps: (illustrated in appendix)

4.4 Modifying the Code Stream
The code stream is modified whenever debugging or tracing is on. The standard sequence:

```
acme: arg1 problem: arg2 msg: arg3
    <name> 'a name'
    <condition>
    arg1 test.
    <actions>
    arg2 action1.
    arg2 action2.
is instead complied to:
acme: arg1 problem: arg2 msg: arg3
    self changed: #conditions.
    arg1 test if True: [
        self changed: #actions.
        arg2 action1.
        self changed: #actions.
        arg2 action2.
``` which allows tracing and stepping through rule execution in the debugger via the standard smalltalk Model-View-Controller dependency mechanisms.

4.5 Summary

A rule compiler embedded in Smalltalk has been constructed. Existing Smalltalk code can be used without restriction in both condition and action parts of a rule. Existing smalltalk development tools can be used for rule development and testing. An advanced rule debugger has also been built.

5. Summary of Advantages

The approach to network modelling described above supports local and semi-local reasoning, in contrast to conventional network alarm correlation systems, whose rules (must) range over the whole network, greatly increasing the difficulty of writing and maintaining them. Also, there is a complete separation of fault knowledge from the specific topology of a network, thereby allowing a single knowledge base to support all Nortel customer network configurations.

5.1 Advantages of Managed Units to encapsulate Behaviour

The AC engine inferences over Managed Units (MUs) that are in (often one-to-one but sometimes complex) correspondence with managed objects in the system manager's information base. The managed unit provides the computational object for alarm correlation (or, more generally, fault management), while the managed object provides the data object. (This separation is in accord with Telecommunications Management of Networks (TMN) standards.) MUs encapsulate all aspects of the standard Fault, Configuration, Accounting, Provisioning and Security (FCAPS) behaviour found in a network management system. Specifically, MU classes are associated with several problem classes i.e. only faults of particular types can occur on given MU classes.

In contrast to managed objects, which merely record their existing state and whether they are connected to others, MUs know the services they are receiving, those they are offering, the states of each (functioning normally, degraded to degree . . . ) and the rules that relate the states of the first to those of the second.

This gives the following advantages of encapsulation as these apply to the network management area.

Support for local reasoning: knowledge engineers can develop alarm correlation rules to model the fault behaviour of an MU without needing to understand the objects it connects to in detail.

Support across the life cycle: telecomms designers using the MU concept can specify accurate fault behaviour at an early stage of designing a device.

Support across network management functions: the knowledge thus migrated from the rules of a conventional alarm correlator into the network model is precisely that which other network management functions may want and/or may be able to supply.

Support across diverse networks: the mapping of diverse managed object concepts into a single Managed Unit concept allows the correlator to model, and so correlate alarms from, heterogeneous networks.

It also means that the alarm correlation engine is at the same time an engine which can deduce the consequences of faults on higher level functions of the network, including those visible to the user. Which function it exhibits depends on what rules are supplied to it.

5.2 Advantages of Correlation Communities

The service offer and receipt links of Managed Units define chains of interdependent Managed Units (A supports B which supports C . . . ). A knowledge engineer can identify selected roots of these chains as Correlation Communities, within which a burst of alarms is likely to relate to a single fault on a single member Managed Unit.

Where full scale modelling of Managed Units is impractical (e.g. certain legacy systems), or to provide initial alarm correlation functionality before detailed modelling of the Managed Units is complete, these communities can be identified early to support semi-local reasoning.

5.3 Advantages of Knowledge Structure

The Alarm Correlation Engine is a hybrid rule and message passing system. Problem objects communicate with each other via messages. Problem objects process the messages they receive using rules. Rules are grouped into categories that process specific classes of message. Groups of rules are defined for both problem classes and problem instances. This structuring of knowledge ensures fast alarm correlation with fewer or simpler rules and fewer messages being passed.

5.3.1 Advantages of Faults as Problems

In contrast to conventional Intelligent Alarm Filtering (IAF) systems, which seek to identify 'important' alarms and filter them from the background noise, the AC engine uses a problem-based approach, with a problem mapping to a fault on a device. As the MU is the AC engine's model of the real-world device, so the problem object is the AC engine's model of the real-world fault. This gives:

independence of telecomms designer's assumptions about what alarms to raise; these can often be inadequate with regard to the needs of alarm correlation;

ability to combine pure alarm correlation with testing and state checks and corrective actions; as well as intercepting alarms the problem can launch tests, verify complex conditions and control recovery behaviour. The combining of rules to do these tasks with pure correlating of the stream of alarms would be harder without the problem construct; and an MU class can (potentially) have many types of fault, each one described as a single Problem class, thereby providing clear separation of MU and Problem modelling. This enables Problem class reuse across many MU classes.

5.3.2 Advantages of Message-based Reasoning

In contrast to conventional Intelligent Alarm Filtering (IAF) systems, which use standard knowledge-based communication between rules in a large rulebase applying to many possible faults, the AC engine's units of reasoning (Problems) communicate via object-oriented messages and process the messages that they receive using rules. Messages may relate to alarms received by the AC engine or to state changes within the MUs. Problems may also be contained in messages thereby allowing for direct reasoning about faults occurring in the network.

This gives the ability to distribute alarm correlation processing over several processors; messages can be sent between AC engines running on different processors and multiple threads of reasoning, each handling a different incoming alarm, can run on multiple processors within a single AC engine.

Consequently, this solution can easily be scaled up to handle a wide range of network sizes and topologies and real-time requirements.

5.3.3 Advantages of Problem and RuleBase Association

Problems process the messages that they receive using rules. Problems define the association between received messages and the rules that are to be evaluated for such events. This has the advantage of ensuring that rules are not evaluated unnecessarily, thereby improving real-time performance. Rules are not directly encoded within problems but are grouped together in RuleBase classes. This separation of problem knowledge and rule implementation allows for maximal rule reuse, thereby simplifying the knowledge maintenance process.

5.3.4 Advantages of Rule Structure

Rules are implemented as the behaviour of RuleBases; one rule represented by a single method within the class. The AC engine's design of integrating knowledge-based techniques with object-oriented techniques has several unique features.

The use of object-orientation to provide:

strongly hierarchical knowledge structuring mechanisms for rules;

the ability to fire rules on classes or instances of objects; and rule reuse between product knowledge bases and within the elements of a single product knowledge base.

This means that RuleBase classes form a hierarchy such that rules in one rulebase are effectively available to, but can have their behaviour modified in, a rulebase lower in the hierarchy.

This gives the supplier the ability to write technology-specific rulebases and then and product-specific rulebases for particular implementations of the technology. Little rule overriding is needed for the technology rules to give valid alarm correlation behaviour for the particular implementation and, more importantly, inheritance keeps the technology and product rulebase' rules separate, thus solving what would otherwise be a complicated configuration management problem.

This is even more valuable when customers wish to write their own rules. It makes customer maintenance of rulebases feasible; customers can modify their own rulebases, while the generic supplier-provided rulebases are updated by software release. The customer's rules reside in their rulebase which inherits from the product rulebase. New product rulebase versions can be released without overwriting the customer's rules and without needing to find their rewrites of the earlier version and export them to the new version, as in a conventional alarm filtering system.

5.4 Advantages of Rule Encoding

The encoding of rules directly in the OO language of implementation avoids the "impedance mismatch" problem. (Impedance mismatch is a classical problem arising from the clash between the data modelling styles of two paradigms, in this case OO and KBS. This clash imposes a high cost of translation, both in performance when running the system, and in code maintenance when coding the translation between modelling styles.) The distinctive features of this approach include the following:

rules have names for user reference, and meaningful explanation of the reasoning process;

rules are implemented by overloading the existing smalltalk compiler, not as a distinct, coupled system, thereby allowing all smalltalk coding and testing tools to be used directly on rules;

The complete power and wealth of the Smalltalk class library and of Nortel Smalltalk applications is thus available not merely within the rules but also when writing, compiling and testing them.

5.5 Advantages of Dynamic Representation of the Problem Class

The use of a dynamic representation of the problem class (the rule behaviour of problems is held, not in the problem class as in conventional Smalltalk systems, but in a dynamic object associated with it) makes the relationships of rules and problems the subject of run-time data.

Thus a new rulebase can be supplied to a running system and assigned to new dynamic representations of given problems. Any existing active problems will continue to behave according to the logic of the old rules until they expire but new problems will have the new behaviour. By contrast, a conventional system would require the alarm correlation function to be discontinued while its rulebase was changed and existing problems would have to be lost and recorrelated from the alarm stream log.

6 Concluding Remarks

Although the embodiments of the invention described above relate to alarm correlation, other applications and variations of the techniques are envisaged within the scope of the claims Other variations will be apparent to a skilled man within the scope of the claims. A 12 page Appendix of code illustrating the compiler extension aspect now follows.

```
                                        translate:

translate: aStream noPattern: noPattern ifFail: failBlock needSourceMap: mapFlag
handler: handler
                "noPattern is true for evaluation, false for compilation Make
                special provisions for compiling methods in classes that still
                use the old parser."
                | holder codeStream method ruleNode ruleParser myMapFlag srcInfo |
                myMapFlag := mapFlag or: [tracing or: [debugging]]. "for saving sourse"
                ruleParser := (class parserClass new) tracing: tracing; debugging: debugging;
yourself. "create ACRuleParser"
                ruleNode := ruleParser "returns ACRuleNode root of rule's parse tree"
"creates"        parse: aStream
"parse"          class: class
"tree by"        noPattern: noPattern
"invoking"       context: context
"scanner"        notifying: handler
"on char"        builder: ACProgramNodeBuilder new
"stream,"        saveComments: myMapFlag
"parsing"        ifFail: [^failBlock value].
                handler selector: ruleNode selector."save selector is case of error"
                codeStream := self newCodeStream. "generate code stream"
                codeStream :=clasee restartSignal
                        handle:
                            [:ex]|
                            codeStream := self mewCodeStream.
                            ex restart]
                        do:
                            [codeStream class: tragetClass outerScope: self scopeForClass; requestor: handler
                            myMapFlag ifTrue: [codeStream saveSourceMap].
                            noPattern
                                ifTrue: [ruleNode emitValue: codeStream inContext: context]
                                ifFalse: [ruleNode emitEffect: codeStream].
```

| translate: |
|---|

|  | "noPattern is true for 'do it', false when compiling (we almost always are compiling => emitEffect is what matters to us). Thus outputs actual generated byte codes."<br>method := codeStream makeMethod: ruleNode[. make compiled method<br>method := ACRuleMethod fromMethod: method. convert to annotated method<br>"Create a compilied rule. Save name and compiler flags.<br>method attributes: IdentifyDictionary new.<br>ruleNode attributes ==nil ifFalse: [method attributes: ruleNode attributes].<br>(method attributes) at: #name put: ruleNode name; at: #tracing; at: |
|---|---|
| #debugging put: debugging. | |
|  | holder := self newMethodHolder.<br>holder node: ruleNode.<br>holder method: method. |
| "Save" | myMapFlag |
| "source" | ifTrue: |
| "info and" | [srcInfo := srcInfo]. |
| "return" | method attributes at: #sourceInfo put: srcInfo.<br>holder sourceInfo: srcInfo]. |
|  | ^holder<br>"Returned object is used to out compilied rule into class dictionary,<br>(just as if it were a smalltlak method)."<br>"Various error handlers can be chosen, e.g. one for filing in<br>(silientish), a noisier one for accept." |

| method:context: |
|---|

```
method: fromDoIt context: ctxt
        "pattern [ | temporaries ] name string conditions
        block actions block => ACRuleNode. this is invoked inside the 'create"
        parse tree'commented part of "translate . . . '"
        | start pat messageComment ruleNode tempNodes |
        start := fromDoIt
        pat :=fromDoIt
            ifTrue: [ctxt == nil
                ifTrue: [Array with: #DoIt with: #( )]
                ifFalse: [Array with: #DoItIn: with: (Array with: (builder
newParameterVariableL (builder newVariableName: 'DOITCONTEXT')))]]
            ifFalse: [self patttern].
        "parse the selector and assign it to a local variable 'pattern'.
        'pattern' is actually an arrray of two objects (compiler is hacked)."
        (pat at: 2) size == 3 ifFalse: ["pat={selector, arguments}"
            ^self expected; '3 arguments (acme, problem, message)']. "rule arity"
        messageComment :=currentComment.
        currentComment := nil.
        "Begin to create new rule by creating top level parse tree node."
        ruleNode := builder newMethodSelector: (pat at: 1).
        tempNodes := tokenType == #verticalBar
            ifTrue: ["parse temporaries before primitive,
                to allow for old language."
                self temporaries]
            ifFalse: [newLanguage
                ifTrue: [nil]
                ifFalse: [#( )]].
        fromDoIt ifFalse: [self readStandarPragmas: ruleNode temps: tempNodes]
            ifTrue: [self nameFor: ruleNode startingAt: 1].
        "the above parses the rule nae (accepting => false, doIt => true)."
        Now we parse the rule conditions and actions (note that readConditions
        parses both the conditions and the actions)."
        self readConditions: (pat at: 2)temp: tempModes.
        tokenType == #doIt ifFalse: [^self expected: 'Nothing more'].
        "because we accepted instead of doIt => parsing is all."
        ruleNode block: parseNode.
        ruleNode addComment: messageComment.
        ruleNode sourcePosition: (start to: self endOfLastToken).
        ^ruleNode
```

| readStandardPragmas:temps: |
|---|
| Compiles the name of the rule. Looks for <name>0 and saves the string following (type enforced). |
| readStandardPragmas: methodNode temps: temps<br>"Ensure that we can parse Standard Smalltalk plus the named rule"<br>((self matchToken: #<) and:<br>[(self matchToken: 'name') and: [self matchToken: #>]])<br>    ifTrue: [self nameFor: methodNode]<br>    ifFalse: [super readStandardPragmas: methodNode temps: temps] |

| readConditions:temp: |
|---|
| Comples the condition and actions parts of rule. Lokks for <conditions> and then parses a sequence of smalltalk statements. |
| readConditions: argNodes temp: tempNodes<br>    "Parse the conditions part of the rule"<br>    ^((self matchToken: #<)<br>    and: [(self matchTokenL 'conditions')<br>        and: [seld matchToken: #>]])<br>    ifTure:<br>        [self conditionArgs: argNodes temps: tempNodes.<br>        parseNode]<br>    ifFasle: [self expected: '<conditions>' |

| condition:temps: |
|---|
| condition: argNodes temps: tempNodes<br>    "Parse a condition consisting if a series of expression statements"<br>    \| start blockComment conditionalNode stmts \|<br>    blockComment := currentComment. "save comments lest we reformat"<br>    currentComment := nil.<br>    start := endTemps.<br>    self expression<br>        ifTrue:<br>            [(self match: #period)<br>                ifFalse: [^self expected: 'period'].<br>            conditionsNode isNil ifTure: [conditionsNode := start].<br>                ifFalse: [^self expected: 'period'].<br>            conditionsNode isNil ifTrue: [conditionsNode := start].<br>            conditionalNode := ConditionalNode new<br>                condition: parseNode<br>                trueBlock: (self conditionL argNodes temps:<br>OrderedCollection new)<br>                falseBlock: self emptyBlock<br>                from: nil]<br>        ifFalse:<br>            [debugConditionsNode := self endOfLastToken.<br>            ^self readActions: argNodes temp: tempNodes].<br>    self addComment.<br>    stmts := self isTracing<br>        ifTrue:<br>            [self tracing: false.<br>            OrderedCollection with: (self insertConditionDebugCode<br>sourcePosition: (conditionsNode to: debugConditionsNode))]<br>            ifFalse: [OrderedCollection new].<br>    stmts addLast: conditionalNode.<br>    parseNode := builder newSequenceTemporaries: tempNodes<br>statements: stmts.<br>        parseNode addComment: blockComment.<br>        parseNode sourcePositions: (start to: self endOfLastToken +<br>(tokenType = #rightBracket<br>            ifTrue: [0]<br>            ifFalse: [1])).<br>        ^parseNode := builder newBlockArguments: argNodes body:<br>parseNode |

| readActions |
|---|
| Compiles the actiona part of the rule | readActions: argNodes temp: tempNodes
    "parse the actions part of the rule"
    ^((self matchToken: #<)
    and: [(self matchToken: 'actions')

| readActions |
|---|
| Compiles the actiona part of the rule | and: [self matchToken: #>]])
    ifTrue:
        [self statementsArgs: argNodes temps: tempNodes.
        parseNode]
    ifFalse: [self expected: '<actions>']

| statementsArgs:temps: |
|---| statementsArgs: argNodes temps: oldTemps
    "oldTemps is nil if temps should be parsed.
    This is for compatability with the old language,
    so that temps can be parsed before the
    promotive specification."
    | tempNodes stmts start blockComment returnStart stmtNode |
    oldTemps ==nil
        ifTrue: [tempNodes := self temporaries]
        ifFalse: [tempNodes :=oldTemps].
    stmts := OrderedCollection new.
    "give initial comment to block, since others trail statements"
    blockComment := currentComment.
    currentComment := nil.
    start := endTemps.
    [tokenType == #upArrow
        ifTrue:
            [returnStart := mark.
            self scanToken.
            self expression ifFalse:
                [^self expected: 'Expression to return'].
            self isDebugging ifTrue
                ]stmts addLast: self insertActionDebugCode].
            parseNode := uilder newReturnValue: parseNode.
            self addComment.
            parseNode sourcePositionsL (returnStart to: seld endOfLastToken).
            stmts addLast: parseNode.
            self match: #period."allow optional trailing . after ^"
            false]
        ifFalse: [self expression
            ifTrue:
                [self addComment.
                stmtNode := parseNode.
                (self isDebugging and: [parseNode hasEffect])
                    ifTrue: [stmts addLastL self insertActionDebugCode].
                stmts addLast: stmtNode.
                self matchL #period]
            ifFalse: [false]]] whileTrue.
    self addComment.
    stmts isEmpty
        ifTrue:
            [Dialog warn: 'No rule actions is defined'.
            returnStart := mark.
            parseNode := builder newReturnValue: self class selfVariableNode.
            self addComment.
            parseNode sourcePosition: (returnStart to: self endOfLastToken).
            stmts addLastL parseNode].
    (stmts size = 1 and: [blockComment == nil
        and:
            [parseNode := stmts first.
            parseNode sourcePosition == nil and: [tempNodes isEmpty]]])
        ifTrue: ["No point in building a sequence"]
        ifFalse:
            [parseNode := builder newSequenceTemporariesL tempodes statements:stmts.
            parseNode addComment: blockComment].
    parseNode sourcePosition: (start to: self endOfLastToken + (tokenType =
    #rightBracket
            ifTrue: [0]
            ifFalse: [1])).
    parseNode := builder newBlockArguments: argNodes body: parseNode

What is claimed is:

1. An automated method of processing data from a communications network comprising a plurality of network entities, having predetermined states of operation, the method comprising the steps of:

creating a plurality of different objects each associated with different possible rival states of one of the entities, the objects comprising knowledge based reasoning capability for determining whether the entity is in a given one of the possible rival states;

passing data about the network to the objects;

and inferring whether the entity is in the given one of the possible rival states using the reasoning capability.

2. The method of claim 1 wherein the given state is a fault state.

3. The method of claim 2 wherein the data about the network comprises alarms and other events relating to abnormal or undesired operation of the network.

4. The method of claim 3 wherein the method further comprising the step of passing messages between the objects as part of the inference process.

5. The method of claim 1 wherein the object creation step is triggered by an event notified by the network, and the given state is a possible cause of the event.

6. The method of claim 1 wherein the object creation step is triggered by an event notified by the network, and the given state is a possible consequence of the event.

7. The method of claim 1 wherein the reasoning capability comprises rules grouped according to the class of messages they can process.

8. The method of claim 1 wherein the reasoning capability comprises rules for translating events notified by the network into a degradation of a service received or offered by the associated entity from or to other entities.

9. The method of claim 8, further comprising the step of passing such service degradation information to other objects associated with the same or the other entities.

10. The method of claim 1, wherein the inference steps for each object are carried out in parallel in threads sharing a common knowledge base.

11. The method of claim 1 wherein knowledge bases are built up for each part, the method of claim 1 is carried out in parallel on the separate parts, and the inference step is carried out using respective ones of the knowledge bases, and messages from one object in one knowledge base to a connected object in another, are passed transparently.

12. The method of claim 11 wherein a plurality of said objects are created, in one of the knowledge bases, and the inference steps for each of these objects are carried out in parallel, in threads wherein messages passed from these objects contain a reference to the thread in which they were processed.

13. A method of acquiring knowledge for the knowledge based reasoning capacity for the method of claim 1, comprising the step of creating rules for translating events notified by the network relating to the associated entity, into a degradation of a service offered by the associated entity to other entities.

14. An automated method of processing data from a communications network, comprising the step of:

applying a knowledge based reasoning capability to interpret the data, wherein the reasoning capability comprises object orientated hierarchy of rule bases, the hierarchy being arranged to have object orientated inheritance properties, such that the method further comprises the steps of:

determining whether a named rule is in one of the rule bases, and where it is not present, making available the same named rule from a rule base higher in the hierarchy;

and applying the named rule to the data.

15. The method of claim 14 wherein the data comprises events notified by the network, and the named rule is for inferring the cause of one of the events.

16. An automated method of processing data from a communications network comprising the steps of:

providing a knowledge based reasoning capability wherein the reasoning capability comprises one or more rulebases, comprising rules encoded directly in an object oriented language;

providing an object oriented compiler;

and applying said knowledge based reasoning capability to interpret the data by specialising selected classes of the compiler so extending its functionality that it compiles rules and standard code.

17. The method of claim 16 wherein the rules comprise rules for processing events notified by the network, the method comprising the step of applying the reasoning to determine the cause of the events.

18. The method of claim 16 wherein the compiler is a smalltalk compiler.

* * * * *